US011181359B2

(12) United States Patent
Masuda

(10) Patent No.: US 11,181,359 B2
(45) Date of Patent: Nov. 23, 2021

(54) INFORMATION PROCESSING DEVICE, INFORMATION PROCESSING METHOD, AND PROGRAM

(71) Applicant: FUJIFILM CORPORATION, Tokyo (JP)

(72) Inventor: Tomonori Masuda, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 760 days.

(21) Appl. No.: 16/045,660

(22) Filed: Jul. 25, 2018

(65) Prior Publication Data
US 2018/0328720 A1 Nov. 15, 2018

Related U.S. Application Data

(63) Continuation of application No. PCT/JP2016/082147, filed on Oct. 28, 2016.

(30) Foreign Application Priority Data

Feb. 4, 2016 (JP) .............................. JP2016-020227

(51) Int. Cl.
*G01B 11/00* (2006.01)
*G01B 11/02* (2006.01)
(Continued)

(52) U.S. Cl.
CPC .......... *G01B 11/026* (2013.01); *G01B 11/002* (2013.01); *G06T 7/00* (2013.01);
(Continued)

(58) Field of Classification Search
USPC ...................................................... 356/4.03
See application file for complete search history.

(56) References Cited

U.S. PATENT DOCUMENTS 7,933,001 B2 * 4/2011 Otani ..................... G01C 11/14
356/3.14
8,319,952 B2 * 11/2012 Otani ..................... G01C 15/00
356/5.04
(Continued)

FOREIGN PATENT DOCUMENTS

CN 102914262 A 2/2013
CN 103940369 A 7/2014
(Continued)

OTHER PUBLICATIONS

English language translation of the following: Office action dated Sep. 2, 2019 from the SIPO in a Chinese patent application No. 201680080615.7 corresponding to the instant patent application. This office action translation is submitted now in order to supplement the understanding of the cited references which are being disclosed in the instant Information Disclosure Statement.
(Continued)

*Primary Examiner* — James R Hulka
(74) *Attorney, Agent, or Firm* — Solaris Intellectual Property Group, PLLC

(57) ABSTRACT

A derivation unit derives irradiation position pixel coordinates for specifying the position of a pixel corresponding to an irradiation position of directional light on the real space with respect to a subject, on the basis of the corresponding distance acquired by an acquisition unit, with respect to each of a plurality of second captured images included in a moving image acquired by the acquisition unit, and an execution unit executes a predetermined process as a process to be executed in a position specifiable state with respect to each of the plurality of second captured images, in a case of a position specifiable state where the position of the pixel which is specified by the irradiation position pixel coordinates derived by the derivation unit is the position of a pixel
(Continued)

which is specifiable at positions corresponding to each other in the respective first and second captured images.

20 Claims, 44 Drawing Sheets

(51) Int. Cl.
  *G06T 7/00* (2017.01)
  *H04N 5/232* (2006.01)
(52) U.S. Cl.
  CPC ......... *H04N 5/232* (2013.01); *H04N 5/23216* (2013.01); *H04N 5/232121* (2018.08)

(56) References Cited

U.S. PATENT DOCUMENTS

| | | | | |
|---|---|---|---|---|
| 9,310,317 | B2* | 4/2016 | Georgeson | G01B 11/24 |
| 10,157,474 | B2* | 12/2018 | Evers-Senne | G06T 7/70 |
| 10,401,146 | B2* | 9/2019 | Masuda | H04N 5/2226 |
| 10,546,381 | B2* | 1/2020 | Masuda | G06T 7/73 |
| 10,552,971 | B2* | 2/2020 | Gu | G06T 7/62 |
| 2007/0008515 | A1* | 1/2007 | Otani | G01C 15/00 356/5.02 |
| 2011/0096319 | A1* | 4/2011 | Otani | G01C 15/00 356/3.14 |
| 2011/0175998 | A1* | 7/2011 | Azuma | G06T 7/246 348/135 |
| 2011/0187829 | A1* | 8/2011 | Nakajima | H04N 13/20 348/46 |
| 2012/0293627 | A1* | 11/2012 | Ishii | H04N 13/111 348/46 |
| 2013/0182906 | A1* | 7/2013 | Kojo | G06T 7/521 382/103 |
| 2013/0188059 | A1 | 7/2013 | Georgeson et al. | |
| 2013/0208098 | A1* | 8/2013 | Pujol Alcolado | G06T 7/593 348/47 |
| 2014/0300732 | A1* | 10/2014 | Friend | G06T 7/73 348/135 |
| 2015/0356739 | A1* | 12/2015 | Masuda | G06T 7/593 348/47 |
| 2016/0103209 | A1 | 4/2016 | Masuda et al. | |
| 2016/0189362 | A1 | 6/2016 | Evers-Senne et al. | |
| 2018/0180735 | A1* | 6/2018 | Masuda | G01S 7/497 |
| 2018/0180736 | A1* | 6/2018 | Masuda | G01S 7/497 |
| 2018/0180737 | A1* | 6/2018 | Masuda | H04N 5/23238 |
| 2018/0203116 | A1* | 7/2018 | Sugimoto | G01S 17/10 |
| 2018/0232897 | A1* | 8/2018 | Masuda | G06F 3/147 |
| 2018/0328718 | A1* | 11/2018 | Masuda | H04N 5/2256 |
| 2018/0328719 | A1* | 11/2018 | Masuda | G01B 11/002 |
| 2020/0111223 | A1* | 4/2020 | Masuda | G06T 7/55 |

FOREIGN PATENT DOCUMENTS

| | | |
|---|---|---|
| CN | 104067111 A | 9/2014 |
| JP | H11-023262 A | 1/1999 |
| JP | 2001-119722 A | 4/2001 |
| JP | 2012-027000 A | 2/2012 |
| JP | 2013-122434 A | 6/2013 |
| WO | 97/06406 A1 | 2/1997 |
| WO | 2014/195000 A1 | 12/2014 |
| WO | 2015/008587 A1 | 1/2015 |

OTHER PUBLICATIONS

International Search Report issued in International Application No. PCT/JP2016/082147 dated Jan. 10, 2017.
Written Opinion of the ISA issued in International Application No. PCT/JP2016/082147 dated Jan. 10, 2017.

* cited by examiner

INFORMATION PROCESSING DEVICE, INFORMATION PROCESSING METHOD, AND PROGRAM

CROSS-REFERENCE TO RELATED APPLICATIONS

This application is a continuation application of International Application No. PCT/JP2016/082147, filed Oct. 28, 2016, the disclosure of which is incorporated herein by reference in its entirety. Further, this application claims priority from Japanese Patent Application No. 2016-020227, filed Feb. 4, 2016, the disclosure of which is incorporated herein by reference in its entirety.

BACKGROUND

1. Technical Field

The technique of the present disclosure relates to an information processing device, an information processing method, and a program.

2. Related Art

JP2012-27000A discloses an image measurement processing device that derives three-dimensional positional coordinates of a feature point on an object to be measured by a single camera. In the image measurement processing device disclosed in JP2012-27000A, three-dimensional positional coordinates are derived by the following steps 1 to 5.

In step 1, the image measurement processing device stores an internal standardization element of the camera and the real coordinates of at least four feature points of the object to be measured in advance. In step 2, the image measurement processing device fetches an image which is captured by the camera and includes the four feature points within a field of view of the camera. In step 3, the image measurement processing device corrects a distortion on the image on the basis of the internal standardization element with respect to camera view coordinates of the feature point on the fetched image. In step 4, the image measurement processing device derives a camera position and a camera angle in a coordinate system based on the object to be measured during imaging from the camera view coordinates and the real coordinates of the feature point. In step 5, the image measurement processing device executes coordinate conversion for setting the derived camera position and camera angle to be a reference position and a reference angle to derive three-dimensional coordinates of the feature point in a camera-based coordinate system.

JP2013-122434A discloses a three-dimensional position measurement device that includes a monocular imaging device to which irradiation means including an irradiation light source, emitting a laser beam, is fixed.

The three-dimensional position measurement device disclosed in JP2013-122434A captures an image of a calibration plate as a subject by moving the calibration plate while irradiating the calibration plate with a laser beam or captures an image of the calibration plate as a subject from two imaging positions by moving an imaging device. In addition, the three-dimensional position measurement device disclosed in JP2013-122434A calculates three-dimensional coordinates of an irradiation position of a laser beam in each image from the captured images, and calculates a direction vector or a plane equation of the laser beam. The three-dimensional position measurement device disclosed in JP2013-122434A calculates three-dimensional coordinates of an object to be irradiated with a laser beam by using the calculated direction vector or plane equation.

WO97/06406A discloses a distance measurement device that measures a distance from a reference surface to an irradiation position of a laser beam. The distance measurement device disclosed in WO97/06406A generates an edge image of a captured image, focusing on the occurrence of an error in measurement in accordance with features of the surface of an object to be measured, and specifies a coordinate position indicating the contour of the object from coordinate positions of elements in a space on the basis of the generated edge image.

SUMMARY

However, all of the techniques disclosed in JP2012-27000A, JP2013-122434A, and WO97/06406A are techniques devised on the assumption that a specifiable feature point is present within a captured image obtained by imaging. In a case where imaging is performed on a subject that does not include a specifiable feature point, it is possible to derive three-dimensional coordinates. Meanwhile, the "three-dimensional coordinates" as mentioned herein refers to three-dimensional coordinates for specifying a position designated in the subject.

As another method of deriving three-dimensional coordinates, a method is considered in which three-dimensional coordinates are derived on the basis of a first captured image, a second captured image, and an imaging position distance by a distance measurement device having a function of performing distance measurement and imaging. Meanwhile, the distance measurement refers to the measurement of a distance to a subject based on a reciprocating time of a laser beam emitted toward the subject serving as an object to be measured. In addition, the first captured image refers to an image obtained by imaging the subject from a first imaging position, and the second captured image refers to an image obtained by imaging a subject, including the subject imaged from the first imaging position, from a second imaging position different from the first imaging position. In addition, the imaging position distance refers to a distance between the first imaging position and the second imaging position.

Incidentally, in a case where three-dimensional coordinates are derived on the basis of the first captured image, the second captured image, and the imaging position distance, it is necessary to derive the imaging position distance with a high level of accuracy. In a case where the subject includes a specifiable feature point, distance measurement is performed by setting the specifiable feature point to be an object to be measured, and it is possible to derive the imaging position distance when the subject including the specifiable feature point can be imaged from each of different imaging positions.

However, the specifiable feature point is not necessarily included in the subject. Even when the specifiable feature point is included in the subject, it is considered that the real irradiation position of a laser beam is not consistent with the specifiable feature point in the subject due to the exchange of parts in the distance measurement device, the change of an angle of view, or the like. On contrary, it is also considered that the real irradiation position of the laser beam is consistent with the specifiable feature point in the subject. The execution of a process based on such a different state by the distance measurement device immediately recognizing the state or the execution of a process based on the different state by the distance measurement device by causing a user to immediately recognize the state may be an important factor in achieving work efficiency.

One embodiment of the invention provides an information processing device, an information processing method, and a program which are capable of immediately executing a process based on an irradiation position of directional light with respect to a subject.

An information processing device of a first aspect of the invention includes an acquisition unit that acquires a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, a derivation unit that derives irradiation position pixel coordinates for specifying a position of a pixel corresponding to an irradiation position of the directional light on a real space with respect to the subject, on the basis of the corresponding distance acquired by the acquisition unit, with respect to each of the plurality of second captured images included in the moving image acquired by the acquisition unit, and an execution unit that executes a predetermined process as a process to be executed in a position specifiable state with respect to each of the plurality of second captured images, in a case of the position specifiable state where the position of the pixel which is specified by the irradiation position pixel coordinates derived by the derivation unit is a position of a pixel which is specifiable at positions corresponding to each other in the respective first and second captured images.

Therefore, the information processing device according to the first aspect of the invention can immediately execute the process based on the irradiation position of the directional light with respect to the subject.

In the information processing device of a second aspect of the invention according to the information processing device of the first aspect of the invention, the predetermined process is a process including a position specifiable state notification process of giving notice of being the position specifiable state.

Therefore, the information processing device according to the second aspect of the invention can make a user immediately recognize that the position of the pixel which is specified by the irradiation position pixel coordinates is the position of a pixel which is specifiable at positions corresponding to each other in the respective first and second captured images.

In the information processing device of a third aspect of the invention according to the information processing device of the second aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of second captured images, and the predetermined process is a process including a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, a focal length of an imaging lens used for the imaging of the subject, and dimensions of imaging pixels included in an imaging pixel group for imaging the subject, in a case where a predetermined instruction is received by a first reception unit in a state where the notice of being the position specifiable state is given.

Therefore, the information processing device according to the third aspect of the invention can derive the imaging position distance at a timing required by the user, in a case where the position of the pixel which is specified by the irradiation position pixel coordinates is the position of a pixel which is specifiable at positions corresponding to each other in the respective first and second captured images.

In the information processing device of a fourth aspect of the invention according to the information processing device of any one of the first to third aspects of the invention, the execution unit further executes a position unspecifiable state notification process of giving notice of being a position unspecifiable state with respect to each of the plurality of second captured images, in a case of the position unspecifiable state where the position of the pixel which is specified by the irradiation position pixel coordinates is a position of a pixel different from the pixel which is specifiable at the positions corresponding to each other in the respective first and second captured images.

Therefore, the information processing device according to the fourth aspect of the invention can make the user immediately recognize that the position of the pixel which is specified by the irradiation position pixel coordinates is the position of a pixel different from the pixel which is specifiable at positions corresponding to each other in the respective first and second captured images.

In the information processing device of a fifth aspect of the invention according to the information processing device of the fourth aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of second captured images, and the execution unit executes a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, the focal length of the imaging lens used in the imaging of the subject, and the dimensions of the imaging pixels included in the imaging pixel group for imaging the subject, in a case where a predetermined instruction is received by a second reception unit in a state where the notice of being the position unspecifiable state is given.

Therefore, the information processing device according to the fifth aspect of the invention can derive the imaging position distance at a timing required by the user, in a case where the position of the pixel which is specified by the irradiation position pixel coordinates is the position of a pixel different from the pixel which is specifiable at positions corresponding to each other in the respective first and second captured images.

In the information processing device of a sixth aspect of the invention according to the information processing device of the first aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of second captured images, and the predetermined process is a process including a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, a focal length of an imaging lens used for the imaging of the subject, and dimensions of imaging pixels included in an imaging pixel group for imaging the subject.

Therefore, the information processing device according to the sixth aspect of the invention can immediately derive the imaging position distance in a case where the position of the pixel which is specified by the irradiation position pixel coordinates is the position of the pixel which is specifiable at positions corresponding to each other in the respective first and second captured images.

An information processing device of a seventh aspect of the invention includes an acquisition unit that acquires a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, a derivation unit that derives irradiation position pixel coordinates for specifying a position of a pixel corresponding to an irradiation position of the directional light on a real space with respect to the subject, on the basis of the corresponding distance acquired by the acquisition unit, with respect to each of the plurality of second captured images included in the moving image acquired by the acquisition unit, and an execution unit that executes a predetermined process as a process to be executed in a position unspecifiable state with respect to each of the plurality of second captured images, in a case of the position unspecifiable state where the position of the pixel which is specified by the irradiation position pixel coordinates derived by the derivation unit is a position of a pixel different from a pixel which is specifiable at positions corresponding to each other in the respective first and second captured images.

Therefore, the information processing device according to the seventh aspect of the invention can immediately execute the process based on the irradiation position of the directional light with respect to a subject.

In the information processing device of an eighth aspect of the invention according to the information processing device of the seventh aspect of the invention, the predetermined process is a process including a position unspecifiable state notification process of giving notice of being the position unspecifiable state.

Therefore, the information processing device of the eighth aspect of the invention can immediately make the user recognize that the position of the pixel specified by the irradiation position pixel coordinates is the position of a pixel different from the pixel which is specifiable at positions corresponding to each other in the respective first and second captured images.

In the information processing device of a ninth aspect of the invention according to the information processing device of the eighth aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of captured images, and the predetermined process is a process including a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, a focal length of an imaging lens used in the imaging of the subject, and dimensions of imaging pixels included in an imaging pixel group for imaging the subject, in a case where a predetermined instruction is received by a first reception unit in a state where the notice of being the position unspecifiable state is given.

Therefore, the information processing device according to the ninth aspect of the invention can derive the imaging position distance at a timing required by the user, in a case where the position of the pixel which is specified by the irradiation position pixel coordinates is the position of a pixel different from the pixel which is specifiable at positions corresponding to each other in the respective first and second captured images.

In the information processing device of a tenth aspect of the invention according to the information processing device of any one of the seventh to ninth aspects of the invention, the execution unit further executes a position specifiable state notification process of giving notice of being a position specifiable state with respect to each of the plurality of second captured images, in a case of the position specifiable state where the position of the pixel which is specified by the irradiation position pixel coordinates is the position of the pixel which is specifiable at the positions corresponding to each other in the respective first and second captured images.

Therefore, the information processing device according to the tenth aspect of the invention can make the user immediately recognize that the position of the pixel which is specified by the irradiation position pixel coordinates is the position of a pixel which is specifiable at positions corresponding to each other in the respective first and second captured images.

In the information processing device of an eleventh aspect of the invention according to the information processing device of the tenth aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of second captured images, and the execution unit executes a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, the focal length of the imaging lens used for the imaging of the subject, and the dimensions of the imaging pixels included in the imaging pixel group for imaging the subject, in a case where a predetermined instruction is received by a second reception unit in a state where the notice of being the position specifiable state is given.

Therefore, the information processing device according to the eleventh aspect of the invention can derive the imaging position distance at a timing required by the user, in a case where the position of the pixel which is specified by the irradiation position pixel coordinates is the position of a pixel which is specifiable at positions corresponding to each other in the respective first and second captured images.

In the information processing device of a twelfth aspect of the invention according to the information processing device of the seventh aspect of the invention, the derivation unit further derives irradiation position real space coordinates for specifying the irradiation position of the directional light on the real space with respect to the subject, on the basis of the corresponding distance acquired by the acquisition unit, with respect to each of the plurality of second captured images, and the predetermined process is a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, the focal length of the imaging lens used in the imaging of the subject, and the dimensions of the imaging pixels included in the imaging pixel group for imaging the subject.

Therefore, the information processing device according to the twelfth aspect of the invention can immediately derive the imaging position distance in a case where the position of the pixel which is specified by the irradiation position pixel coordinates is the position of a pixel different from the pixel which is specifiable at positions corresponding to each other in the respective first and second captured images.

In the information processing device of a thirteenth aspect of the invention according to the information processing device of any one of the first to twelfth aspects of the invention, the predetermined process is a process including a storage process of storing, in a storage unit, at least one of a second captured image obtained by performing imaging at a predetermined timing among the plurality of second captured images, and information based on a distance acquired at a timing corresponding to the predetermined timing among the distances acquired by the acquisition unit.

Therefore, the information processing device according to the thirteenth aspect of the invention can immediately store, in the storage unit, at least one of the second captured image obtained by performing imaging at the predetermined timing among the plurality of second captured images, and the information based on the distance acquired at the timing corresponding to the predetermined timing among the distances acquired by the acquisition unit, in accordance with the irradiation position of the directional light with respect to the subject.

The information processing device of a fourteenth aspect of the invention according to the information processing device of any one of the first to thirteenth aspects of the invention further includes a measurement unit that measures the distance by emitting the directional light and receiving reflected light of the directional light, and the acquisition unit acquires the distance measured by the measurement unit.

Therefore, the information processing device according to the fourteenth aspect of the invention can use the distance measured by the measurement unit for the derivation of the irradiation position pixel coordinates.

The information processing device of a fifteenth aspect of the invention according to the information processing device of any one of the first to fourteenth aspects of the invention further includes an imaging unit that images the subject, and the acquisition unit acquires the moving image obtained by performing imaging by the imaging unit.

Therefore, the information processing device according to the fifteenth aspect of the invention can immediately execute the process based on the irradiation position of the directional light with respect to the subject by using the moving image obtained by performing imaging by the imaging unit.

In the information processing device of a sixteenth aspect of the invention according to the information processing device of any one of the first to fifteenth aspects of the invention, the acquisition unit acquires a distance to the subject which is measured by emitting the directional light to the subject and receiving reflected light of the directional light while the moving image is captured.

Therefore, the information processing device according to the sixteenth aspect of the invention can immediately execute the process based on the irradiation position of the directional light with respect to the subject while the moving image is captured.

An information processing method of a seventeenth aspect of the invention includes acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, deriving irradiation position pixel coordinates for specifying a position of a pixel corresponding to an irradiation position of the directional light on a real space with respect to the subject, on the basis of the acquiring corresponding distance, with respect to each of the plurality of second captured images included in the acquired moving image, and executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the respective first and second captured images.

Therefore, in the information processing method according to the seventeenth aspect of the invention, it is possible to immediately execute the process based on the irradiation position of the directional light with respect to the subject.

An information processing method of an eighteenth aspect of the invention includes acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image, and executing a predetermined process as a process to be executed in a position unspecifiable state with respect to each of the plurality of second captured images, in a case of the position unspecifiable state where the position of the pixel which is specified by the derived irradiation position pixel coordinates is a position of a pixel different from a pixel which is specifiable at positions corresponding to each other in the respective first and second captured images.

Therefore, in the information processing method according to the eighteenth aspect of the invention, it is possible to immediately execute the process based on the irradiation position of the directional light with respect to the subject.

A program of a nineteenth aspect of the invention causes a computer to execute a process including acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, deriving irradiation position pixel coordinates for specifying a position of a pixel corresponding to an irradiation position of the directional light on a real space with respect to the subject, on the basis of the acquiring corresponding distance, with respect to each of the plurality of second captured images included in the acquired moving image, and executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the respective first and second captured images.

Therefore, in the program according to the nineteenth aspect of the invention, it is possible to immediately execute the process based on the irradiation position of the directional light with respect to the subject.

A program of a twentieth aspect of the invention causes a computer to execute a process including acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light, deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image, and executing a predetermined process as a process to be executed in a position unspecifiable state with respect to each of the plurality of second captured images, in a case of the position unspecifiable state where the position of the pixel which is specified by the derived irradiation position pixel coordinates is a position of a pixel different from a pixel which is specifiable at positions corresponding to each other in the respective first and second captured images.

Therefore, in the program according to the twentieth aspect of the invention, it is possible to immediately execute the process based on the irradiation position of the directional light with respect to the subject.

According to one embodiment of the invention, it is possible to obtain an effect that a process based on an irradiation position of directional light with respect to a subject can be immediately executed.

BRIEF DESCRIPTION OF THE DRAWINGS

Exemplary embodiments according to the technique of the present disclosure will be described in detail based on the following figures, wherein.

DESCRIPTION

Hereinafter, an example of an embodiment according to a technique of this disclosure will be described with reference to the accompanying drawings. Meanwhile, in this embodiment, for convenience of description, a distance from a distance measurement device 10A to a subject to be measured will be also simply referred to as a "distance" or a "distance to a subject". In this embodiment, an angle of view with respect to a subject will be also simply referred to as an "angle of view".

First Embodiment

Figure 1:
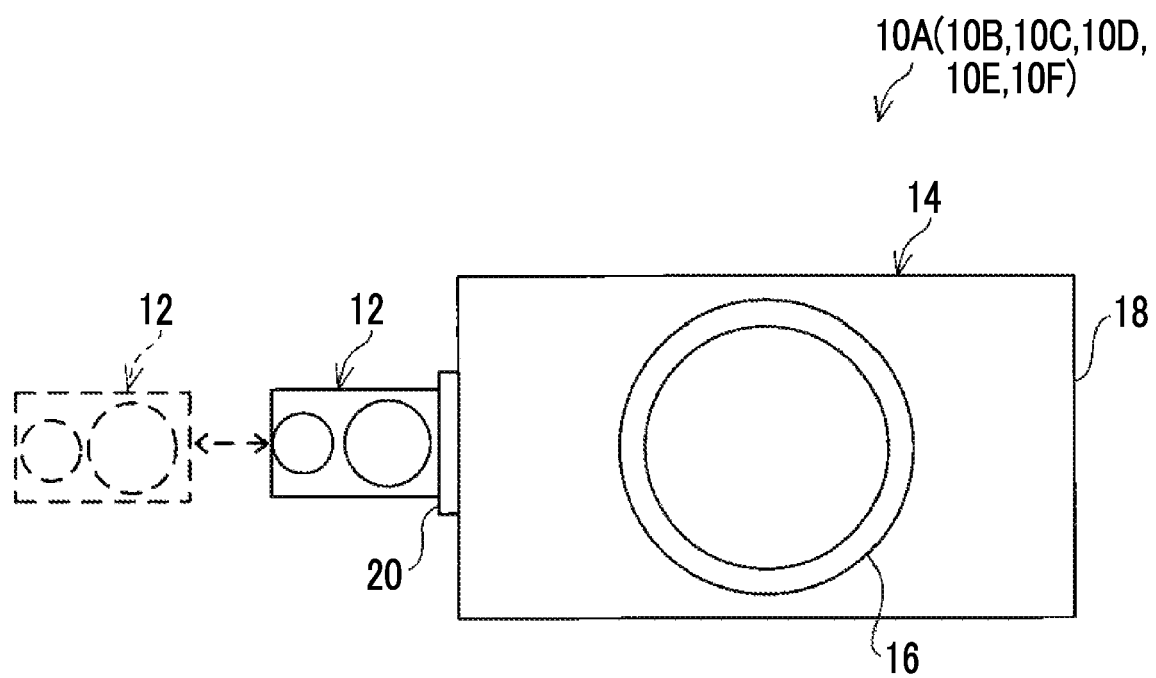
FIG. 1 is a front view illustrating an example of the appearance of a distance measurement device according to first to seventh embodiments.

As illustrated in FIG. 1 as an example, the distance measurement device 10A which is an example of an information processing device according to the technique of this disclosure includes a distance measurement unit 12 and an imaging device 14. Meanwhile, in this embodiment, the distance measurement unit 12 and a distance measurement control unit 68 to be described later (see FIG. 2) are examples of a measurement unit according to the technique of this disclosure, and the imaging device 14 is an example of an imaging unit according to the technique of this disclosure.

The imaging device 14 includes a lens unit 16 and an imaging device main body 18, and the lens unit 16 is detachably attached to the imaging device main body 18.

A hot shoe (Hot Shoe) 20 is provided on the left surface of the imaging device main body 18 in a front view, and the distance measurement unit 12 is detachably attached to the hot shoe 20.

The distance measurement device 10A has a distance measurement system function of emitting a laser beam for distance measurement to the distance measurement unit 12 to perform distance measurement and an imaging system function of causing the imaging device 14 to image a subject to obtain a captured image. Meanwhile, hereinafter, a captured image will be also simply referred to as an "image". In addition, hereinafter, for convenience of description, a description will be given on the assumption that the height of an optical axis L1 (see FIG. 2) of a laser beam emitted from the distance measurement unit 12 is the same as the height of an optical axis L2 (see FIG. 2) of the lens unit 16 in the vertical direction.

The distance measurement device 10A operates the distance measurement system function to perform a measurement sequence (see FIG. 3) once in accordance with one instruction, and one distance is finally output by the measurement sequence being performed once.

The distance measurement device 10A has a still image imaging mode and a movie imaging mode as an operation mode of the imaging system function. The still image imaging mode is an operation mode for capturing a still image, and the movie imaging mode is an operation mode for capturing a moving image. The still image imaging mode and the movie imaging mode are selectively set in accordance with a user's instruction.

Figure 2:
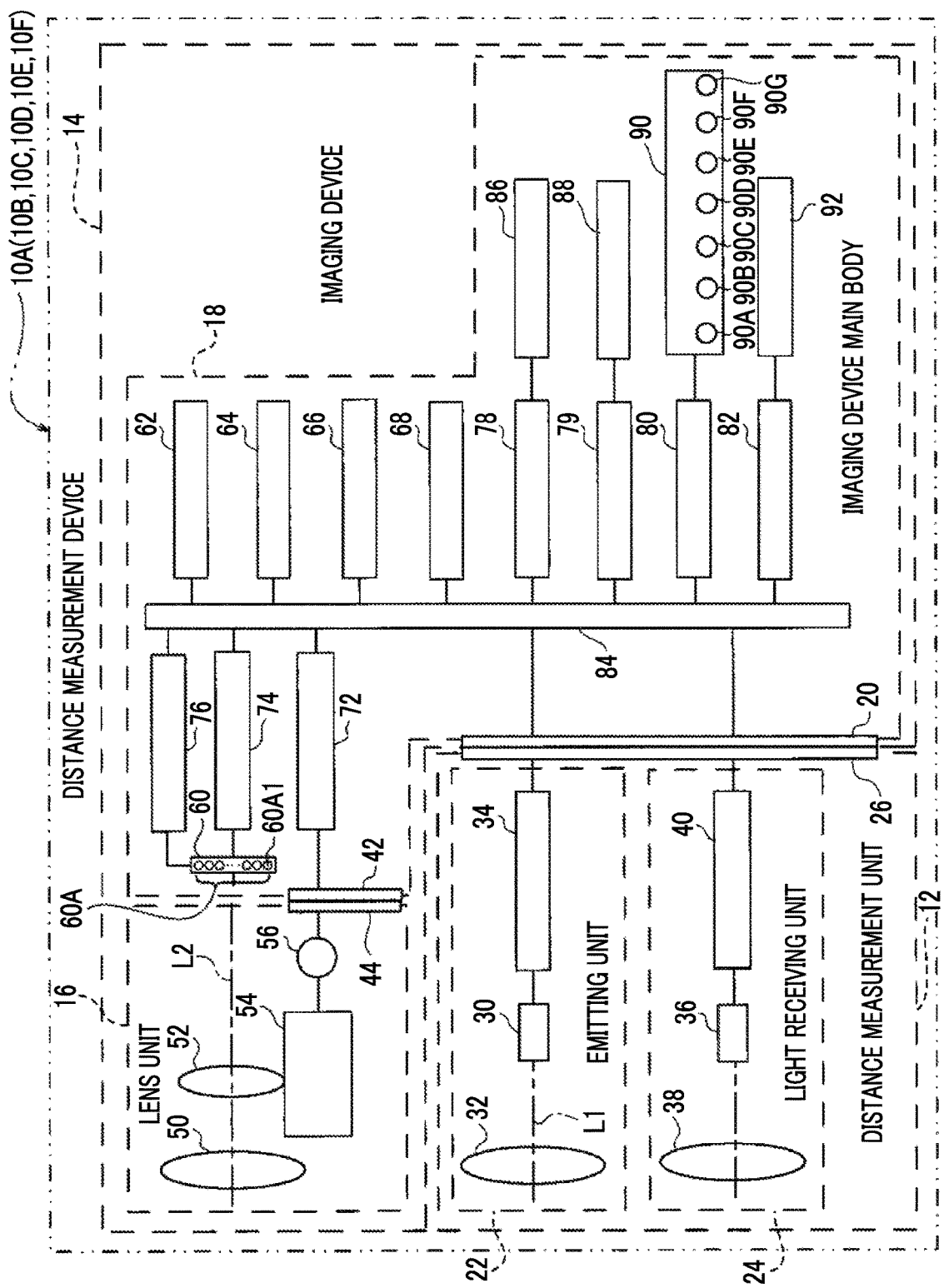
FIG. 2 is a block diagram illustrating an example of a hardware configuration of the distance measurement device according to the first to sixth embodiments.

As illustrated in FIG. 2 as an example, the distance measurement unit 12 includes an emitting unit 22, a light receiving unit 24, and a connector 26.

The connector 26 can be connected to the hot shoe 20, and the distance measurement unit 12 is operated under the control of the imaging device main body 18 in a state where the connector 26 is connected to the hot shoe 20.

The emitting unit 22 includes a Laser Diode (LD) 30, a condensing lens (not shown), an objective lens 32, and an LD driver 34.

The condensing lens and the objective lens 32 are provided along the optical axis L1 of a laser beam emitted by the LD 30, and are disposed in this order along the optical axis L1 from the LD 30 side.

The LD 30 emits a laser beam for distance measurement which is an example of a directional light according to the technique of this disclosure. The laser beam emitted by the LD 30 is a colored laser beam, and an irradiation position of the laser beam is visually recognized on the real space and is also visually recognized from a captured image obtained by the imaging device 14, for example, within a range of approximately several meters from the emitting unit 22.

The condensing lens condenses a laser beam emitted by the LD 30, and transmits the condensed laser beam. The objective lens 32 faces a subject, and emits the laser beam passing through the condensing lens to the subject.

The LD driver 34 is connected to the connector 26 and the LD 30, and drives the LD 30 in accordance with an instruction of the imaging device main body 18 to emit a laser beam.

The light receiving unit 24 includes a Photo Diode (PD) 36, an objective lens 38, and a light receiving signal processing circuit 40. The objective lens 38 is disposed on a light receiving surface side of the PD 36, and a reflected laser beam which is a laser beam emitted by the emitting unit 22 and reflected from the subject is incident on the objective lens 38. The objective lens 38 transmits the reflected laser beam and guides the reflected laser beam to the light receiving surface of the PD 36. The PD 36 receives the reflected laser beam having passed through the objective lens 38, and outputs an analog signal based on the amount of light received, as a light receiving signal.

The light receiving signal processing circuit 40 is connected to the connector 26 and the PD 36, amplifies the light receiving signal, which is input from the PD 36, by an amplifier (not shown), and performs Analog/Digital (A/D) conversion on the amplified light receiving signal. The light receiving signal processing circuit 40 outputs the light receiving signal digitalized by the A/D conversion to the imaging device main body 18.

The imaging device 14 includes mounts 42 and 44. The mount 42 is provided in the imaging device main body 18, and the mount 44 is provided in the lens unit 16. The lens unit 16 is exchangeably mounted on the imaging device main body 18 by the mount 44 being coupled to the mount 42.

The lens unit 16 includes an imaging lens 50, a zoom lens 52, a zoom lens moving mechanism 54, and a motor 56.

Subject light which is light reflected from the subject is incident on the imaging lens 50. The imaging lens 50 transmits the subject light and guides the subject light to the zoom lens 52.

The zoom lens 52 is attached to the zoom lens moving mechanism 54 so as to be slidable with respect to the optical axis L2. In addition, the motor 56 is connected to the zoom lens moving mechanism 54, and the zoom lens moving mechanism 54 receives the power of the motor 56 to make the zoom lens 52 slide along the direction of the optical axis L2.

The motor 56 is connected to the imaging device main body 18 through the mounts 42 and 44, and driving is controlled in accordance with a command from the imaging device main body 18. Meanwhile, in this embodiment, a stepping motor is applied as an example of the motor 56. Therefore, the motor 56 is operated in synchronization with a pulse power on the basis of a command from the imaging device main body 18.

The imaging device main body 18 includes an imaging element 60, a main control unit 62, an image memory 64, an image processing unit 66, a distance measurement control unit 68, a motor driver 72, an imaging element driver 74, an image signal processing circuit 76, and a display control unit 78. In addition, the imaging device main body 18 includes a touch panel interface (I/F) 79, a reception I/F 80, and a media I/F 82.

The main control unit 62, the image memory 64, the image processing unit 66, the distance measurement control unit 68, the motor driver 72, the imaging element driver 74, the image signal processing circuit 76, and the display control unit 78 are connected to a bus line 84. In addition, the touch panel I/F 79, the reception I/F 80, and the media I/F 82 are also connected to the bus line 84.

The imaging element 60 is a Complementary Metal Oxide Semiconductor (CMOS) type image sensor, and includes color filters (not shown). The color filters include a G filter corresponding to green (G), an R filter corresponding to red (R), and a B filter corresponding to blue (B) which most contribute to the obtainment of a brightness signal. The imaging element 60 includes an imaging pixel group 60A including a plurality of imaging pixels 60A1 arranged in a matrix. Any one filter of the R filter, the G filter, and the B filter included in the color filters is allocated to each of the imaging pixels 60A1, and the imaging pixel group 60A receives the subject light to image the subject.

That is, the subject light having passed through the zoom lens 52 is imaged on an imaging surface which is the light receiving surface of the imaging element 60, and charge based on the amount of subject light received is accumulated in the imaging pixels 60A1. The imaging element 60 outputs the charge accumulated in the imaging pixels 60A1 as an image signal indicating an image equivalent to a subject image which is obtained by imaging the subject light on the imaging surface.

The main control unit 62 controls the entire distance measurement device 10A through the bus line 84.

The motor driver 72 is connected to the motor 56 through the mounts 42 and 44, and controls the motor 56 in accordance with an instruction of the main control unit 62.

The imaging device 14 has a viewing angle changing function. The viewing angle changing function is a function of changing an angle of view by moving the zoom lens 52, and is realized by the zoom lens 52, the zoom lens moving mechanism 54, the motor 56, the motor driver 72, and the main control unit 62 in this embodiment. Meanwhile, in this embodiment, an optical viewing angle changing function of the zoom lens 52 is described. However, the technique of this disclosure is not limited thereto, an electronic viewing angle changing function not using the zoom lens 52 may be used.

The imaging element driver 74 is connected to the imaging element 60, and provides a driving pulse to the imaging element 60 under the control of the main control unit 62. The imaging pixels 60A1 included in the imaging pixel group 60A are driven in accordance with the driving pulse supplied to the imaging element 60 by the imaging element driver 74.

The image signal processing circuit 76 is connected to the imaging element 60, and reads out an image signal for one frame from the imaging element 60 for each imaging pixel 60A1 under the control of the main control unit 62. The image signal processing circuit 76 performs various processing, such as correlative double sampling processing, automatic gain control, and A/D conversion, on the read-out image signal. The image signal processing circuit 76 outputs an image signal, which is digitalized by performing various processing on the image signal, to the image memory 64 for each frame at a specific frame rate (for example, several tens of frames per second) which is specified by a clock signal supplied from the main control unit 62. The image memory 64 temporarily holds the image signal which is input from the image signal processing circuit 76.

The imaging device main body 18 includes a display unit 86, a touch panel 88, a reception device 90, and a memory card 92.

The display unit 86 is connected to the display control unit 78, and displays various information under the control of the display control unit 78. The display unit 86 is realized by, for example, a Liquid Crystal Display (LCD).

The touch panel 88 which is an example of first and second reception units according to the technique of this disclosure is superimposed on a display screen of the display unit 86, and receives a touch of a user's finger or an indicator such as a touch pen. The touch panel 88 is connected to the touch panel I/F 79, and outputs positional information indicating a position touched by the indicator to the touch panel I/F 79. The touch panel I/F 79 operates the touch panel 88 in accordance with an instruction of the main control unit 62, and outputs the positional information, which is input from the touch panel 88, to the main control unit 62. Meanwhile, in this embodiment, the touch panel 88 is described as an example of the first and second reception units according to the technique of this disclosure, but the invention is not limited thereto. A mouse (not shown) used by being connected to the distance measurement device 10A may be applied instead of the touch panel 88. In addition, the touch panel 88 and the mouse may be used in combination.

The reception device 90 includes a measurement imaging button 90A, an imaging button 90B, an imaging system operation mode switching button 90C, a wide angle instruction button 90D, and a telephoto instruction button 90E. In addition, the reception device 90 also includes an imaging position distance derivation button 90F, a three-dimensional coordinate derivation button 90G and the like, and receives the user's various instructions. The reception device 90 is connected to the reception I/F 80, and the reception I/F 80 outputs an instruction content signal indicating contents of an instruction received by the reception device 90 to the main control unit 62.

The measurement imaging button 90A is a pressing type button that receives an instruction for starting measurement and imaging. The imaging button 90B is a pressing type button that receives an instruction for starting imaging. The imaging system operation mode switching button 90C is a pressing type button that receives an instruction for switching between a still image imaging mode and a movie imaging mode.

The wide angle instruction button 90D is a pressing type button that receives an instruction for setting an angle of view to be a wide angle, and the amount of change of the angle of view to the wide angle side is determined depending on a pressing time for which the pressing of the wide angle instruction button 90D is continuously performed within an allowable range.

The telephoto instruction button 90E is a pressing type button that receives an instruction for setting an angle of view to be at a telephoto side, the amount of change of the angle of view to the telephoto side is determined depending on a pressing time for which the pressing of the telephoto instruction button 90E is continuously performed within an allowable range.

The imaging position distance derivation button 90F is a pressing type button that receives an instruction for starting an imaging position distance derivation process to be described later. The three-dimensional coordinate derivation button 90G is a pressing type button that receives an instruction for starting an imaging position distance derivation process to be described later and a three-dimensional coordinate derivation process to be described later.

Meanwhile, hereinafter, for convenience of description, the measurement imaging button 90A and the imaging button 90B will be referred to as a "release button" in a case where it is not necessary to give a description by distinguishing between the buttons. In addition, hereinafter, for convenience of description, the wide angle instruction button 90D and the telephoto instruction button 90E will be referred to as an "angle of view instruction button" in a case where it is not necessary to give a description by distinguishing between the buttons.

Meanwhile, in the distance measurement device 10A according to this embodiment, a manual focus mode and an autofocus mode are selectively set in accordance with the user's instruction through the reception device 90. The release button receives two-stage pressing operations of an imaging preparation instruction state and an imaging instruction state. The imaging preparation instruction state refers to, for example, a state where the release button is pressed to an intermediate position (half pressing position) from a waiting position, and the imaging instruction state refers to a state where the release button is pressed to a final pressing position (full pressing position) beyond the intermediate position. Meanwhile, hereinafter, for convenience of description, the "state where the release button is pressed to the half pressing position from the waiting position" will be referred to as a "half pressing state", and the "state where the release button is pressed to the full pressing position from the waiting position" will be referred to as a "full pressing state".

In the autofocus mode, the adjustment of imaging conditions is performed by the release button being set to be in a half pressing state. Thereafter, when the release button is subsequently set to be in a full pressing state, the actual exposure is performed. That is, after exposure adjustment is performed by the operation of an Automatic Exposure (AE) function by the release button being set to be in a half pressing state prior to the actual exposure, focus adjustment is performed by the operation of an Auto-Focus (AF) function, and the actual exposure is performed when the release button is set to be in a full pressing state.

Here, the actual exposure refers to exposure performed to obtain a still image file to be described later. In this embodiment, the exposure means exposure performed to obtain a live view image to be described later and exposure performed to obtain a moving image file to be described later, in addition to the actual exposure. Hereinafter, for convenience of description, the exposures will be simply referred to as "exposure" in a case where it is not necessary to give a description by distinguishing between the exposures.

Meanwhile, in this embodiment, the main control unit 62 performs exposure adjustment based on an AE function and focus adjustment based on an AF function. In this embodiment, a case where the exposure adjustment and the focus adjustment are performed is described. However, the technique of this disclosure is not limited thereto, and the exposure adjustment or the focus adjustment may be performed.

The image processing unit 66 acquires an image signal for each frame from the image memory 64 at a specific frame rate, and performs various processing, such as gamma correction, brightness conversion, color difference conversion, and compression processing, on the acquired image signal.

The image processing unit 66 outputs the image signal, which is obtained by performing various processing, to the display control unit 78 for each frame at a specific frame rate. In addition, the image processing unit 66 outputs the image signal, which is obtained by performing various processing, to the main control unit 62 in accordance with a request of the main control unit 62.

The display control unit 78 outputs the image signal, which is input from the image processing unit 66, to the display unit 86 for each frame at a specific frame rate under the control of the main control unit 62.

The display unit 86 displays an image, character information, and the like. The display unit 86 displays an image shown by the image signal, which is input from the display control unit 78 at a specific frame rate, as a live view image. The live view image is a consecutive frame image which is obtained by consecutive imaging, and is also referred to as a through-image. In addition, the display unit 86 also displays a still image which is a single frame image obtained by performing imaging using a single frame. Further, the display unit 86 also displays a reproduced image, a menu screen, and the like, in addition to the live view image.

Meanwhile, in this embodiment, the image processing unit 66 and the display control unit 78 are realized by an Application Specific Integrated Circuit (ASIC), but the technique of this disclosure is not limited thereto. For example, each of the image processing unit 66 and the display control unit 78 may be realized by a Field-Programmable Gate Array (FPGA). In addition, the image processing unit 66 may be realized by a computer including a Central Processing Unit (CPU), a Read Only Memory (ROM), and a Random Access Memory (RAM). In addition, the display control unit 78 may also be realized by a computer including a CPU, a ROM, and a RAM. Further, each of the image processing unit 66 and the display control unit 78 may be realized by a combination of a hardware configuration and a software configuration.

The main control unit 62 controls the imaging element driver 74 to cause the imaging element 60 to perform exposure for each frame in a case where an instruction for capturing a still image is received by the release button under a still image imaging mode. The main control unit 62 acquires an image signal, which is obtained by performing the exposure for each frame, from the image processing unit 66 and performs compression processing on the acquired image signal to generate a still image file having a specific still image format. Meanwhile, here, the specific still image format refers to, for example, Joint Photographic Experts Group (JPEG).

The main control unit 62 acquires an image signal, which is output to the display control unit 78 as a signal for a live view image by the image processing unit 66, for each frame at a specific frame rate in a case where an instruction for capturing a moving image is received by the release button under a movie imaging mode. The main control unit 62 performs compression processing on the image signal acquired from the image processing unit 66 to generate a moving image file having a specific moving image format. Meanwhile, here, the specific moving image format refers to, for example, Moving Picture Experts Group (MPEG). Meanwhile, hereinafter, for convenience of description, the still image file and the moving image file will be referred to as an image file in a case where it is not necessary to give a description by distinguishing between the image files.

The media I/F 82 is connected to the memory card 92, and performs the recording and read-out of the image file on the memory card 92 under the control of the main control unit 62. Meanwhile, the image file which is read out from the memory card 92 by the media I/F 82 is subjected to extension processing by the main control unit 62 to be displayed on the display unit 86 as a reproduced image.

Meanwhile, the main control unit 62 stores distance information, which is input from the distance measurement control unit 68, in the memory card 92 through the media I/F 82 in association with the image file. The distance information is read out together with the image file by the main control unit 62 from the memory card 92 through the media I/F 82, and a distance indicated by the read-out distance information is displayed on the display unit 86 together with the reproduced image based on the associated image file.

The distance measurement control unit 68 controls the distance measurement unit 12 under the control of the main control unit 62. Meanwhile, in this embodiment, the distance measurement control unit 68 is realized by an ASIC, but the technique of this disclosure is not limited thereto. For example, the distance measurement control unit 68 may be realized by a FPGA. In addition, the distance measurement control unit 68 may be realized by a computer including a CPU, a ROM, and a RAM. Further, the distance measurement control unit 68 may be realized by a combination of a hardware configuration and a software configuration.

The hot shoe 20 is connected to the bus line 84, and the distance measurement control unit 68 controls the LD driver 34 to control the emission of a laser beam by the LD 30 under the control of the main control unit 62 and acquires a light receiving signal from the light receiving signal processing circuit 40. The distance measurement control unit 68 derives a distance to the subject on the basis of a timing when the laser beam is emitted and a timing when the light receiving signal is acquired, and outputs distance information indicating the derived distance to the main control unit 62.

Here, the measurement of a distance to the subject by the distance measurement control unit 68 will be described in more detail.

Figure 3:
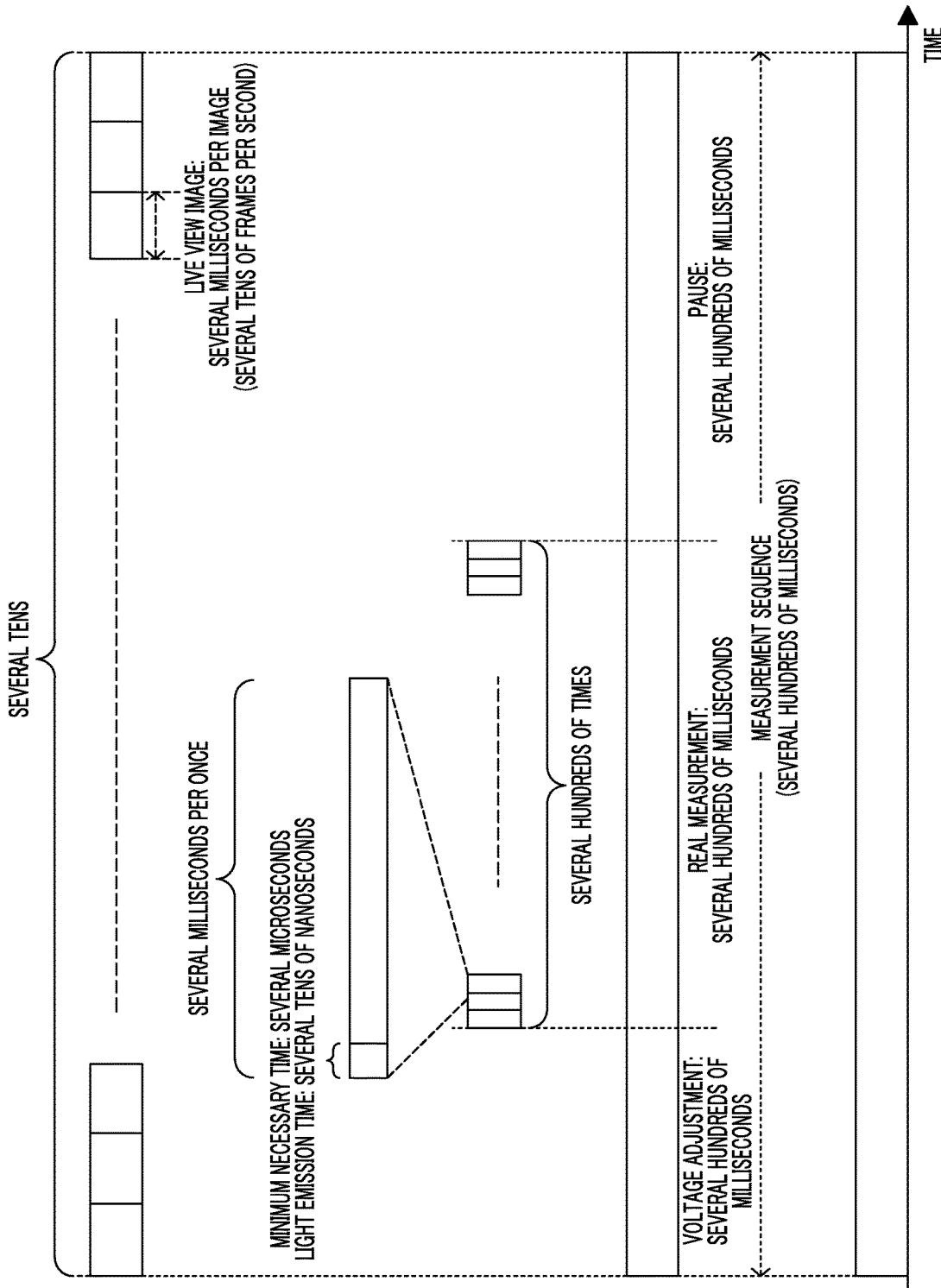
FIG. 3 is a time chart illustrating an example of a measurement sequence of the distance measurement device according to the first to eighth embodiments.

As illustrated in FIG. 3 as an example, one measurement sequence by the distance measurement device 10A is specified by a voltage adjustment period, a real measurement period, and a pause period.

The voltage adjustment period is a period in which driving voltages of the LD 30 and the PD 36 are adjusted. The real measurement period is a period in which a distance to the subject is actually measured. In the real measurement period, an operation of causing the LD 30 to emit a laser beam and causing the PD 36 to receive the reflected laser beam is repeated several hundred times, and a distance to the subject is derived on the basis of a timing when the laser beam is emitted and a timing when the light receiving signal is acquired. The pause period is a period for stopping the driving of the LD 30 and the PD 36. Accordingly, in one measurement sequence, the measurement of a distance to the subject is performed several hundred times.

Meanwhile, in this embodiment, each of the voltage adjustment period, the real measurement period, and the pause period is set to be several hundred milliseconds.

Figure 4:
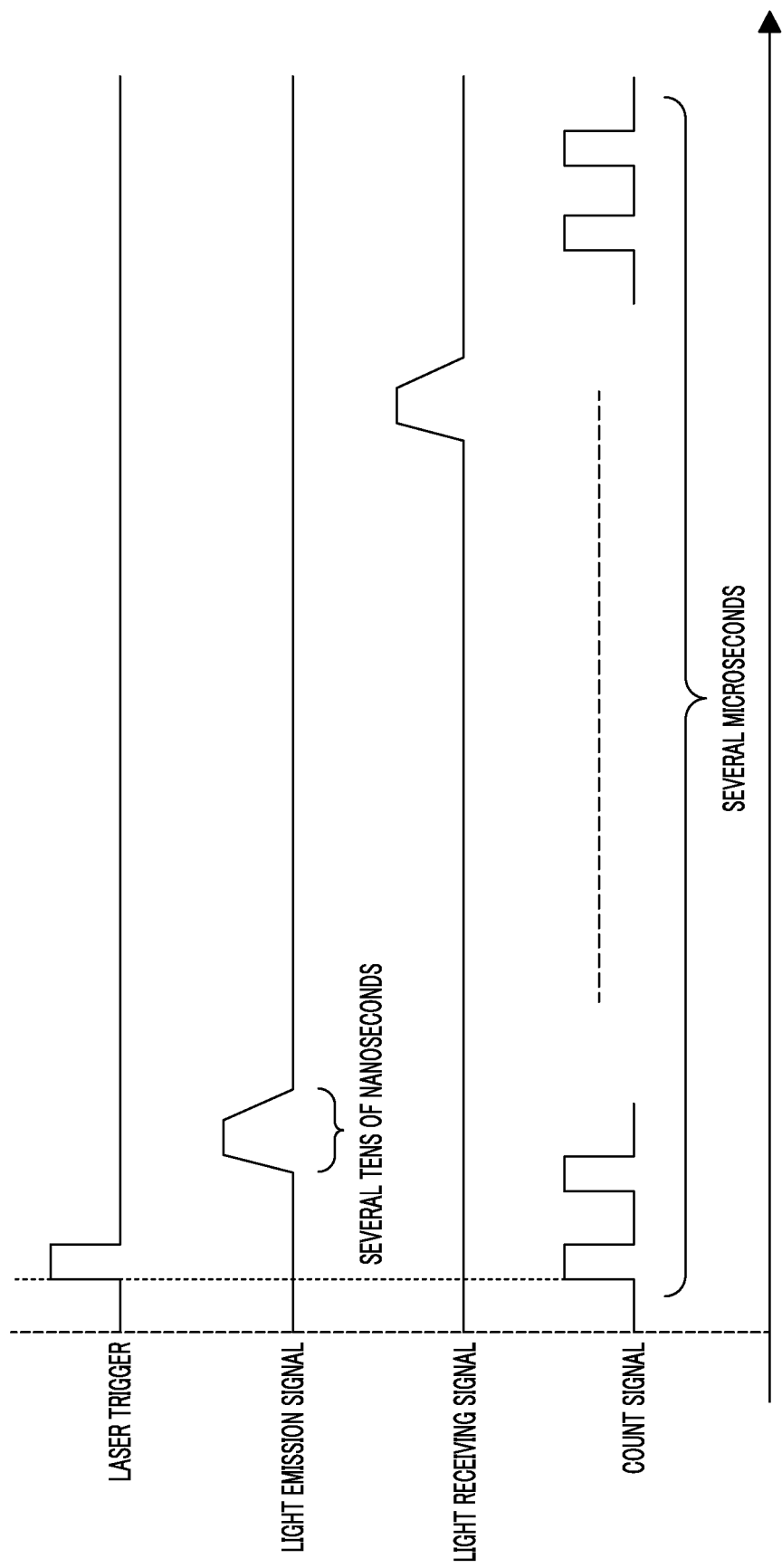
FIG. 4 is a time chart illustrating an example of a laser trigger, a light emission signal, a light receiving signal, and a count signal which are required in a case where measurement is performed once by the distance measurement device according to the first to eighth embodiments.

As illustrated in FIG. 4 as an example, a count signal for specifying a timing when the distance measurement control unit 68 gives an instruction for emitting a laser beam and a timing when a light receiving signal is acquired is provided to the distance measurement control unit 68. In this embodiment, the count signal is generated by the main control unit 62 and is supplied to the distance measurement control unit 68. However, the invention is not limited thereto, and the count signal may be generated by a dedicated circuit, such as a time counter, which is connected to the bus line 84, and may be supplied to the distance measurement control unit 68.

The distance measurement control unit 68 outputs a laser trigger for emitting a laser beam to the LD driver 34 in accordance with the count signal. The LD driver 34 drives the LD 30 to emit a laser beam in accordance with the laser trigger.

In the example illustrated in FIG. 4, a light emission time of a laser beam is set to be several tens of nanoseconds. In this case, a time until the laser beam, which is emitted toward a subject positioned several kilometers ahead by the emitting unit 22, is received by the PD 36 as a reflected laser beam is set to be "several kilometers×2/speed of light"=several microseconds. Therefore, as illustrated in FIG. 3 as an example, a time of several microseconds is required as a minimum necessary time in order to measure a distance to the subject positioned several kilometers ahead.

Meanwhile, in this embodiment, as illustrated in FIG. 3 as an example, one measurement time is set to be several milliseconds in consideration of a reciprocating time of the laser beam, and the like. However, the reciprocating time of the laser beam varies depending on a distance to the subject, and thus one measurement time may vary in accordance with an assumed distance.

In a case where a distance to the subject is derived on the basis of measured values obtained from several hundred times of measurement in one measurement sequence, the distance measurement control unit 68 analyzes, for example, a histogram of the measured values obtained from several hundred times of measurement to derive a distance to the subject.

Figure 5:
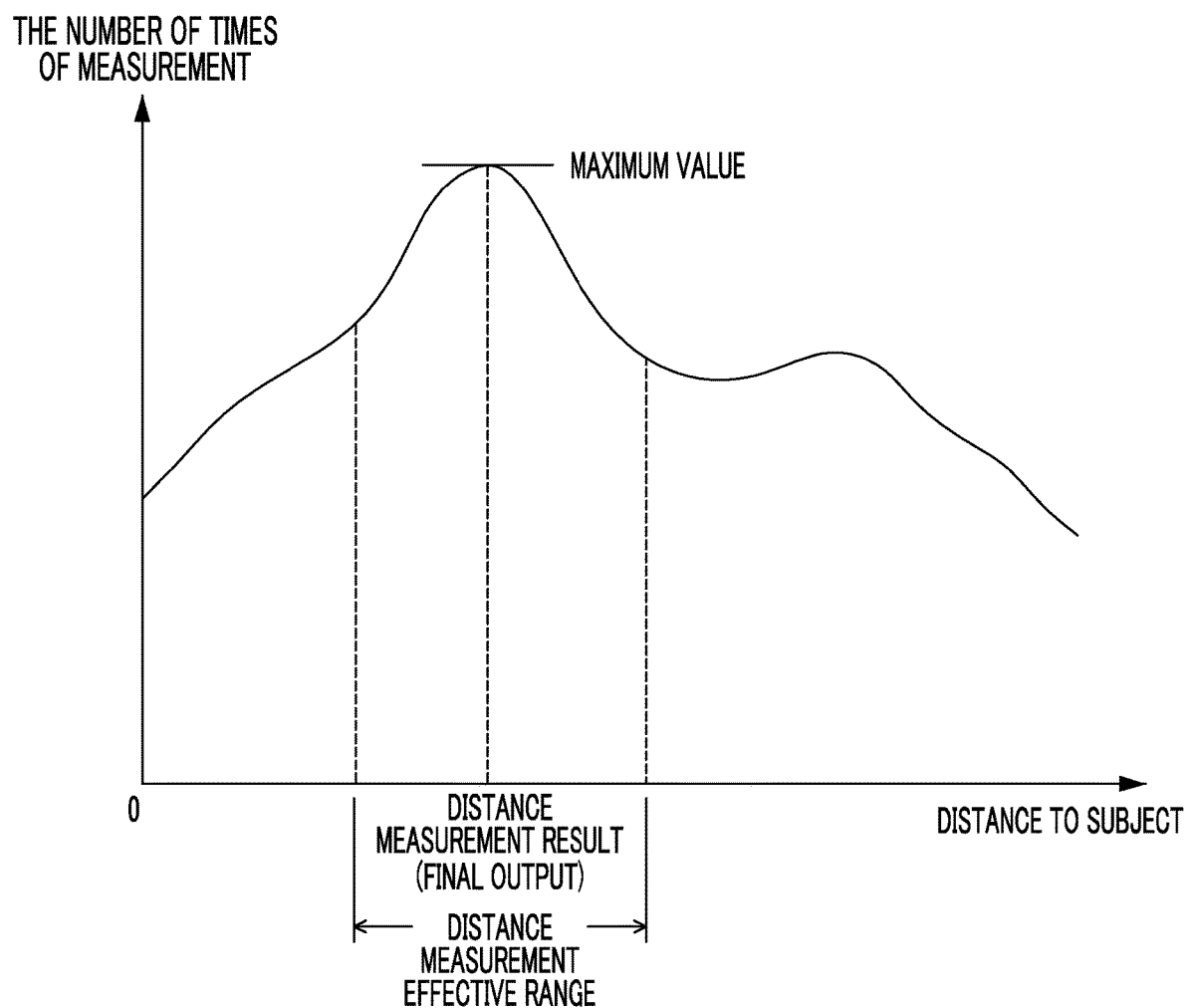
FIG. 5 is a graph illustrating an example of a histogram (histogram in a case where a distance (measured value) to a subject is represented by a lateral axis and the number of times of measurement is represented by a vertical axis) of measured values obtained by the measurement sequence of the distance measurement device according to the first to eighth embodiments.

As illustrated in FIG. 5 as an example, in a histogram of measured values obtained from several hundred times of measurement in one measurement sequence, the lateral axis represents a distance to a subject, the vertical axis represents the number of times of measurement, and a distance corresponding to a maximum value of the number of times of measurement is derived by the distance measurement control unit 68 as a distance measurement result. Meanwhile, the histogram illustrated in FIG. 5 is just an example, and a histogram may be generated on the basis of a reciprocating time (an elapsed time from the emission of light to the reception of light) of a laser beam, half of the reciprocating time of the laser beam, or the like, instead of the distance to the subject.

Figure 6:
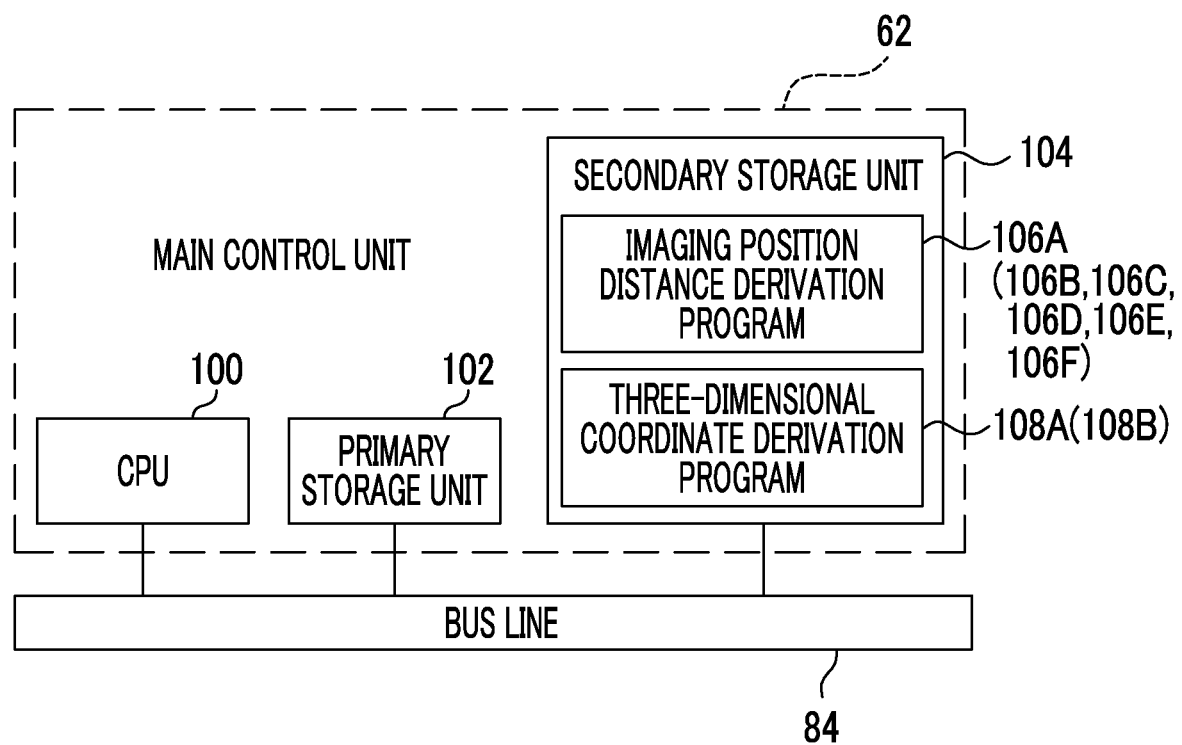
FIG. 6 is a block diagram illustrating an example of a hardware configuration of a main control unit included in the distance measurement device according to the first to sixth embodiments.

As illustrated in FIG. 6 as an example, the main control unit 62 includes a CPU 100, a primary storage unit 102, and a secondary storage unit 104 which are examples of an acquisition unit, a derivation unit, and an execution unit according to the technique of this disclosure. The CPU 100 controls the entire distance measurement device 10A. The primary storage unit 102 is a volatile memory which is used as a work area during the execution of various programs, and the like. An example of the primary storage unit 102 is a RAM. The secondary storage unit 104 is a non-volatile memory that stores control programs, various parameters, or the like for controlling the operation of the distance measurement device 10A. An example of the secondary storage unit 104 is an Electrically Erasable Programmable Read Only Memory (EEPROM), a flash memory, or the like. The CPU 100, the primary storage unit 102, and the secondary storage unit 104 are connected to each other through the bus line 84.

The distance measurement device 10A has a three-dimensional coordinate derivation function. The three-dimensional coordinate derivation function refers to a function of deriving designated pixel three-dimensional coordinates to be described later, on the basis of Expression (1) from first designated pixel coordinates to be described later, second designated pixel coordinates to be described later, an imaging position distance to be described later, a focal length of the imaging lens 50, and the dimension of the imaging pixel 60A1.

$$X = \frac{B}{u_L - u_R} u_L, Y = \frac{B}{u_L - u_R} v_L, Z = \frac{B}{u_L - u_R} f \quad (1)$$

Meanwhile, in Expression (1), "$u_L$" denotes an X coordinate of the first designated pixel coordinates. In Expression (1), "$v_L$" denotes a Y coordinate of the first designated pixel coordinates. In Expression (1), "$u_R$" denotes an X coordinate of the second designated pixel coordinates. In Expression (1), "B" denotes the imaging position distance (see FIGS. 7 and 8). In Expression (1), "f" denotes (focal length of the imaging lens 50)/(dimension of the imaging pixel 60A1). In Expression (1), (X, Y, Z) denotes the designated pixel three-dimensional coordinates.

The first designated pixel coordinates are two-dimensional coordinates for specifying a first designated pixel which is designated as a pixel corresponding to a position on the real space in a first captured image to be described later. The second designated pixel coordinates are two-dimensional coordinates for specifying a second designated pixel which is designated as a pixel corresponding to a position on the real space in a second captured image to be described later. That is, the first designated pixel and the second designated pixel are pixels that are designated as pixels of which the positions on the real space correspond to each other, and are pixels capable of being specified at the positions corresponding to each other in each of the first captured image and the second captured image. The first designated pixel coordinates are two-dimensional coordinates on the first captured image, and the second designated pixel coordinates are two-dimensional coordinates on the second captured image.

The designated pixel three-dimensional coordinates refer to three-dimensional coordinates which are coordinates on the real space which correspond to the first designated pixel coordinates and the second designated pixel coordinates.

Figure 7:
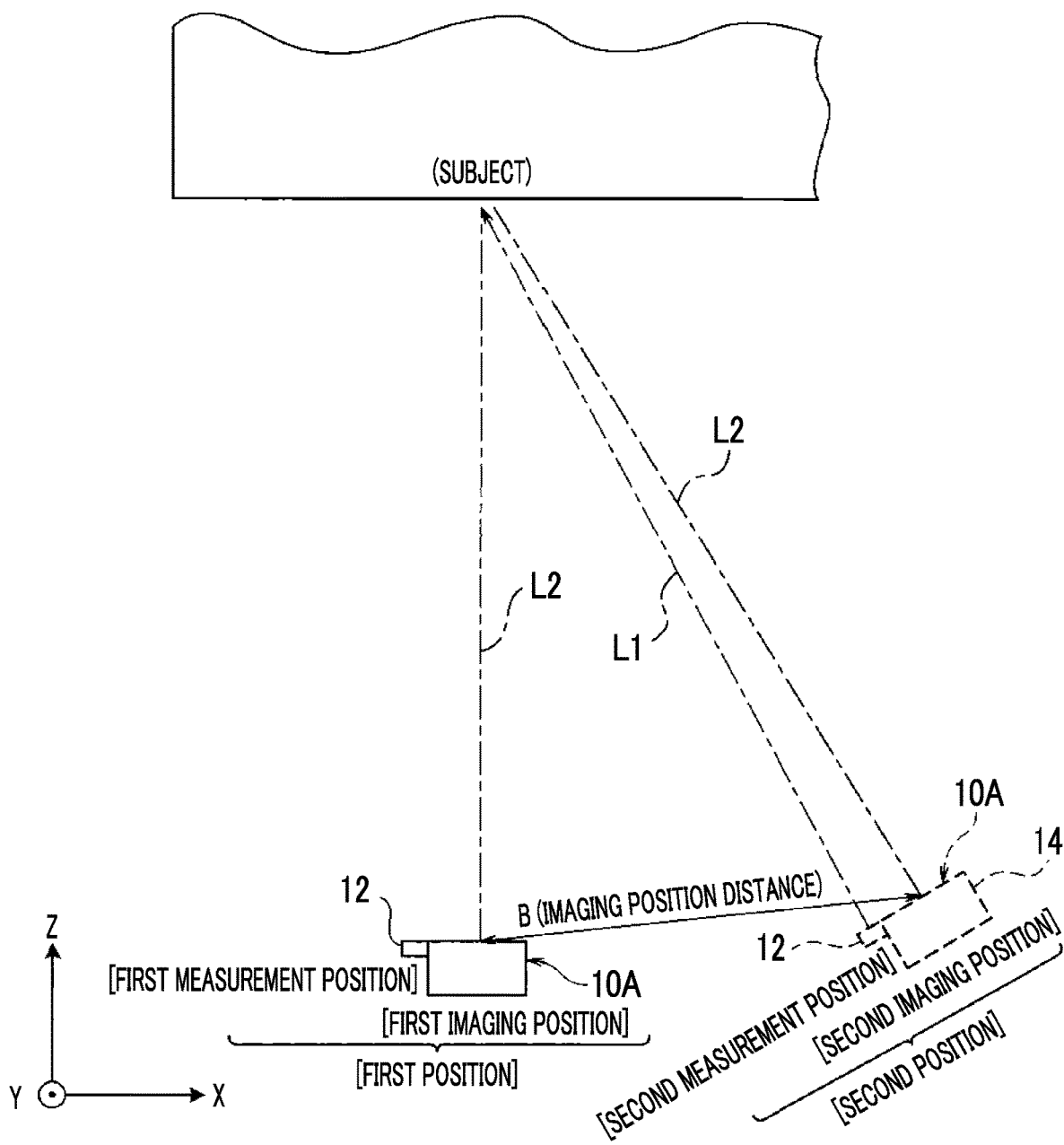
FIG. 7 is a schematic plan view illustrating an example of a positional relationship between the distance measurement device and the subject according to the first to sixth embodiments and the eighth embodiment.
Figure 8:
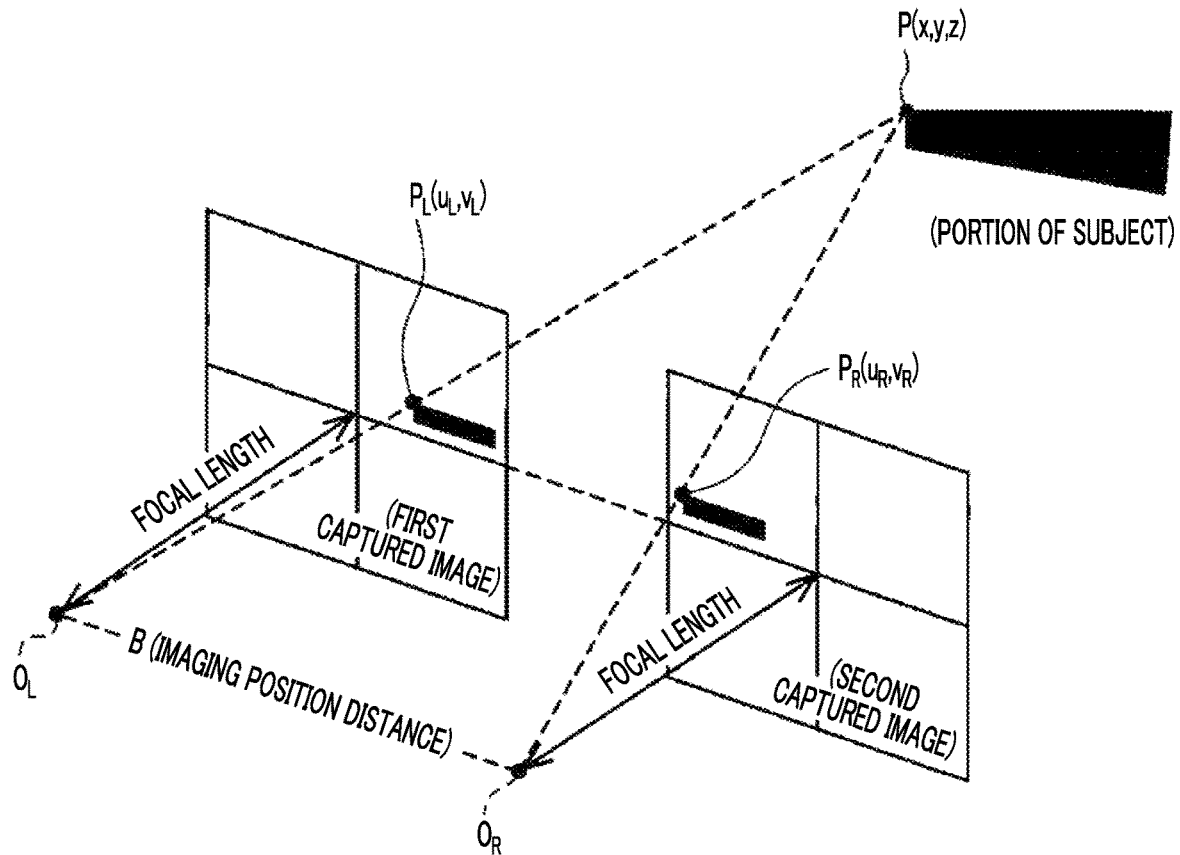
FIG. 8 is a conceptual diagram illustrating an example of a positional relationship between a portion of the subject, a first captured image, a second captured image, a principal point of an imaging lens at a first imaging position, and a principal point of the imaging lens at a second imaging position.

Here, as illustrated in FIGS. 7 and 8 as examples, the first captured image refers to a captured image obtained by imaging the subject by the imaging device 14 from the first imaging position. In addition, as an example, as illustrated in FIGS. 7 and 8, the second captured image indicates a captured image obtained by imaging a subject, including the subject imaged from the first imaging position, by the imaging device 14 from the second imaging position different from the first imaging position. Meanwhile, the invention is not limited to the first captured image and the second captured image. In this embodiment, for convenience of description, captured images obtained by the imaging of the imaging device 14, inclusive of a still image and a moving image, will be simply referred to as a "captured image" in a case where it is not necessary to give a description by distinguishing between the captured images.

Meanwhile, in the example illustrated in FIG. 7, a first measurement position and a second measurement position are shown as positions of the distance measurement unit 12. The first measurement position indicates the position of the distance measurement unit 12 in a case where the subject is imaged by the imaging device 14 from the first imaging position in a state where the distance measurement unit 12 is correctly attached to the imaging device 14. The second measurement position refers to the position of the distance measurement unit 12 in a case where the subject is imaged by the imaging device 14 from the second imaging position in a state where the distance measurement unit 12 is correctly attached to the imaging device 14.

The imaging position distance refers to a distance between the first imaging position and the second imaging position. As illustrated in FIG. 8, an example of the imaging position distance is a distance between a principal point OL of the imaging lens 50 of the imaging device 14 at the first imaging position and a principal point OR of the imaging lens 50 of the imaging device 14 at the second imaging position, but the technique of this disclosure is not limited thereto. For example, a distance between the imaging pixel 60A1 positioned in the middle of the imaging element 60 of the imaging device 14 at the first imaging position and the imaging pixel 60A1 positioned in the middle of the imaging element 60 of the imaging device 14 at the second imaging position may be set to be an imaging position distance.

In the example illustrated in FIG. 8, a pixel PL included in the first captured image is a first designated pixel, a pixel PR included in the second captured image is a second designated pixel, and pixels PL and PR are pixels corresponding to a point P of the subject. Accordingly, first designated pixel coordinates ($u_L$, $v_L$) which are two-dimensional coordinates of the pixel PL and second designated pixel coordinates ($u_R$, $v_R$) which are two-dimensional coordinates of the pixel PR correspond to designated pixel three-dimensional coordinates (X, Y, Z) which are three-dimensional coordinates of the point P. Meanwhile, in Expression (1), "$v_R$" is not used.

Meanwhile, hereinafter, for convenience of description, the first designated pixel and the second designated pixel will be referred to as a "designated pixel" in a case where it is not necessary to give a description by distinguishing between the designated pixels. In addition, hereinafter, for convenience of description, the first designated pixel coordinates and the second designated pixel coordinates will be referred to as "designated pixel coordinates" in a case where it is not necessary to give a description by distinguishing between the designated pixel coordinates.

Incidentally, in a case where designated pixel three-dimensional coordinates are derived on the basis of Expression (1) by the distance measurement device 10A operating a three-dimensional coordinate derivation function, it is preferable to derive an imaging position distance with a high level of accuracy. This is because "B" which is an imaging position distance is included in Expression (1).

Consequently, in the distance measurement device 10A, as illustrated in FIG. 6 as an example, the secondary storage unit 104 stores an imaging position distance derivation program 106A which is an example of a program according to the technique of this disclosure.

The CPU 100 reads out the imaging position distance derivation program 106A from the secondary storage unit 104 and develops the read-out program to the primary storage unit 102 to execute the imaging position distance derivation program 106A.

In addition, as illustrated in FIG. 6 as an example, the secondary storage unit 104 stores a three-dimensional coordinate derivation program 108A. The CPU 100 reads out the three-dimensional coordinate derivation program 108A from the secondary storage unit 104 and develops the read-out program to the primary storage unit 102 to execute the three-dimensional coordinate derivation program 108A.

Figure 9:
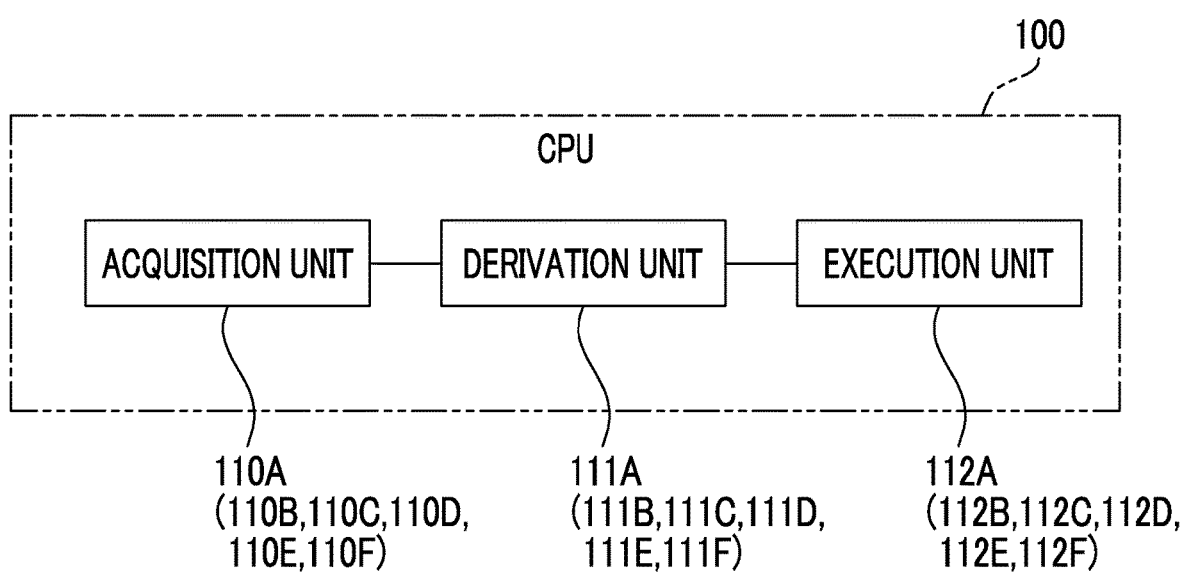
FIG. 9 is a block diagram illustrating an example of a main function of a CPU according to the first to eighth embodiments.

The CPU 100 executes the imaging position distance derivation program 106A, and is thus operated as an acquisition unit 110A, a derivation unit 111A, and an execution unit 112A as illustrated in FIG. 9 as an example.

The acquisition unit 110A acquires a first captured image, a moving image, and a distance to the subject. Here, the "distance to the subject" refers to a distance to the subject which is measured on the basis of the laser beam emitted by the distance measurement unit 12 at the second measurement position while the moving image is captured. In addition, the moving image acquired by the acquisition unit refers to plural second captured images obtained at a specific frame rate. For this reason, for example, in a case where the frame rate is 30 frames per second, 30 second captured images are acquired by the acquisition unit 110A for one second.

In addition, the distance to the subject which is acquired by the acquisition unit 110A refers to a distance to the subject which is measured by emitting a laser beam to the subject and receiving reflected light of the laser beam, whenever a plurality of second captured images are captured.

Figure 10:
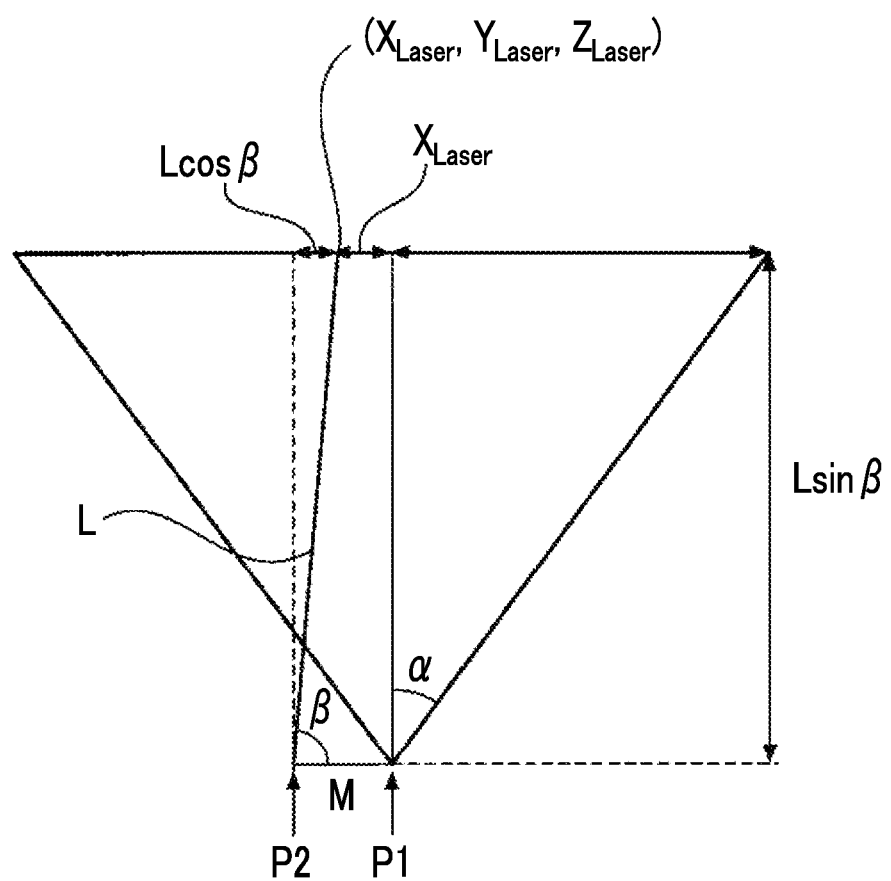
FIG. 10 is a diagram illustrating a method of deriving irradiation position real space coordinates according to the first to eighth embodiments.

The derivation unit 111A derives irradiation position real space coordinates for specifying an irradiation position of a laser beam on the real space, that is, an irradiation position of the laser beam on the real space with respect to the subject, on the basis of the distance acquired by the acquisition unit 110A with respect to each of the plurality of second captured images acquired by the acquisition unit 110A. The irradiation position real space coordinates are three-dimensional coordinates, and are derived on the basis of the following Expression (2) from a distance L, a half angle of view α, an emission angle β, and a distance between reference points M which are illustrated in FIG. 10 as an example. In Expression (2), ($x_{Laser}$, $y_{Laser}$, $z_{Laser}$) denotes irradiation position real space coordinates.

$$x_{Laser} = \frac{(M - L\cos\beta)}{L\tan\alpha\sin\beta}, y_{Laser} = 0, z_{Laser} = L\sin\beta \qquad (2)$$

In Expression (2), the relation of $y_{Laser}$=0 is established, but this means that the height of an optical axis L1 is the same as the height of an optical axis L2 in the vertical direction. In a case where the position of a laser beam emitted to the subject is higher than the position of the optical axis L2 in the subject in the vertical direction, $y_{Laser}$ is set to have a positive value. In a case where the position of the laser beam emitted to the subject is lower than the position of the optical axis L2 in the subject in the vertical direction, $y_{Laser}$ is set to have a negative value. Meanwhile, hereinafter, for convenience of description, a description will be given on the assumption that the relation of "$y_{Laser}$=0" is established.

Here, as illustrated in FIG. 10 as an example, the half angle of view α refers to half an angle of view. The emission angle β refers to an angle at which a laser beam is emitted from the emitting unit 22. The distance between reference points M refers to a distance between a first reference point P1 specified for the imaging device 14 and a second reference point P2 specified for the distance measurement unit 12. An example of the first reference point P1 is a principal point of the imaging lens 50. An example of the second reference point P2 is a point which is set in advance as the starting point of coordinates capable of specifying the position of a three-dimensional space in the distance measurement unit 12. Specifically, an example of the second reference point is one end out of right and left ends of the objective lens 38 in a front view, or one angle, that is, one apex of a housing in a case where the housing (not shown) of the distance measurement unit 12 has a rectangular parallelepiped shape.

The derivation unit 111A derives irradiation position pixel coordinates on the basis of the distance acquired by the acquisition unit 110A with respect to each of the plurality of second captured images included in the moving image acquired by the acquisition unit 110A. The irradiation position pixel coordinates refer to coordinates for specifying the position of a pixel corresponding to the irradiation position of the laser beam on the real space with respect to the subject. Meanwhile, here, "the irradiation position of the laser beam on the real space with respect to the subject" refers to, for example, an irradiation position which is specified by the irradiation position real space coordinates.

In addition, here, "the plurality of second captured images included in the moving image acquired by the acquisition unit 110A" refers to, for example, second captured images of all frames included in the moving image, but the technique of this disclosure is not limited thereto. For example, "the plurality of second captured images included in the moving image acquired by the acquisition unit 110A" may be a plurality of second captured images which are acquired for every plurality of predetermined frames (for example, two frames). In addition, "the plurality of second captured images included in the moving image acquired by the acquisition unit 110A" may be a plurality of second captured images which are randomly selected from the second captured images included in the moving image.

The irradiation position pixel coordinates are roughly classified into first irradiation position pixel coordinates and second irradiation position pixel coordinates. The first irradiation position pixel coordinates are two-dimensional coordinates for specifying the position of a pixel which corresponds to the irradiation position specified by the irradiation position real space coordinates in the first captured image. The second irradiation position pixel coordinates are two-dimensional coordinates for specifying the position of a pixel which corresponds to the irradiation position specified by the irradiation position real space coordinates in the second captured image. Meanwhile, the first irradiation position pixel coordinates can also be referred to as two-dimensional coordinates for specifying the position of a pixel which corresponds to the position of the pixel specified by the second irradiation position pixel coordinates and which is the position of a pixel in the first captured image.

Meanwhile, the first irradiation position pixel coordinates are an example of "irradiation position correspondence pixel coordinates" according to the technique of this disclosure, and the second irradiation position pixel coordinates are an example of "irradiation position pixel coordinates" according to the technique of this disclosure. In addition, hereinafter, for convenience of description, the first irradiation position pixel coordinates and the second irradiation position pixel coordinates will be referred to as "irradiation position pixel coordinates" in a case where it is not necessary to give a description by distinguishing between the first and second irradiation position pixel coordinates. In addition, a derivation method for the X coordinate of the second irradiation position pixel coordinates and a derivation method for the Y coordinate of the second irradiation position pixel coordinates differ only in a target coordinate axis, and have the same principle of the derivation method. That is, the derivation methods are different from each other in that the derivation method for the X coordinate of the second irradiation position pixel coordinates is a derivation method targeted at a pixel in a row direction in the imaging element 60, while the derivation method for the Y coordinate of the second irradiation position pixel coordinates is a derivation method targeted at a pixel in a column direction in the imaging element 60. For this reason, hereinafter, for convenience of description, the derivation method for the X coordinate of the second irradiation position pixel coordinates will be described, and the derivation method for the Y coordinate of the second irradiation position pixel coordinates will not be described. Meanwhile, the row direction means the lateral direction in a front view of the imaging surface of the imaging element 60, and the column direction means the vertical direction in a front view of the imaging surface of the imaging element 60.

Figure 11:
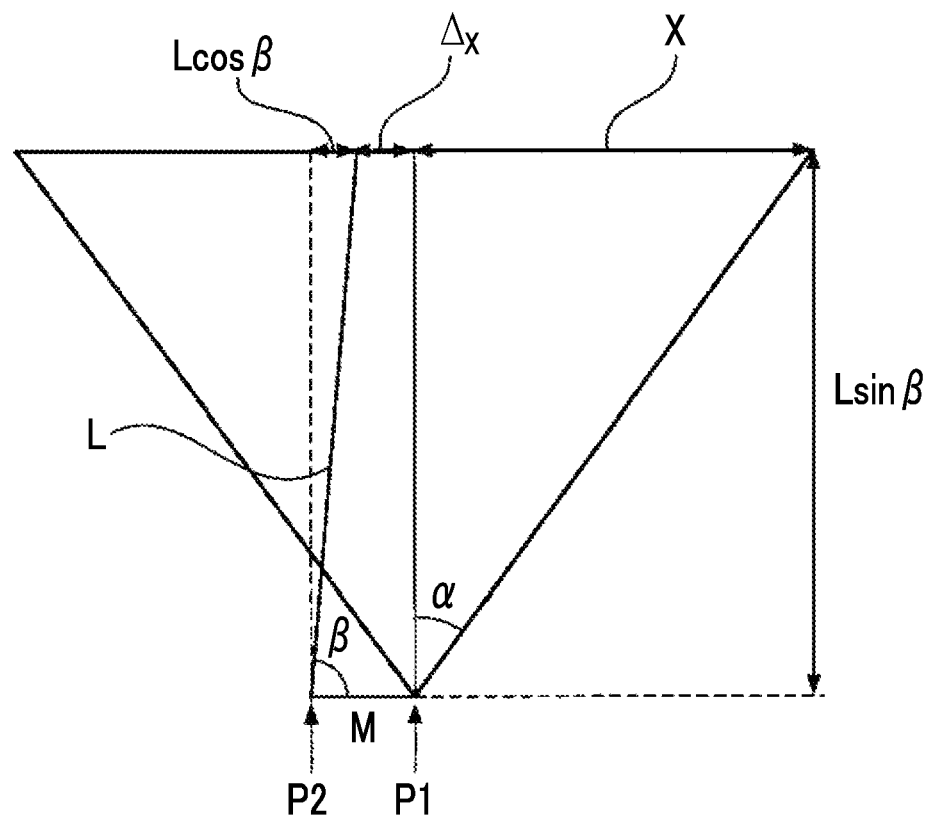
FIG. 11 is a diagram illustrating a method of deriving second irradiation position pixel coordinates according to the first to eighth embodiments.

The X coordinate of the second irradiation position pixel coordinates is derived on the basis of the following Expressions (3) to (5) from a distance L, a half angle of view α, an emission angle β, and a distance between reference points M which are illustrated in FIG. 11 as an example. Meanwhile, in Expression (5), "pixel in row direction at irradiation position" refers to a pixel at a position corresponding to an irradiation position of a laser beam on the real space among pixels in the row direction in the imaging element 60. In addition, "half of the number of pixels in row direction" refers to a half of the number of pixels in the row direction in the imaging element 60.

$$\Delta x = M - L \cos \beta \quad (3)$$

$$X = L \tan \alpha \sin \beta \quad (4)$$

(Pixel in Row Direction at Irradiation Position):(Half of the Number of Pixels in Row Direction)=

$$\Delta x : X \quad (5)$$

The derivation unit 111A substitutes the distance between reference points M and the emission angle β for Expression (3), substitutes the half angle of view α and the emission angle β for Expression (4), and substitutes the distance L for Expression (3) and Expression (4). The derivation unit 111A substitutes Δx and X, which are obtained in this manner, and the above-described "half of the number of pixels in row direction" for Expression (5) to derive an X coordinate which is a coordinate for specifying the position of the "pixel in row direction at irradiation position". The X coordinate for specifying the position of the "pixel in row direction at irradiation position" is the X coordinate of the second irradiation position pixel coordinates.

The derivation unit 111A derives coordinates for specifying the position of a pixel corresponding to the position of the pixel specified by the second irradiation position pixel coordinates, among pixels of the first captured image, as first irradiation position pixel coordinates.

The execution unit 112A executes a predetermined process as a process executed in a position specifiable state, in a case of a position specifiable state with respect to each of the plurality of second captured images included in the moving image acquired by the acquisition unit 110A. Here, the position specifiable state refers to a state where the position of the pixel which is specified by the second irradiation position pixel coordinates is the position of a pixel which is specifiable at positions corresponding to each other in the respective first and second captured images.

In addition, the execution unit 112A executes a predetermined process as a process executed in a position unspecifiable state, in a case of a position unspecifiable state with respect to each of the plurality of second captured images included in the moving image acquired by the acquisition unit 110A. Here, the position unspecifiable state refers to a state where the position of a pixel specified by second irradiation position pixel coordinates is the position of a pixel different from a pixel which is specifiable at positions corresponding to each other in the respective second and first captured images.

An example of the predetermined process as the process executed in a position specifiable state is a process including a first derivation process to be described later. In addition, an example of the predetermined process as the process executed in a position unspecifiable state is a process including a second derivation process to be described later.

Here, the second derivation process refers to a process of deriving an imaging position distance on the basis of a plurality of pixel coordinates, irradiation position real space coordinates, a focal length of the imaging lens 50, and dimensions of the imaging pixel 60A1 which are described later. The plurality of pixel coordinates refer to a plurality of two-dimensional coordinates for specifying a plurality of pixels which are present in the same planar region as an irradiation position of a laser beam on the real space and which are equal to or more than three pixels specifiable at positions corresponding to each other in the respective first and second captured images acquired by the acquisition unit 110A. Meanwhile, parameters used for the second derivation process are not limited to the plurality of pixel coordinates, the irradiation position real space coordinates, the focal length of the imaging lens 50, and the dimensions of the imaging pixel 60A1. For example, a plurality of parameters obtained by further adding one or more parameters for fine adjustment to the plurality of pixel coordinates, the irradiation position real space coordinates, the focal length of the imaging lens 50, and the dimensions of the imaging pixel 60A1 may be used in the first derivation process.

In addition, the first derivation process refers to a process of deriving an imaging position distance on the basis of the irradiation position pixel coordinates, the irradiation position real space coordinates, the focal length of the imaging lens 50, and the dimensions of the imaging pixel 60A1. Meanwhile, parameters used for the first derivation process are not limited to the irradiation position pixel coordinates, the irradiation position real space coordinates, the focal length of the imaging lens 50, and the dimensions of the imaging pixel 60A1. For example, a plurality of parameters obtained by further adding one or more parameters for fine adjustment to the irradiation position pixel coordinates, the irradiation position real space coordinates, the focal length of the imaging lens 50, and the dimensions of the imaging pixel 60A1 may be used in the second derivation process.

In addition, the first derivation process is a process capable of deriving an imaging position distance with a higher level of accuracy than the second derivation process in a case where the real irradiation position of a laser beam is a position on the real space which corresponds to the position of a pixel which is specifiable at positions corresponding to each other in the respective first and second captured images. In addition, the first derivation process is a process capable of deriving an imaging position distance on the basis of a smaller number of parameters than the number of parameters used in the derivation of the imaging position distance by the second derivation process. Meanwhile, the "plurality of parameters" as mentioned herein refers to, for example, the irradiation position pixel coordinates, the irradiation position real space coordinates, the focal length of the imaging lens 50, and the dimensions of the imaging pixel 60A1.

In a case where the execution unit 112A executes the second derivation process, the execution unit 112A derives the direction of a plane specified by a plane equation indicating a plane including three-dimensional coordinates on the real space which correspond to a plurality of pixel coordinates, on the basis of the plurality of pixel coordinates, the focal length of the imaging lens 50, and the dimensions of the imaging pixel 60A1. The execution unit 112A decides the plane equation on the basis of the derived direction of the plane and the irradiation position real space coordinates, and derives an imaging position distance on the basis of the decided plane equation, the plurality of pixel coordinates, the focal length of the imaging lens 50, and the dimensions of the imaging pixel 60A1.

Meanwhile, the plane equation used for the derivation of the imaging position distance is specified by the following Expression (6). Therefore, the derivation of "the direction of the plane" means the derivation of a, b, and c in Expression (6), and the decision of "the plane equation" means the decision of a, b, c, and d of the plane equation by deriving d in Expression (6), $$ax+by+cz+d=0 \tag{6}$$

Next, operations of portions of the distance measurement device 10A according to the technique of this disclosure will be described.

First, reference will be made to FIG. 12 to describe an imaging position distance derivation process realized by the CPU 100 executing the imaging position distance derivation program 106A in a case where the three-dimensional coordinate derivation button 90G is turned on.

Figure 17:
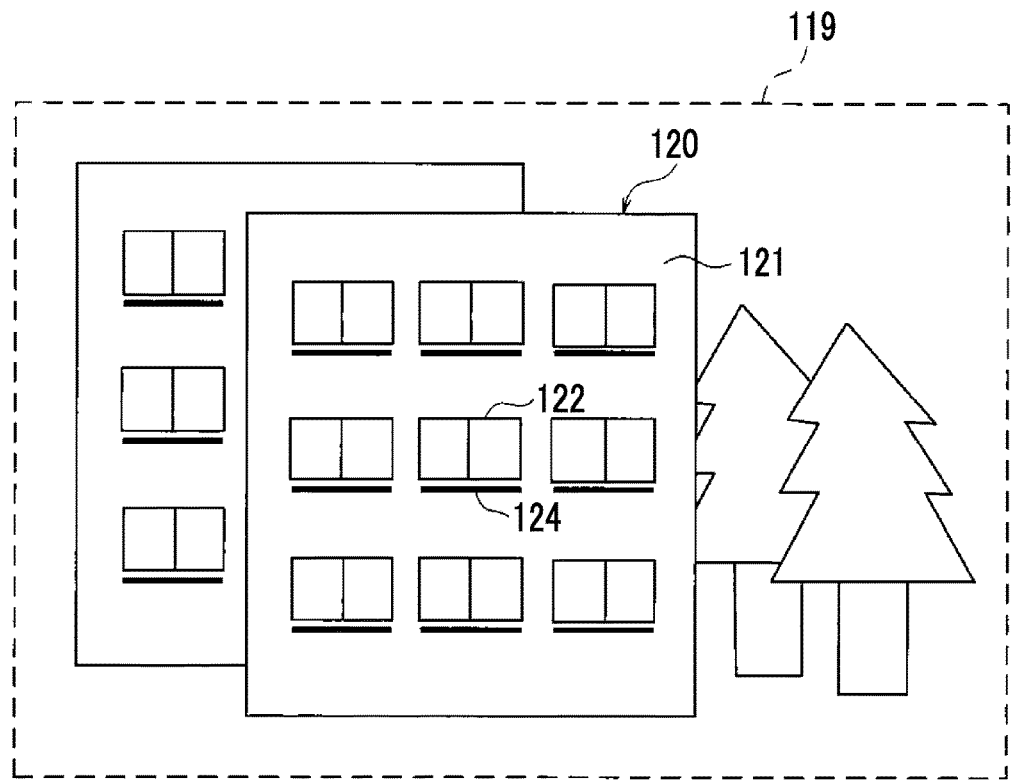
FIG. 17 is a conceptual diagram illustrating an example of a subject included in an imaging range of an imaging device according to the first to eighth embodiments.

Meanwhile, hereinafter, for convenience of description, a description will be given on the assumption that a region including an outer wall surface 121 of an office building 120 is included as a subject in an imaging range 119 of the imaging device 14 of the distance measurement device 10A, as illustrated in FIG. 17 as an example. In addition, a description will be given on the assumption that the outer wall surface 121 is a main subject and is an object to be irradiated with a laser beam.

In addition, the outer wall surface 121 is formed to have a planar shape, and is an example of a planar region according to the technique of this disclosure. In addition, as illustrated in FIG. 17 as an example, a plurality of windows 122 having a quadrilateral shape are provided on the outer wall surface 121. In addition, as illustrated in FIG. 17 as an example, a pattern 124 having a laterally long rectangular shape is drawn below each window 122 on the outer wall surface 121. However, the invention is not limited thereto, and dirt attached to the outer wall surface 121, a crack, or the like may be used.

Meanwhile, in this embodiment, the "planar shape" includes not only a plane but also a planar shape in a range allowing slight irregularities due to the window, a ventilating opening, or the like, and may be, for example, a plane or a planar shape which is recognized as a "planar shape" by visual observation or the existing image analysis technique.

In addition, hereinafter, for convenience of description, a description will be given on the assumption that a distance to the outer wall surface 121 is measured by the distance measurement device 10A by a laser beam being emitted to the outer wall surface 121. In addition, hereinafter, for convenience of description, the position of the distance measurement device 10A in a case where the distance measurement unit 12 is positioned at a first measurement position and the imaging device 14 is positioned at a first imaging position will be referred to as a "first position". In addition, hereinafter, for convenience of description, the position of the distance measurement device 10A in a case where the distance measurement unit 12 is positioned at a second measurement position and the imaging device 14 is positioned at a second imaging position will be referred to as a "second position".

Figure 12:
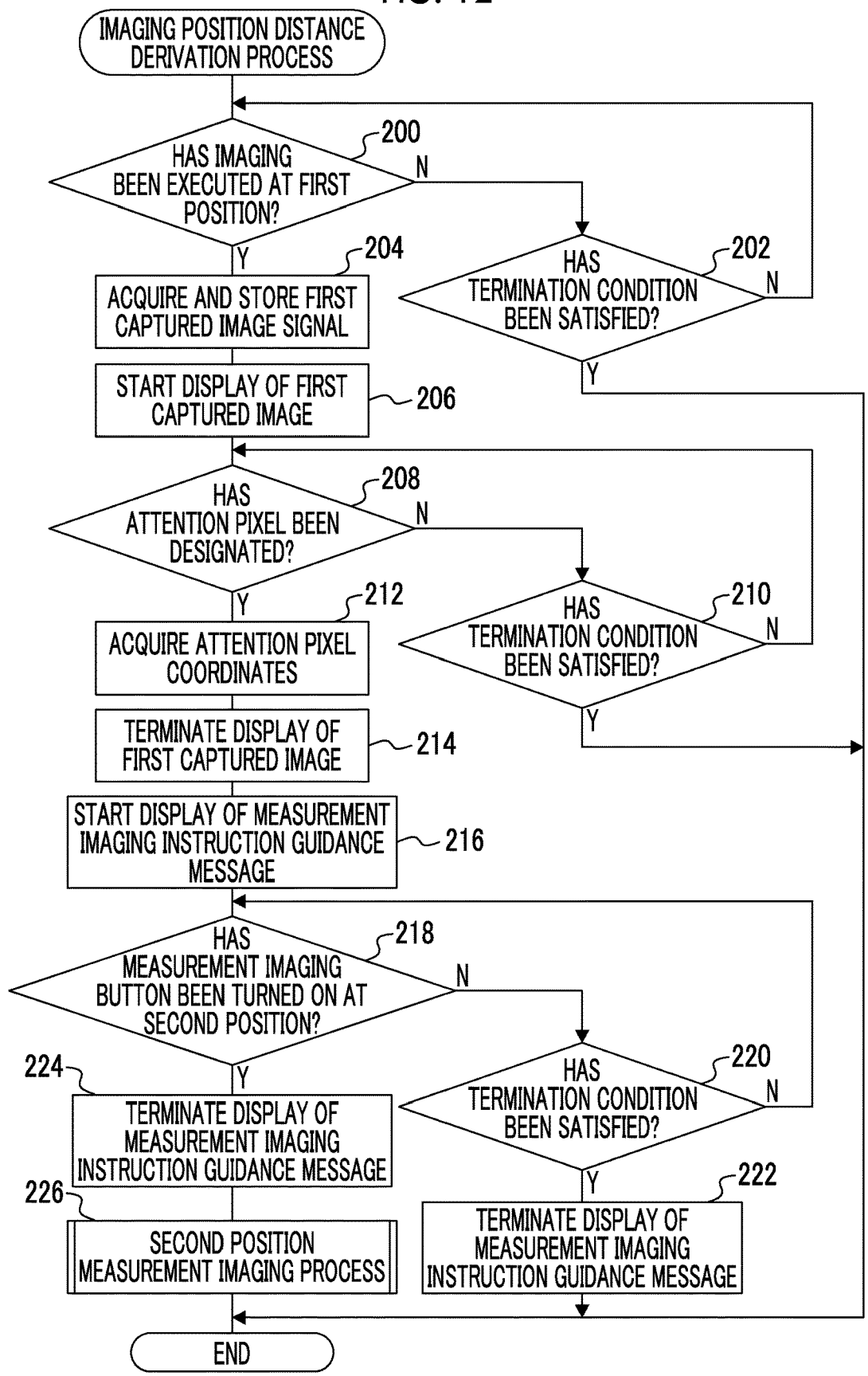
FIG. 12 is a flowchart illustrating an example of a flow of an imaging position distance derivation process according to the first embodiment.

In the imaging position distance derivation process illustrated in FIG. 12, first, in step 200, the acquisition unit 110A determines whether or not a still image has been captured by the imaging device 14 by turning on the imaging button 90B at the first position. The first position may be a position where a region including the outer wall surface 121 can be imaged as a subject.

In step 200, in a case where a still image has not been captured by the imaging device 14 by turning on the imaging button 90B at the first position, the determination result is negative, and the process proceeds to step 202. In step 200, in a case where a still image has been captured by the imaging device 14 by turning on the imaging button 90B at the first position, the determination result is positive, and the process proceeds to step 204.

In step 202, the acquisition unit 110A determines whether or not a condition for terminating the imaging position distance derivation process has been satisfied. The condition for terminating the imaging position distance derivation process refers to, for example, a condition that an instruction for terminating the imaging position distance derivation process is received through the touch panel 88, a condition that the determination result is not positive after the start of the processing of step 200 and a first predetermined time elapses, or the like. Meanwhile, the first predetermined time refers to, for example, one minute.

In a case where the condition for terminating the imaging position distance derivation process has not been satisfied in step 202, the determination result is negative, and the process proceeds to step 200. In a case where the condition for terminating the imaging position distance derivation process has been satisfied in step 202, the determination result is positive, and thus the imaging position distance derivation process is terminated.

In step 204, the acquisition unit 110A acquires a first captured image signal indicating the first captured image obtained by executing imaging at the first position. The acquisition unit 110A stores the acquired first captured image signal in a predetermined storage region of the secondary storage unit 104, and then the process proceeds to step 206. Meanwhile, the first captured image is a still image obtained by performing imaging at the first position in a focusing state.

Figure 18:
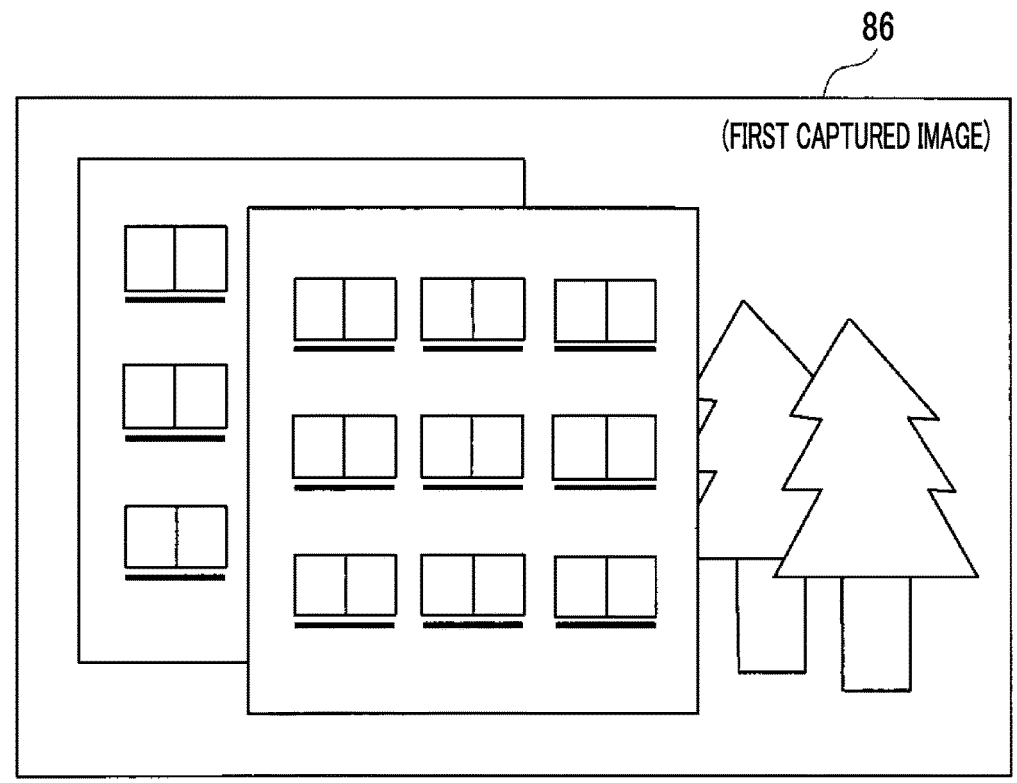
FIG. 18 is a schematic image illustrating an example of a first captured image obtained by performing imaging using the imaging device according to the first embodiment.

In step 206, the acquisition unit 110A starts the display of the acquired first captured image indicated by the first captured image signal on the display unit 86 as illustrated in FIG. 18 as an example, and then the process proceeds to step 208.

Meanwhile, in a case where the processing of step 206 is executed, an attention pixel designation guidance message (not shown) is displayed so as to be superimposed on the first captured image. The attention pixel designation guidance message refers to a message for guiding, for example, the designation of an attention pixel from the first captured image through the touch panel 88. An example of the attention pixel designation guidance message is a message of "please designate one pixel to be given attention (attention point)". The attention pixel designation guidance message is set to be in a non-display state, for example, in a case where an attention pixel has been designated in the processing of step 208 to be described later and in a case where the condition for terminating the imaging position distance derivation process has been satisfied in the processing of step 210 to be described later.

In step 208, the acquisition unit 110A determines whether or not an attention pixel has been designated by the user from the first captured image through the touch panel 88.

In step 208, in a case where an attention pixel has not been designated by the user from the first captured image through the touch panel 88, the determination result is negative, and the process proceeds to step 210. In step 208, in a case where an attention pixel has been designated by the user from the first captured image through the touch panel 88, the determination result is positive, and the process proceeds to step 212.

In step 210, the acquisition unit 110A determines whether or not the condition for terminating the imaging position distance derivation process has been satisfied. In step 210, in a case where the condition for terminating the imaging position distance derivation process has not been satisfied, the determination result is negative, and the process proceeds to step 208. In step 210, in a case where the condition for terminating the imaging position distance derivation process has been satisfied, the determination result is positive, and the imaging position distance derivation process is terminated.

In step 212, the acquisition unit 110A acquires attention pixel coordinates for specifying the attention pixel 126 (see FIG. 19) which is designated by the user in the first captured image through the touch panel 88, and then the process proceeds to step 214.

Figure 19:
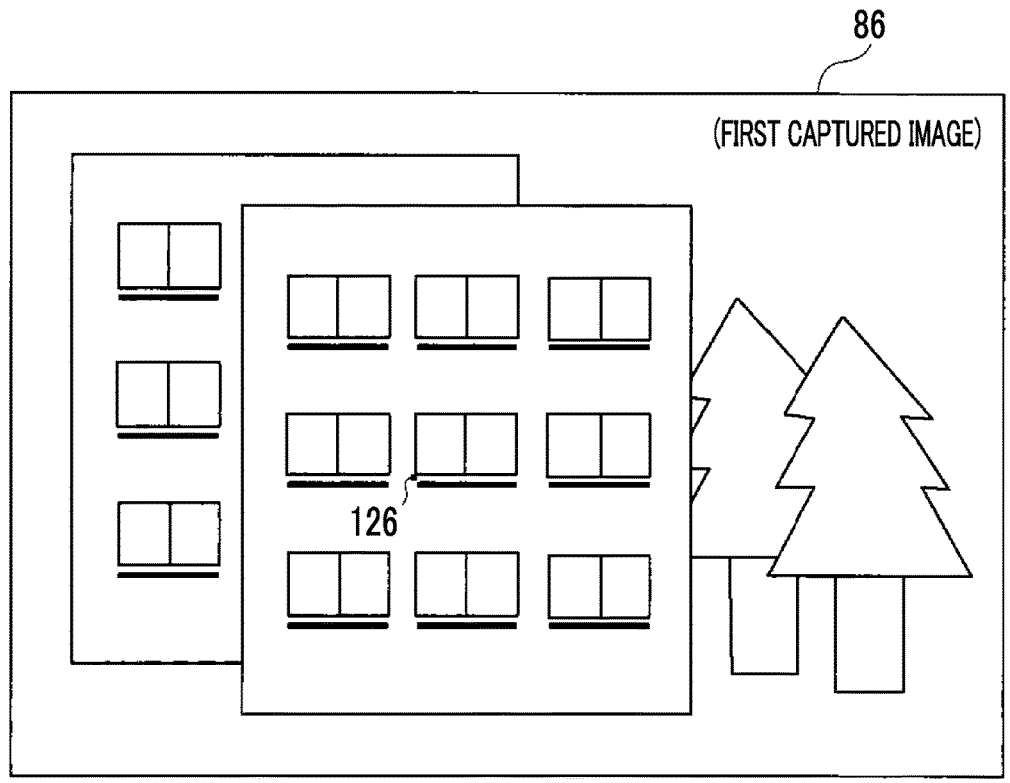
FIG. 19 is a schematic image illustrating an example of a first captured image, obtained by performing imaging using the imaging device according to the first embodiment, in which an attention pixel is designated.

Here, the attention pixel 126 refers to a pixel at the lower left corner in a front view of an image equivalent to a central window in the second floor on the outer wall surface in the first captured image, as illustrated in FIG. 19 as an example. The central window in the second floor on the outer wall surface refers to a central window 122 in the second floor of the office building 120 among the windows 122 provided on the outer wall surface 121, in the example illustrated in FIG. 17. In addition, the attention pixel coordinates refer to two-dimensional coordinates for specifying the attention pixel 126 in the first captured image.

In step 214, the acquisition unit 110A terminates the display of the first captured image on the display unit 86, and then the process proceeds to step 216.

In step 216, the acquisition unit 110A starts the display of a measurement imaging instruction guidance message (not shown) on the display unit 86, and then the process proceeds to step 218.

Here, the measurement imaging instruction guidance message refers to, for example, a message for prompting the user to install the distance measurement device 10A at the second position where the same subject falls inside the imaging range, and then to turn on the measurement imaging button 90A. An example of the measurement imaging instruction guidance message is a message of "please install the distance measurement device 10A at another position so that the same subject falls inside the imaging range, and then turn on the measurement imaging button 90A".

In step 218, the acquisition unit 110A determines whether or not the measurement imaging button 90A has been turned on at the second position. In step 218, in a case where the measurement imaging button 90A has not been turned on at the second position, the determination result is negative, and the process proceeds to step 220. In step 218, in a case where the measurement imaging button 90A has been turned on at the second position, the determination result is positive, and the process proceeds to step 224.

In step 210, the acquisition unit 110A determines whether or not the condition for terminating the imaging position distance derivation process has been satisfied. In step 210, in a case where the condition for terminating the imaging position distance derivation process has not been satisfied, the determination result is negative, and the process proceeds to step 218. In step 220, in a case where the condition for terminating the imaging position distance derivation process has been satisfied, the determination result is positive, and the process proceeds to step 222.

In step 222, the acquisition unit 110A terminates the display of the measurement imaging instruction guidance message on the display unit 86, and then the imaging position distance derivation process is terminated.

In step 224, the acquisition unit 110A terminates the display of the measurement imaging instruction guidance message on the display unit 86, and then the process proceeds to step 226.

In step 226, the acquisition unit 110A executes a second position measurement imaging process illustrated in FIGS. 13 to 16 as an example, and then the imaging position distance derivation process is terminated. Meanwhile, in this embodiment, for convenience of description, a description will be given on the assumption that a plurality of second captured images are captured as a live view image. In addition, in this embodiment, for convenience of description, a description will be given on the assumption that a second captured image signal indicating the second captured image is input to the image processing unit 66 from the image memory 64 for each frame at a specific frame rate.

Figure 13:
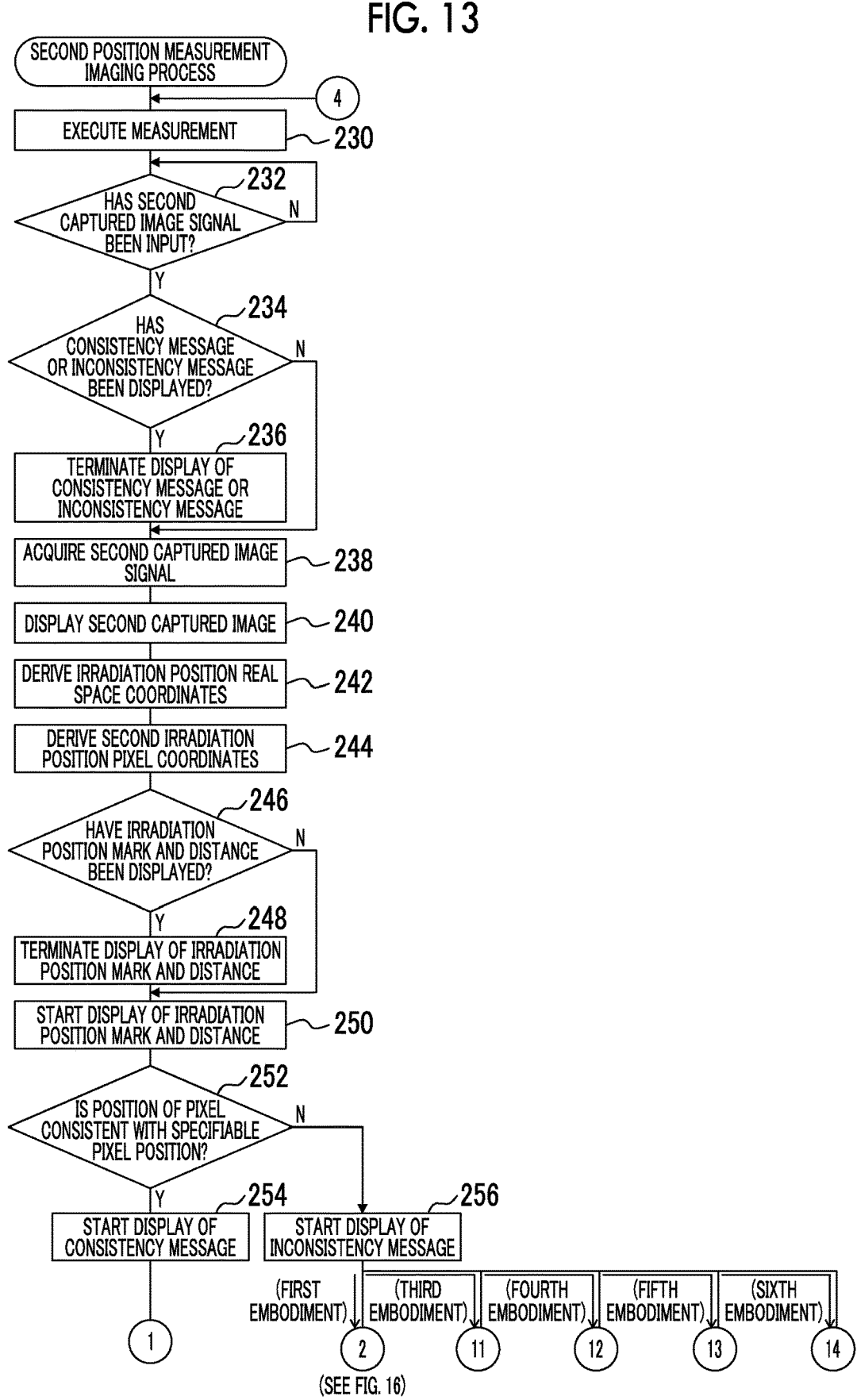
FIG. 13 is a flowchart illustrating an example of a flow of a second position measurement imaging process according to the first embodiment and the third to sixth embodiments.

In the second position measurement imaging process illustrated in FIG. 13, first, in step 230, the acquisition unit 110A measures a distance to the subject with respect to the distance measurement unit 12 and the distance measurement control unit 68, and then the process proceeds to step 232.

In step 232, the acquisition unit 110A determines whether or not the second captured image signal has been newly input to the image processing unit 66 from the image memory 64. In step 232, in a case where the second captured image signal has not been newly input to the image processing unit 66 from the image memory 64, the determination result is negative, and the determination of step 232 is performed again. In step 232, in a case where the second captured image signal has been newly input to the image processing unit 66 from the image memory 64, the determination result is positive, and the process proceeds to step 234.

In step 234, the acquisition unit 110A determines whether a consistency message 137A to be described later or an inconsistency message 137B to be described later has already been displayed on the display unit 86. Here, the display of the consistency message 137A is started by the execution of the processing of step 254 to be described later, and the display of the inconsistency message 137B is started by the execution of the processing of step 256 to be described later.

In step 234, in a case where the consistency message 137A or the inconsistency message 137B has already been displayed on the display unit 86, the determination result is positive, and the process proceeds to step 236. In step 234, in a case where neither the consistency message 137A nor the inconsistency message 137B is displayed on the display unit 86, the determination result is negative, and the process proceeds to step 238.

In step 236, the acquisition unit 110A terminates the display of the consistency message 137A on the display unit 86 in a case where the consistency message 137A has already been displayed on the display unit 86, and then the process proceeds to step 238. In addition, the acquisition unit 110A terminates the display of the inconsistency message 137B on the display unit 86 in a case where the inconsistency message 137B has already been displayed on the display unit 86, and then the process proceeds to step 238.

In step 238, the acquisition unit 110A acquires the second captured image signal for one frame from the image processing unit 66, and then the process proceeds to step 240.

In step 240, the acquisition unit 110A displays the second captured image indicated by the second captured image signal, which is acquired in the processing of step 238, on the display unit 86, and then the process proceeds to step 242.

In step 242, the derivation unit 111A derives irradiation position real space coordinates on the basis of Expression (2) from the distance L, the half angle of view α, the emission angle β, and the distance between reference points M, and then the process proceeds to step 244. Meanwhile, the distance L which is used in the processing of step 242 refers to a distance to the subject which is measured by the execution of the processing of step 230.

In step 244, the derivation unit 111A derives second irradiation position pixel coordinates on the basis of Expressions (3) to (5) from the distance L, the half angle of view α, the emission angle β, and the distance between reference points M, and then the process proceeds to step 246. Meanwhile, the distance L which is used in the processing of step 244 refers to a distance to the subject which is measured by the execution of the processing of step 230.

In step 246, the derivation unit 111A determines whether or not an irradiation position mark 136 to be described later and the distance L are displayed. In step 246, in a case where the irradiation position mark 136 and the distance L are displayed, the determination result is positive, and the process proceeds to step 248. In step 246, in a case where the irradiation position mark 136 is not displayed, the determination result is negative, and the process proceeds to step 250. Meanwhile, the distance L which is displayed by the execution of the processing of step 246 refers to a distance to the subject which is measured by the execution of the processing of step 230.

In step 248, the derivation unit 111A terminates the display of the irradiation position mark 136 and the distance L on the display unit 86, and then the process proceeds to step 250.

Figure 20:
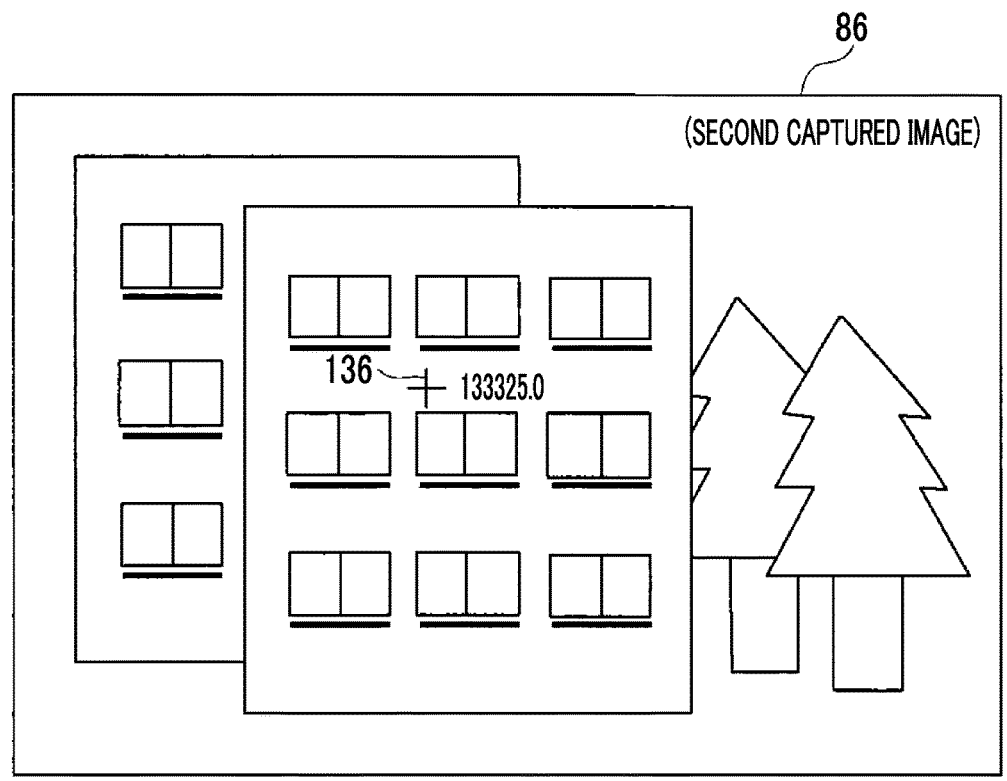
FIG. 20 is a schematic image illustrating an example of a second captured image, obtained by performing imaging using the imaging device according to the first embodiment, in which an irradiation position mark and a distance to a subject are displayed in an overlapping manner.

In step 250, the derivation unit 111A starts the display of the irradiation position mark 136 and the distance L, which are superimposed on the second captured image, on the display unit 86 as illustrated in FIG. 20 as an example, and then the process proceeds to step 252. In the example illustrated in FIG. 20, a numerical value of "133325.0" corresponds to the distance L which is measured at the second position by the distance measurement device 10A, and the unit is millimeter. In the example illustrated in FIG. 20, the irradiation position mark 136 is a mark indicating the position of the pixel which is specified by the second irradiation position pixel coordinates derived by the execution of the processing of step 244.

In step 252, the execution unit 112A determines whether or not the position of the pixel which is specified by the second irradiation position pixel coordinates derived by the execution of the processing of step 244 is consistent with a specifiable pixel position. Here, the specifiable pixel position refers to the position of a pixel which is specifiable at positions corresponding to each other in the second captured image and the first captured image which is indicated by the first captured image signal stored in the predetermined storage region by the execution of the processing of step 204.

In step 252, in a case where the position of the pixel which is specified by the second irradiation position pixel coordinates derived by the execution of the processing of step 244 is consistent with the specifiable pixel position, the determination result is positive, and the process proceeds to step 254. In step 252, in a case where the position of the pixel which is specified by the second irradiation position pixel coordinates derived by the execution of the processing of step 244 is not consistent with the specifiable pixel position, the determination result is negative, and the process proceeds to step 256. Meanwhile, the case where the determination result in step 252 is positive means a case of the above-described position specifiable state, and the case where the determination result in step 252 is negative means a case of the above-described position unspecifiable state.

Figure 14:
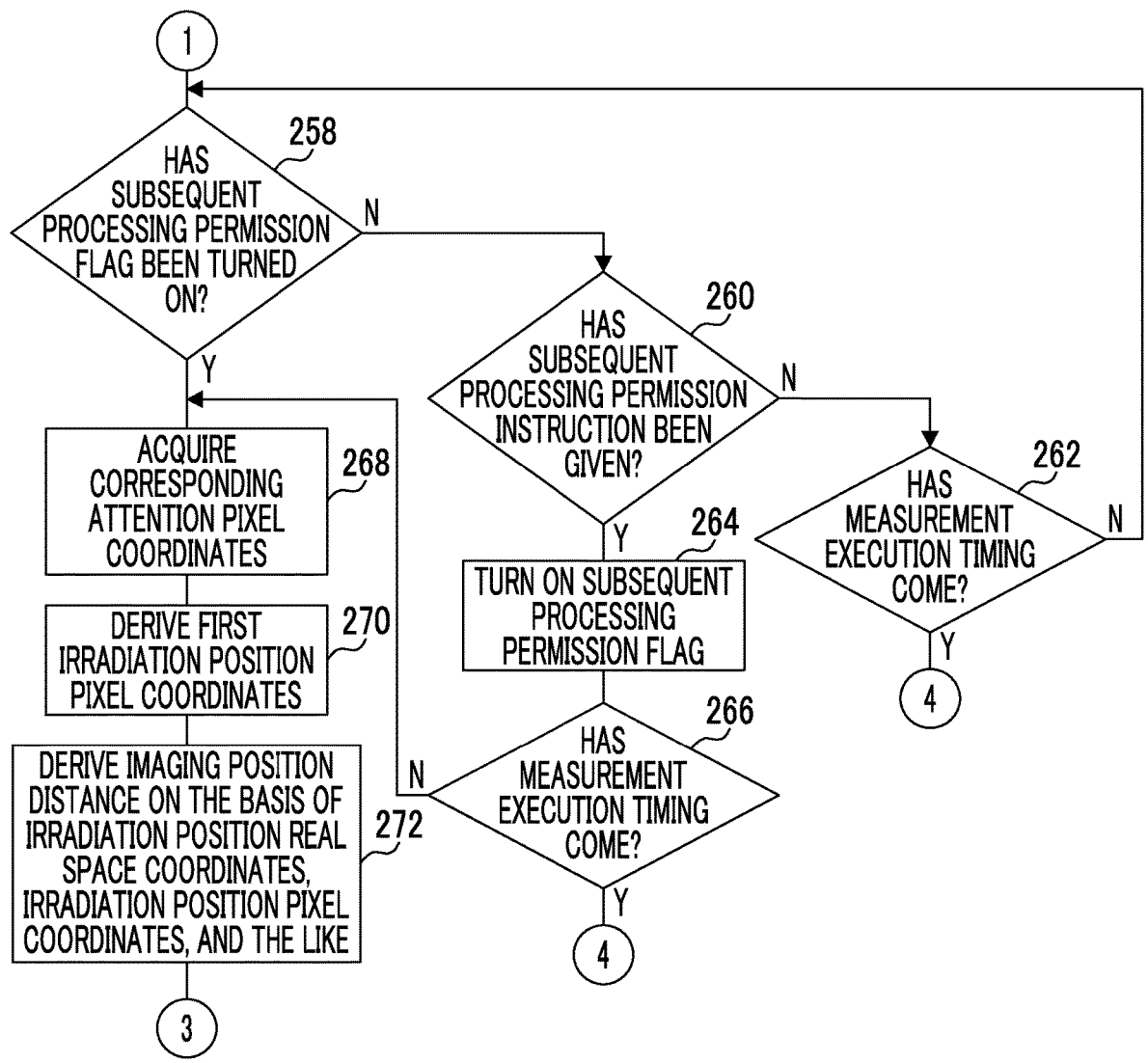
FIG. 14 is the continuation of the flowchart illustrated in FIG. 13.
Figure 21:
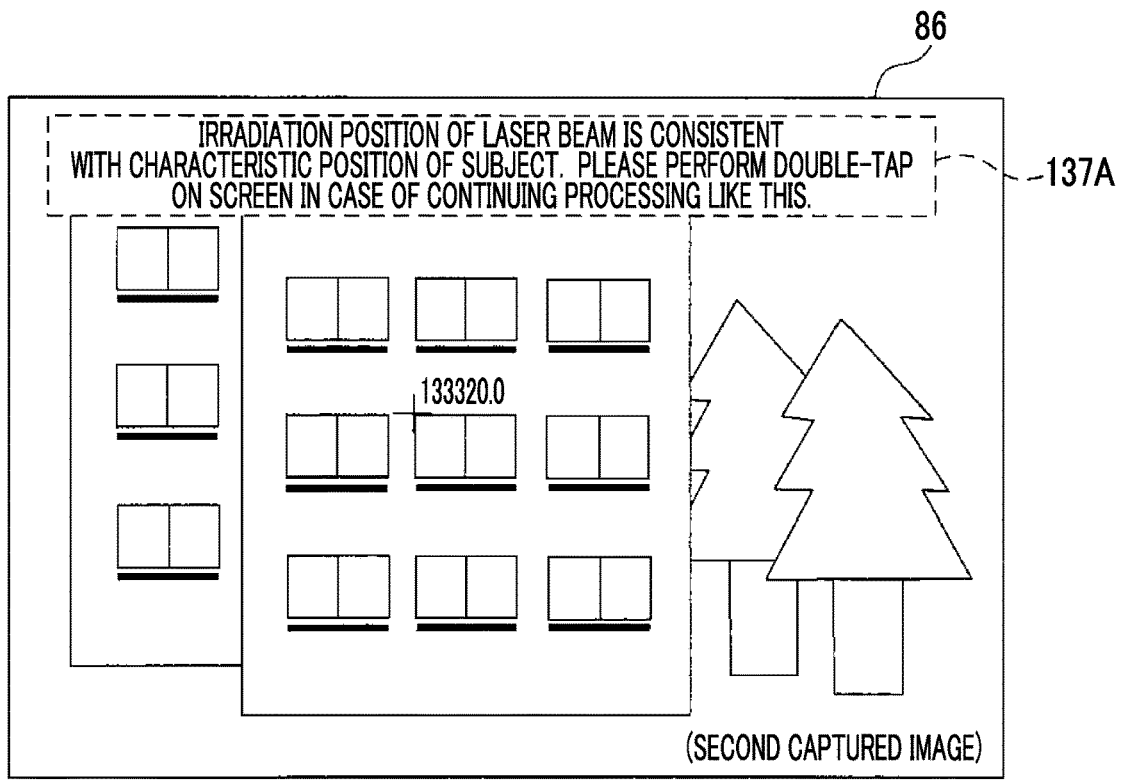
FIG. 21 is a schematic image illustrating an example of a second captured image, obtained by performing imaging using the imaging device according to the first embodiment, in which a consistency message is displayed in an overlapping manner.

In step 254, the execution unit 112A starts the display of the consistency message 137A, which is superimposed on the second captured image, on the display unit 86 as illustrated in FIG. 21 as an example, and then the process proceeds to step 258 illustrated in FIG. 14. The consistency message 137A is a message indicating that the position of the pixel which is specified by the second irradiation position pixel coordinates derived by the execution of the processing of step 244 is consistent with the specifiable pixel position. Accordingly, the processing of step 254 is executed, and thus the user is notified that the position of the pixel which is specified by the second irradiation position pixel coordinates derived by the execution of the processing of step 244 is consistent with the specifiable pixel position. Meanwhile, the processing of step 254 is an example of a position specifiable state notification process according to the technique of this disclosure. In addition, here, the position specifiable state notification process according to the technique of this disclosure refers to a process of giving notice of being the above-described position specifiable state.

Meanwhile, in the example illustrated in FIG. 21, a message of "irradiation position of laser beam is consistent with characteristic position of subject. Please perform double-tap on screen in case of continuing processing like this." is shown as the consistency message 137A, but the technique of this disclosure is not limited thereto. For example, a message of only "irradiation position of laser beam is consistent with characteristic position of subject." in the consistency message 137A may be adopted.

In this manner, any message may be adopted as long as the message is a message for giving notice that the position of the pixel which is specified by the second irradiation position pixel coordinates derived by the execution of the processing of step 244 is consistent with the specifiable pixel position. The example illustrated in FIG. 21 shows a case where the consistency message 137A is visibly displayed, but audible display such as the output of a sound using a sound reproducing device (not shown) or permanent visible display such as the output of printed matter using a printer may be performed instead of the visible display or may be performed in combination.

Figure 16:
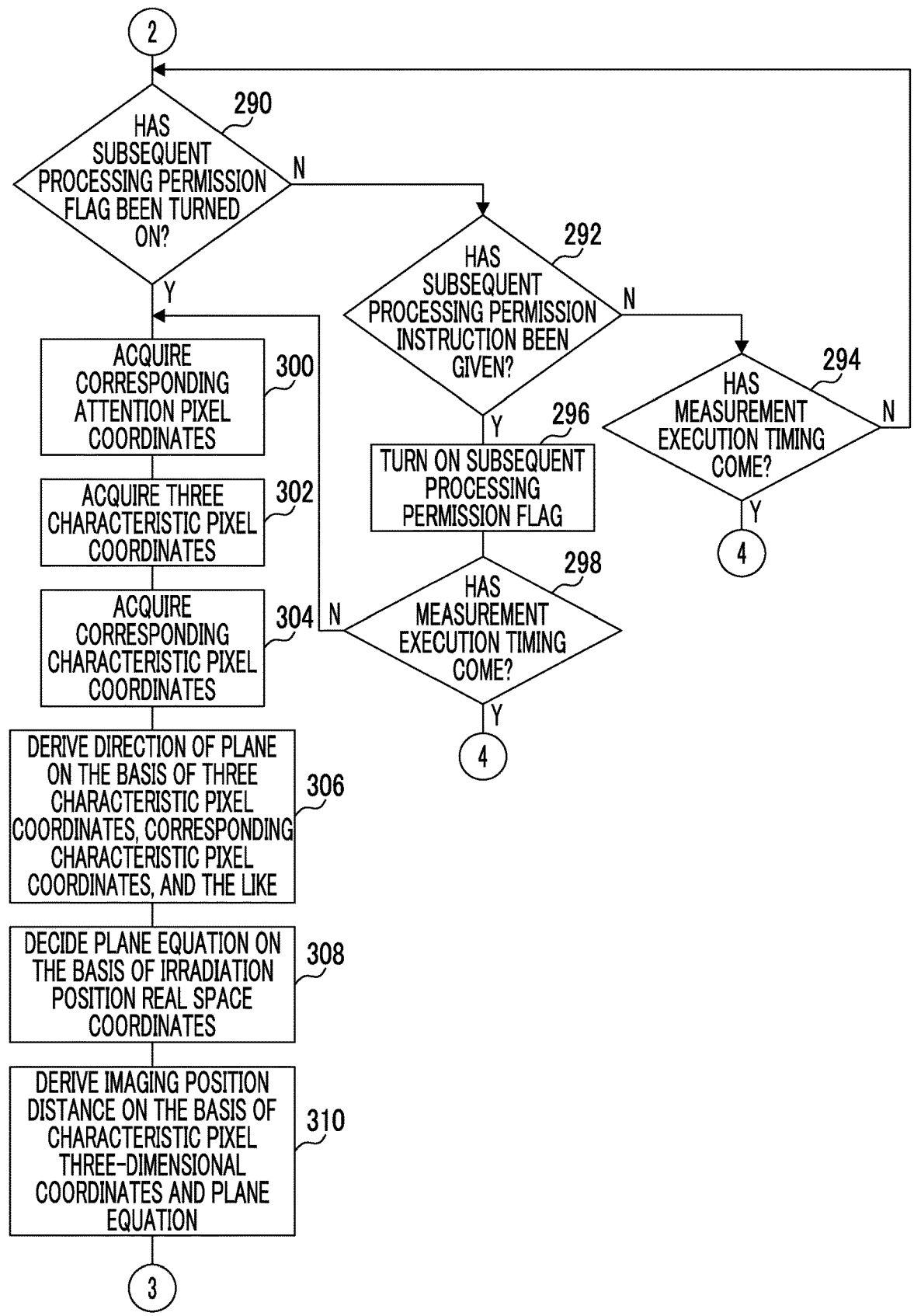
FIG. 16 is the continuation of the flowchart illustrated in FIG. 13.
Figure 22:
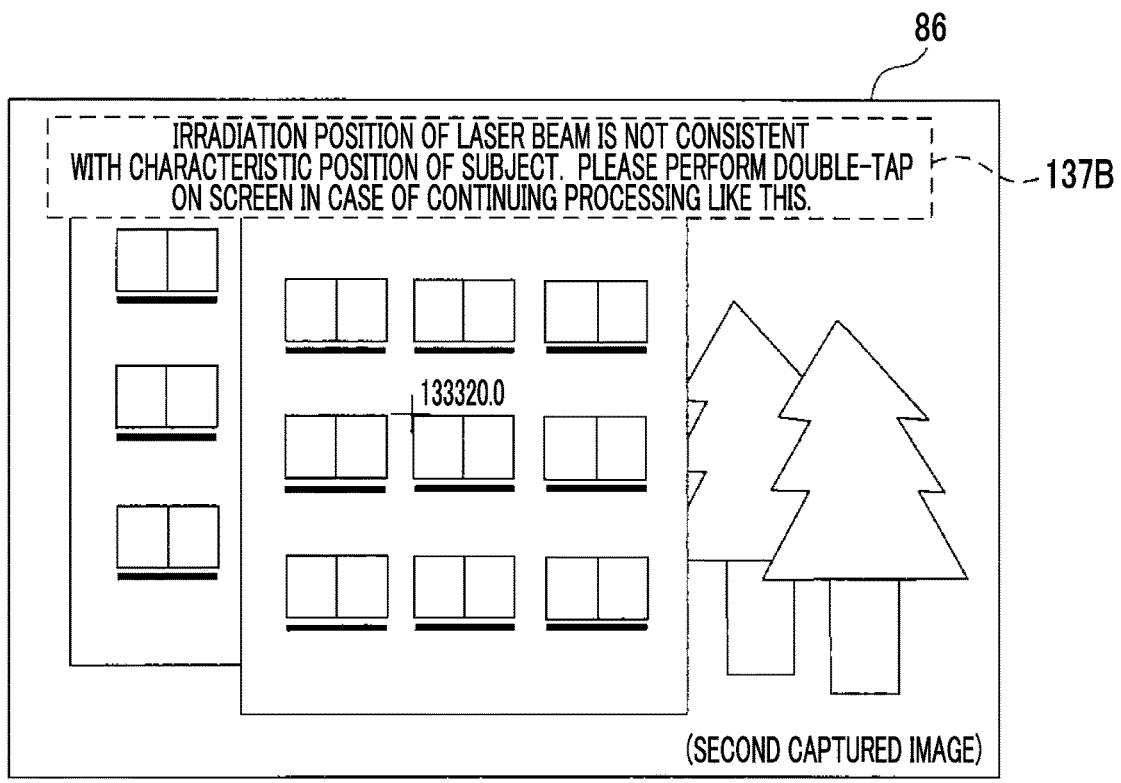
FIG. 22 is a schematic image illustrating an example of a second captured image, obtained by performing imaging using the imaging device according to the first embodiment, in which an inconsistency message is displayed in an overlapping manner.

In step 256, the execution unit 112A starts the display of an inconsistency message 137B on the display unit 86 so as to be superimposed on the second captured image as illustrated in FIG. 22 as an example, and then the process proceeds to step 290 illustrated in FIG. 16. The inconsistency message 137B is a message indicating that the position of the pixel which is specified by the second irradiation position pixel coordinates derived by the execution of the processing of step 244 is not consistent with the specifiable pixel position. Here, in other words, "the position of the pixel which is specified by the second irradiation position pixel coordinates is not consistent with the specifiable pixel position" means that the position of the pixel which is specified by the second irradiation position pixel coordinates is the position of a pixel which is different from the specifiable pixel position.

In this manner, a user is notified that the position of the pixel which is specified by the second irradiation position pixel coordinates derived by the execution of the processing of step 244 is not consistent with the specifiable pixel position, by the execution of the processing of step 256. Meanwhile, the processing of step 256 is an example of a position unspecifiable state notification process according to the technique of this disclosure. The position unspecifiable state notification process according to the technique of this disclosure refers to a process of giving notice of being the above-described position unspecifiable state.

In the example illustrated in FIG. 22, a message of "irradiation position of laser beam is not consistent with characteristic position of subject. Please perform double-tap on screen in case of continuing processing like this." is shown as the inconsistency message 137B, but the technique of this disclosure is not limited thereto. For example, only a message of "irradiation position of laser beam is not consistent with characteristic position of subject" in the inconsistency message 137B may be adopted.

In this manner, any message may be adopted as long as the message is a message for giving notice that the position of the pixel which is specified by the second irradiation position pixel coordinates derived by the execution of the processing of step 244 is not consistent with the specifiable pixel position. The example illustrated in FIG. 22 shows a case where the inconsistency message 137B visibly displayed, but audible display such as the output of a sound using a sound reproducing device (not shown) or permanent visible display such as the output of printed matter using a printer may be performed instead of the visible display or may be performed in combination.

In step 258 illustrated in FIG. 14, the execution unit 112A determines whether or not a subsequent processing permission flag indicating the permission of the execution of the processing of step 268 to be described later and the subsequent processing and the processing of step 300 to be described later and the subsequent processing has been turned on. In step 258, in a case where the subsequent processing permission flag has not been turned on, the determination result is negative, and the process proceeds to step 260. In step 258, in a case where the subsequent processing permission flag has been turned on, the determination result is positive, and the process proceeds to step 268.

In step 260, the execution unit 112A determines whether or not a subsequent processing permission instruction which is an instruction for permitting the execution of the processing of step 268 and the subsequent processing has been given. In step 260, the subsequent processing permission instruction refers to, for example, a double-tap which is performed by the user on the touch panel 88 after the display of the consistency message 137A is started. Meanwhile, in step 260, the subsequent processing permission instruction is not limited to the double-tap, and may be a predetermined instruction which is received by the reception device 90.

Meanwhile, another example of "the predetermined instruction" is, for example, a long-press, a flick, or the like which is performed on a specific region (for example, a region corresponding to a closed region where a specific color is applied within the screen) in the touch panel 88. In addition, another example of "the predetermined instruction" may be a long-press, a flick, or the like which is performed on the touch panel 88 in a state where a guidance message of "please perform long-press or flick" is displayed within the screen. Further, another example of "the predetermined instruction" is the turn-on of a specific button (not shown) which is provided in the reception device 90.

In step 260, in a case where the subsequent processing permission instruction has not been given, the determination result is negative, and the process proceeds to step 262. In step 260, in a case where the subsequent processing permission instruction has been given, the determination result is positive, and the process proceeds to step 264. Meanwhile, in a case where the determination result in step 260 is positive, the execution unit 112A terminates the display of the consistency message 137A on the display unit 86.

In step 262, the execution unit 112A determines whether or not a predetermined measurement execution timing has come as a timing when the processing of step 230 is executed. Meanwhile, hereinafter, for convenience of description, "the predetermined measurement execution timing as the timing when the processing of step 230 is executed" will be simply referred to as "a measurement execution timing".

Here, the measurement execution timing refers to a timing which is determined in advance so that distance measurement is executed for each frame of a live view image. An example of the measurement execution timing is a timing that periodically comes at every time interval corresponding to one frame rate.

In step 262, in a case where the measurement execution timing has not come, the determination result is negative, and the process proceeds to step 258. In step 262, in a case where the measurement execution timing has come, the determination result is positive, and the process proceeds to step 230 illustrated in FIG. 13.

In step 264, the execution unit 112A turns on the subsequent processing permission flag, and then the process proceeds to step 266.

In step 266, the execution unit 112A determines whether or not the measurement execution timing has come. In step 266, in a case where the measurement execution timing has not come, the determination result is negative, and the process proceeds to step 268. In step 266, in a case where the measurement execution timing has come, the determination result is positive, the process proceeds to step 230 illustrated in FIG. 13.

In step 268, the acquisition unit 110A specifies a corresponding attention pixel which is a pixel corresponding to the attention pixel 126 mentioned above among the pixels included in the second captured image and acquires corresponding attention pixel coordinates for specifying the specified corresponding attention pixel, and then the process proceeds to step 270.

Meanwhile, here, the corresponding attention pixel coordinates refer to two-dimensional coordinates for specifying a corresponding attention pixel in the second captured image. In addition, the corresponding attention pixel is specified by executing the existing image analysis such as pattern matching, by using the first and second captured images as objects to be analyzed. In addition, the corresponding attention pixel is equivalent to the above-described second designated pixel, and is uniquely specified from the second captured image by the execution of the processing of step 268 in a case where the attention pixel 126 is specified from the first captured image.

In step 270, the derivation unit 111A derives first irradiation position pixel coordinates, and then the process proceeds to step 272. That is, in step 270, the derivation unit 111A derives coordinates for specifying the position of a pixel which corresponds to the position of the pixel which is specified by the second irradiation position pixel coordinates derived in the processing of step 244, among the pixels of the specific first captured image, as the first irradiation position pixel coordinates. Here, the specific first captured image refers to the first captured image which is stored in the predetermined storage region by the execution of the processing of step 204.

Meanwhile, the pixel which corresponds to the position of the pixel specified by the second irradiation position pixel coordinates, among the pixels of the specific first captured image, is specified by executing the existing image analysis, such as pattern matching, by using the first and second captured images as objects to be analyzed, similar to the above-described method of specifying corresponding attention pixel coordinates.

Figure 15:
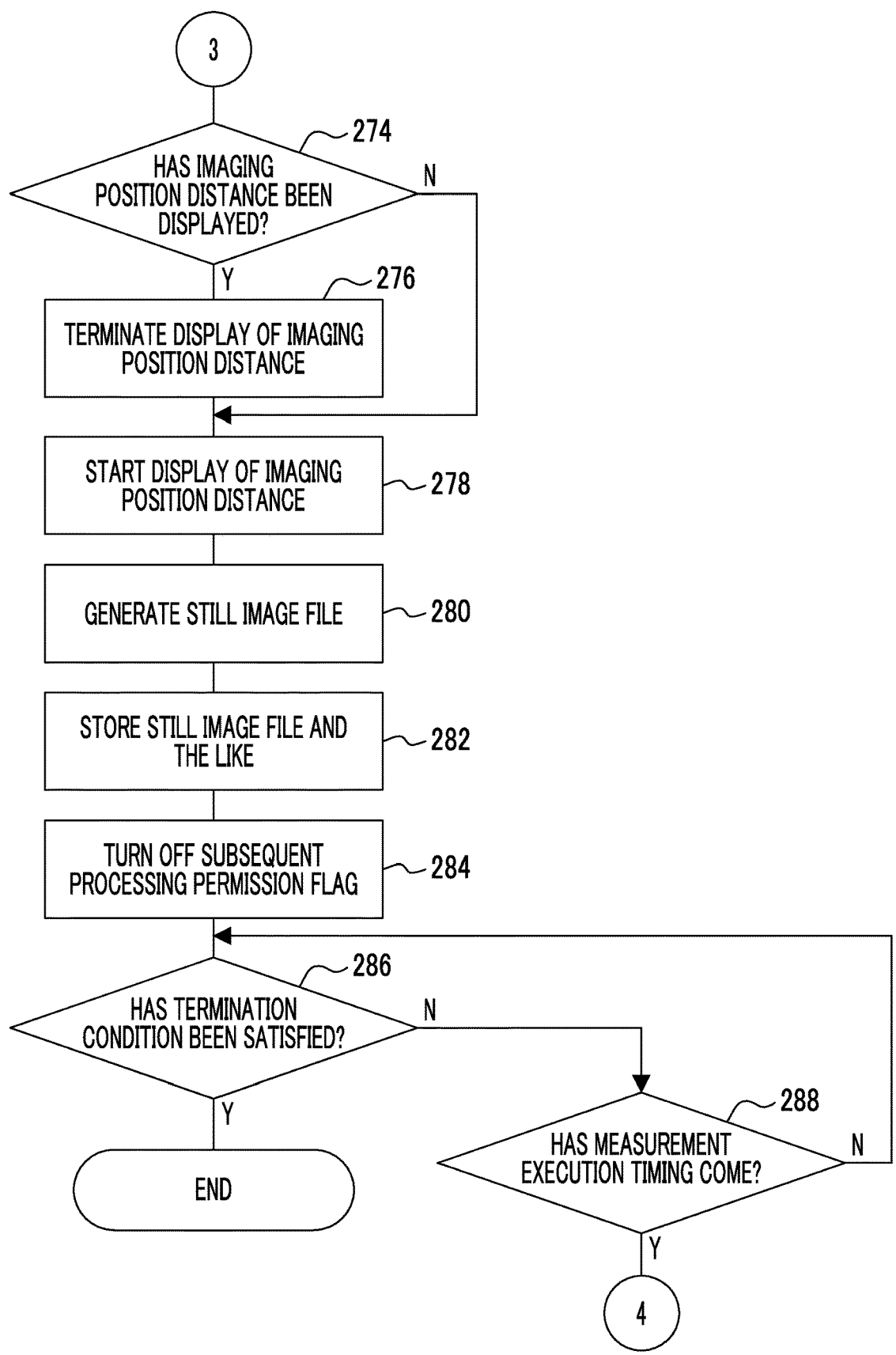
FIG. 15 is the continuation of the flowchart illustrated in FIGS. 14, 33, 36, and 38.

In step 272, the execution unit 112A derives an imaging position distance on the basis of the irradiation position real space coordinates, the irradiation position pixel coordinates, the focal length of the imaging lens 50, the dimensions of the imaging pixel 60A1, and Expression (1), and then the process proceeds to step 274 illustrated in FIG. 15. Meanwhile, the processing of step 272 is an example of processing included in "the predetermined process" according to the technique of this disclosure.

In step 274 illustrated in FIG. 15, the execution unit 112A determines whether or not the imaging position distance has already been displayed on the display unit 86. In step 274, in a case where the imaging position distance has already been displayed on the display unit 86, the determination result is positive, and the process proceeds to step 276. In step 274, in a case where the imaging position distance has not been displayed on the display unit 86, the determination result is negative, and the process proceeds to step 278.

In step 276, the execution unit 112A terminates the display of the imaging position distance on the display unit 86, and then the process proceeds to step 278.

Figure 23:
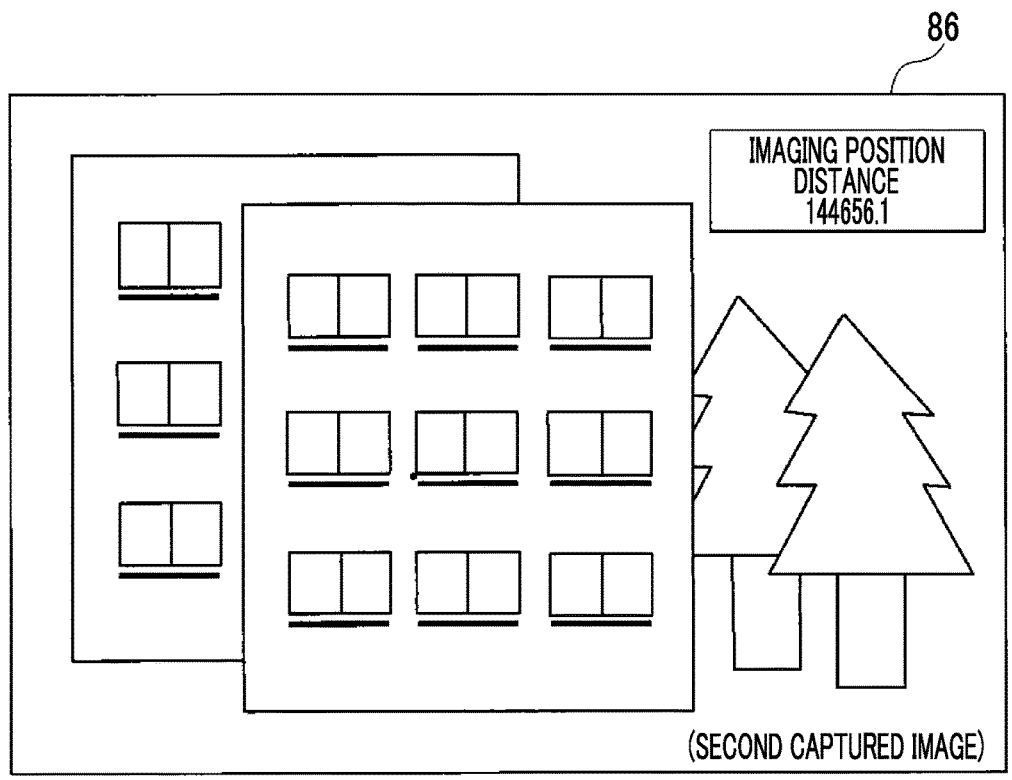
FIG. 23 is a schematic image illustrating an example of a second captured image, obtained by performing imaging using the imaging device according to the first embodiment, in which an imaging position distance is displayed in an overlapping manner.

In step 278, the execution unit 112A starts the display of the imaging position distance derived in the processing of step 272, which is superimposed on the second captured image, on the display unit 86 as illustrated in FIG. 23 as an example, and then the process proceeds to step 280. Meanwhile, in the example illustrated in FIG. 23, a numerical value of "144656.1" corresponds to the imaging position distance derived in the processing of step 272, and the unit is millimeter.

In step 280, the execution unit 112A generates a still image file from the second captured image signal acquired in the processing of step 238, and then the process proceeds to step 282. Here, the second captured image which is used in the processing of step 280 is the latest second captured image, and is an example of "a second captured image obtained by performing imaging at a predetermined timing" according to the technique of this disclosure. In step 280, "the predetermined timing" refers to a timing when the latest second captured image is captured. Meanwhile, another example of "the predetermined timing" is a timing prior to the latest second captured image by one frame or a predetermined plurality of frames (for example, by two frames).

That is, the second captured image which is used in the processing of step 280 is not limited to the latest second captured image, and may be, for example, a second captured image which is obtained by imaging prior to the latest second captured image by a predetermined number of frames (for example, one frame or two frames).

In step 282, the execution unit 112A stores the still image file, the latest distance, and the latest imaging position distance in the secondary storage unit 104, and then the process proceeds to step 284. Here, the latest distance and the latest imaging position distance which are stored in the secondary storage unit 104 by the execution of the processing of step 282 are examples of "information based on a distance acquired at a timing corresponding to a predetermined timing" according to the technique of this disclosure. In addition, the processing of step 282 is an example of "a storage process" according to the technique of this disclosure.

The still image file stored in the secondary storage unit 104 by the execution of the processing of step 282 is the still image file generated in the processing of step 280. In addition, the latest distance stored in the secondary storage unit 104 by the execution of the processing of step 282 is the latest distance among the distances to the subject which are measured by the execution of the processing of step 230. Further, the latest imaging position distance stored in the secondary storage unit 104 by the execution of the processing of step 282 is the latest imaging position distance among the imaging position distances derived in the processing of step 272 and the processing of step 310 to be described later.

Meanwhile, the distance and the imaging position distance which are stored in the secondary storage unit 104 by the execution of the processing of step 282 may not be the latest distance and the latest imaging position distance. For example, the distance and the imaging position distance may be a distance and an imaging position distance which are acquired at a timing corresponding to an imaging timing of the second captured image which is used in the processing of step 280. The distance stored in the secondary storage unit 104 may be, for example, a distance which is measured at an imaging timing of the second captured image in a case where the second captured image used in the processing of step 280 is obtained by being captured prior to the latest second captured image by a predetermined number of frames. In addition, the imaging position distance stored in the secondary storage unit 104 may be, for example, an imaging position distance which is derived on the basis of the distance measured at the imaging timing of the second captured image.

That is, here, the distance acquired at the timing corresponding to the imaging timing of the second captured image refers to, for example, a distance measured at an imaging timing prior to the latest second captured image by a predetermined number of frames. In addition, here, the imaging position distance acquired at the timing corresponding to the imaging timing of the second captured image refers to an imaging position distance derived on the basis of the distance measured at the imaging timing prior to the latest second captured image by the predetermined number of frames.

In step 282, a description has been given of a case where the still image file, the distance to the subject, and the imaging position distance are stored in the secondary storage unit 104, but the technique of this disclosure is not limited thereto. For example, any one of the still image file, the distance to the subject, and the imaging position distance may be stored in the secondary storage unit 104, and information other than the still image file, the distance to the subject, and the imaging position distance may be stored in the secondary storage unit. Examples of the other information include Global Positioning System (GPS) information by which parameters, the current time, and the current position which are used in the measurement of the distance to the subject can be specified, and the like.

In step 284, the execution unit 112A turns off the subsequent processing permission flag, and then the process proceeds to step 286.

In step 286, the execution unit 112A determines whether or not a condition for terminating the second position measurement imaging process has been satisfied. Meanwhile, in step 286, the condition for terminating the second position measurement imaging process refers to the same condition as the condition described in step 202 described above.

In step 286, in a case where the condition for terminating the second position measurement imaging process has not been satisfied, the determination result is negative, and the process proceeds to step 288. In step 286, in a case where the condition for terminating the second position measurement imaging process has been satisfied, the determination result is positive, and the second position measurement imaging process is terminated.

In step 288, the execution unit 112A determines whether or not a measurement execution timing has come. In step 288, in a case where the measurement execution timing has not come, the determination result is negative, and the process proceeds to step 286. In step 288, in a case where the measurement execution timing has come, the determination result is positive, and the process proceeds to step 230 illustrated in FIG. 13.

In step 290 illustrated in FIG. 16, the execution unit 112A determines whether or not the subsequent processing permission flag has been turned on. In step 290, in a case where the subsequent processing permission flag has not been turned on, the determination result is negative, and the process proceeds to step 292. In step 290, in a case where the subsequent processing permission flag has been turned on, the determination result is positive, and the process proceeds to step 300.

In step 292, the execution unit 112A determines whether or not a subsequent processing permission instruction which is an instruction for permitting the execution of the processing of step 300 and the subsequent processing has been given. In step 292, the subsequent processing permission instruction refers to, for example, a double-tap which is performed by the user on the touch panel 88 after the display of the inconsistency message 137B is started. Meanwhile, also in the processing of step 292, the subsequent processing permission instruction is not limited to the double-tap, similar to the processing of step 260 described above, and may be a predetermined operation performed on the touch panel 88 or a predetermined instruction received by the reception device 90.

In step 292, in a case where the subsequent processing permission instruction has not been given, the determination result is negative, and the process proceeds to step 294. In step 292, in a case where the subsequent processing permission instruction has been given, the determination result is positive, and the process proceeds to step 296. Meanwhile, in a case where the determination result in step 292 is positive, the execution unit 112A terminates the display of the inconsistency message 137B on the display unit 86.

In step 294, the execution unit 112A determines whether or not a measurement execution timing has come. In step 294, in a case where the measurement execution timing has not come, the determination result is negative, and the process proceeds to step 290. In step 294, in a case where the measurement execution timing has come, the determination result is positive, and the process proceeds to step 230 illustrated in FIG. 13.

In step 296, the execution unit 112A turns on the subsequent processing permission flag, and then the process proceeds to step 298.

In step 298, the execution unit 112A determines whether or not the measurement execution timing has come. In step 298, in a case where the measurement execution timing has not come, the determination result is negative, and the process proceeds to step 300. In step 266, in a case where the measurement execution timing has come, the determination result is positive, and the process proceeds to step 230 illustrated in FIG. 13.

In step 300, the acquisition unit 110A specifies a corresponding attention pixel which is a pixel corresponding to the attention pixel 126 mentioned above among the pixels included in the second captured image, similar to the processing of step 268, and acquires corresponding attention pixel coordinates for specifying the specified corresponding attention pixel.

In the next step 302, the execution unit 112A acquires three characteristic pixel coordinates for specifying the positions of three characteristic pixels in an outer wall surface image 128 (a hatched region in the example illustrated in FIG. 24) in the second captured image, and then the process proceeds to step 304. Meanwhile, the "three characteristic pixels" as mentioned herein is an example of "a plurality of pixels" according to the technique of this disclosure.

Here, the outer wall surface image 128 refers to an image showing the outer wall surface 121 (see FIG. 17) in the second captured image. The three characteristic pixels are pixels which are specifiable at positions corresponding to each other in the respective first and second captured images. The three characteristic pixels in the second captured image are pixels which are separated from each other by a predetermined number of pixels and are respectively present at three points specified in accordance with a predetermined rule by image analysis on the basis of a spatial frequency and the like of an image equivalent to a pattern, a building material, or the like in the outer wall surface image 128. For example, three pixels which show different apexes having a maximum spatial frequency within a circular region, which is fixed by a predetermined radius on the basis of the attention pixel 126, and satisfy fixed conditions are extracted as three characteristic pixels. Meanwhile, the three characteristic pixel coordinates are equivalent to the above-described plurality of pixel coordinates.

Figure 24:
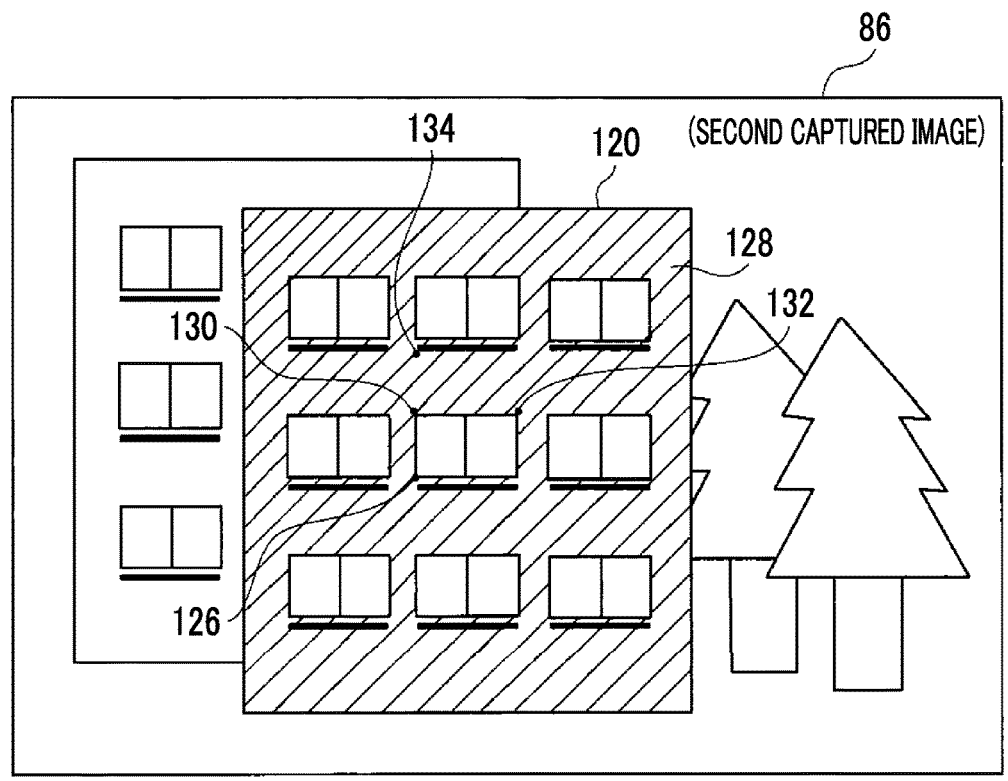
FIG. 24 is a schematic image illustrating an example of a second captured image, obtained by performing imaging using the imaging device according to the first embodiment, in which an attention pixel and first to third pixels are specified.

In the example illustrated in FIG. 24, the three characteristic pixels are a first pixel 130, a second pixel 132, and a third pixel 134. The first pixel 130 is a pixel at the upper left corner in a front view of an image equivalent to a central window in the second floor of the outer wall surface in the outer wall surface image 128. The second pixel 132 is a pixel at the upper right corner in a front view of the image equivalent to the central window in the second floor of the outer wall surface. The third pixel 134 is a pixel at the lower left corner in a front view of an image equivalent to the pattern 124 close to a lower portion of a central window in a third floor of the outer wall surface. Meanwhile, the central window in the third floor of the outer wall surface refers to a central window 122 in the third floor of the office building 120 among the windows 122 provided on the outer wall surface 121, in the example illustrated in FIG. 17.

In step 304, the acquisition unit 110A specifies three characteristic pixels in an outer wall surface image corresponding to the outer wall surface image 128 (see FIG. 24) in the second captured image and acquires corresponding characteristic pixel coordinates for specifying the specified three characteristic pixels, and then the process proceeds to step 306. Meanwhile, the corresponding characteristic pixel coordinates refer to two-dimensional coordinates for specifying the three characteristic pixels specified in the first captured image. In addition, the corresponding characteristic pixel coordinates are also two-dimensional coordinates corresponding to the three characteristic pixel coordinates acquired in the processing of step 302 in the first captured image, and are equivalent to the above-described plurality of pixel coordinates. In addition, the three characteristic pixels in the first captured image are specified by executing the existing image analysis, such as pattern matching, by using the first and second captured images as objects to be analyzed, similar to the above-described method of specifying a corresponding attention pixel.

In step 306, the execution unit 112A derives a, b, and c of the plane equation shown in Expression (6) from the three characteristic pixel coordinates, the corresponding characteristic pixel coordinates, the focal length of the imaging lens 50, and the dimension of the imaging pixel 60A1 to derive the direction of a plane specified by the plane equation.

Here, the three characteristic pixel coordinates are set to be $(u_{L1}, v_{L1})$, $(u_{L2}, v_{L2})$, and $(u_{L3}, v_{L3})$ and the corresponding characteristic pixel coordinates are set to be $(u_{R1}, v_{R1})$, $(u_{R2}, v_{R2})$, and $(u_{R3}, v_{R3})$, first to third characteristic pixel three-dimensional coordinates are specified by the following Expressions (7) to (9). The first characteristic pixel three-dimensional coordinates refer to three-dimensional coordinates corresponding to $(u_{L1}, v_{L1})$ and $(u_{R1}, v_{R1})$. The second characteristic pixel three-dimensional coordinates refer to three-dimensional coordinates corresponding to $(u_{L2}, v_{L2})$ and $(u_{R2}, v_{R2})$. The third characteristic pixel three-dimensional coordinates indicate three-dimensional coordinates corresponding to $(u_{L3}, v_{L3})$ and $(u_{R3}, v_{R3})$. Meanwhile, in Expressions (7) to (9), "$v_{R1}$", "$v_{R2}$", and "$v_{R3}$" are not used.

first characteristic pixel three-dimensional coordinates: $\left(\dfrac{B}{u_{L1}-u_{R1}}u_{L1}, \dfrac{B}{u_{L1}-u_{R1}}v_{L1}, \dfrac{B}{u_{L1}-u_{R1}}f\right)$ (7)

second characteristic pixel three-dimensional coordinates: $\left(\dfrac{B}{u_{L2}-u_{R2}}u_{L2}, \dfrac{B}{u_{L2}-u_{R2}}v_{L2}, \dfrac{B}{u_{L2}-u_{R2}}f\right)$ (8)

third characteristic pixel three-dimensional coordinates: $\left(\dfrac{B}{u_{L3}-u_{R3}}u_{L3}, \dfrac{B}{u_{L3}-u_{R3}}v_{L3}, \dfrac{B}{u_{L3}-u_{R3}}f\right)$, (9)

In step 306, the execution unit 112A derives a, b, and c in Expression (6) by optimizing a, b, and c in Expression (6) from three expressions having an equivalence relationship obtained by substituting each of the first to third characteristic pixel three-dimensional coordinates shown in Expressions (7) to (9) for Expression (6). In this manner, the derivation of a, b, and c in Expression (6) means that the direction of the plane specified by the plane equation shown in Expression (6) is derived.

In step 308, the execution unit 112A decides the plane equation shown in Expression (6) on the basis of the irradiation position real space coordinates derived in the processing of step 242, and then the process proceeds to step 310. That is, in step 308, the execution unit 112A substitutes a, b, and c derived in the processing of step 306 and the irradiation position real space coordinates derived in the processing of step 242 for Expression (6) to decide d in Expression (6). Since a, b, and c in Expression (6) are derived in the processing of step 306, the plane equation shown in Expression (6) is decided when d in Expression (6) is decided in the processing of step 308.

In step 310, the execution unit 112A derives an imaging position distance on the basis of the characteristic pixel three-dimensional coordinates and the plane equation, and then the process proceeds to step 274 illustrated in FIG. 15. Meanwhile, the processing of step 310 is an example of processing included in "the predetermined process" according to the technique of this disclosure.

Here, the characteristic pixel three-dimensional coordinates used in the processing of step 310 refers to first characteristic pixel three-dimensional coordinates. Meanwhile, the characteristic pixel three-dimensional coordinates used in the processing of step 310 are not limited to the first characteristic pixel three-dimensional coordinates, and may be second characteristic pixel three-dimensional coordinates or third characteristic pixel three-dimensional coordinates. In addition, the plane equation used in the processing of step 310 refers to the plane equation decided in step 308L.

Accordingly, in step 310, the characteristic pixel three-dimensional coordinates are substituted for the plane equation, and thus "B" which is an imaging position distance is derived.

Meanwhile, the processing of step 272 illustrated in FIG. 14 is equivalent to the above-described first derivation process, and the processing of step 310 illustrated in FIG. 16 is equivalent to the above-described second derivation process. That is, in the processing of step 272, it is not necessary to use a plane equation as in the processing of step 310. For this reason, a load on the derivation of the imaging position distance in the first derivation process is lower than that in the second derivation process. In a case where the real irradiation position of a laser beam is consistent with the position on the real space which corresponds to a specifiable pixel position, the accuracy of derivation of the imaging position distance by the first derivation process becomes higher than the accuracy of derivation of the imaging position distance by the second derivation process.

Next, reference will be made to FIG. 25 to describe a three-dimensional coordinate derivation process realized by the CPU 100 executing the three-dimensional coordinate derivation program 108A in a case where the three-dimensional coordinate derivation button 90G is turned on.

Figure 25:
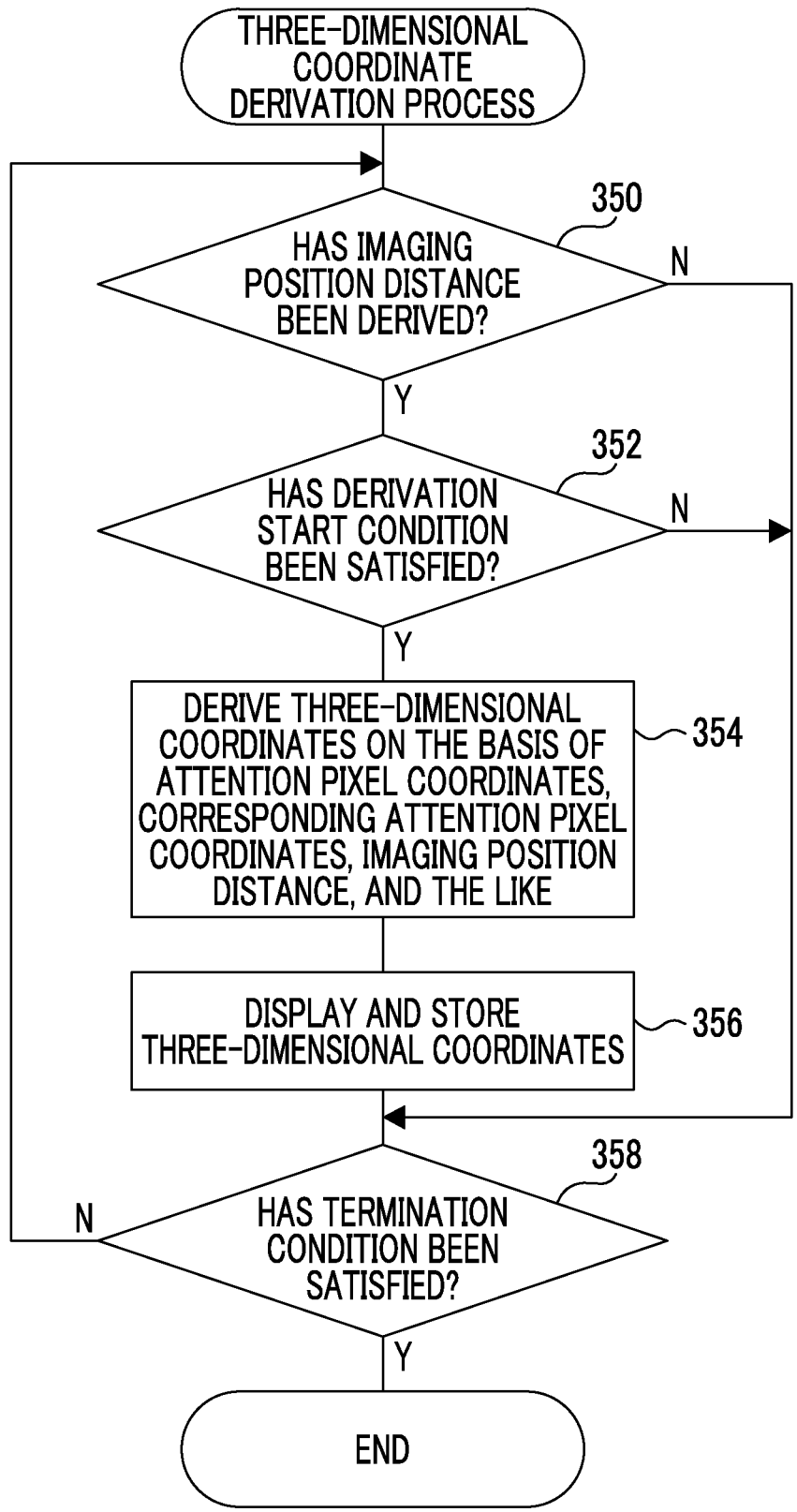
FIG. 25 is a flowchart illustrating an example of a flow of a three-dimensional coordinate derivation process according to the first embodiment.

In the three-dimensional coordinate derivation process illustrated in FIG. 25, first, in step 350, the execution unit 112A determines whether or not an imaging position distance has already been derived in the processing of step 272 or the processing of step 310. In step 350, in a case where an imaging position distance has not been derived in any of the processing of step 272 and the processing of step 310, the determination result is negative, and the process proceeds to step 358. In step 350, in a case where an imaging position distance has already been derived in the processing of step 272 or the processing of step 310, the determination result is positive, and the process proceeds to step 352.

In step 352, the execution unit 112A determines whether or not a condition (hereinafter, referred to as a "derivation start condition") for starting the derivation of designated pixel three-dimensional coordinates has been satisfied. An example of the derivation start condition is a condition that an instruction for starting the derivation of the designated pixel three-dimensional coordinates is received through the touch panel 88, or a condition that the imaging position distance is displayed on the display unit 86.

In step 352, in a case where the derivation start condition has not been satisfied, the determination result is negative, and the process proceeds to step 358. In step 352, in a case where the derivation start condition has been satisfied, the determination result is positive, and the process proceeds to step 354.

In step 354, the execution unit 112A derives designated pixel three-dimensional coordinates on the basis of the attention pixel coordinates, the corresponding attention pixel coordinates, the imaging position distance, the focal length of the imaging lens 50, the dimension of the imaging pixel 60A1, and Expression (1), and then the process proceeds to step 356.

Here, the attention pixel coordinates used in the processing of step 354 refer to the attention pixel coordinates acquired in the processing of step 212. In addition, the corresponding attention pixel coordinates used in the processing of step 354 refer to the corresponding attention pixel coordinates acquired in the processing of step 268 or the processing of step 300. In addition, the imaging position distance used in the processing of step 354 refers to the imaging position distance which is derived in the processing of step 272 or the processing of step 310.

Accordingly, in step 354, the designated pixel three-dimensional coordinates are derived by substituting the attention pixel coordinates, the corresponding attention pixel coordinates, the imaging position distance, the focal length of the imaging lens 50, and the dimension of the imaging pixel 60A1 for Expression (1).

Figure 26:
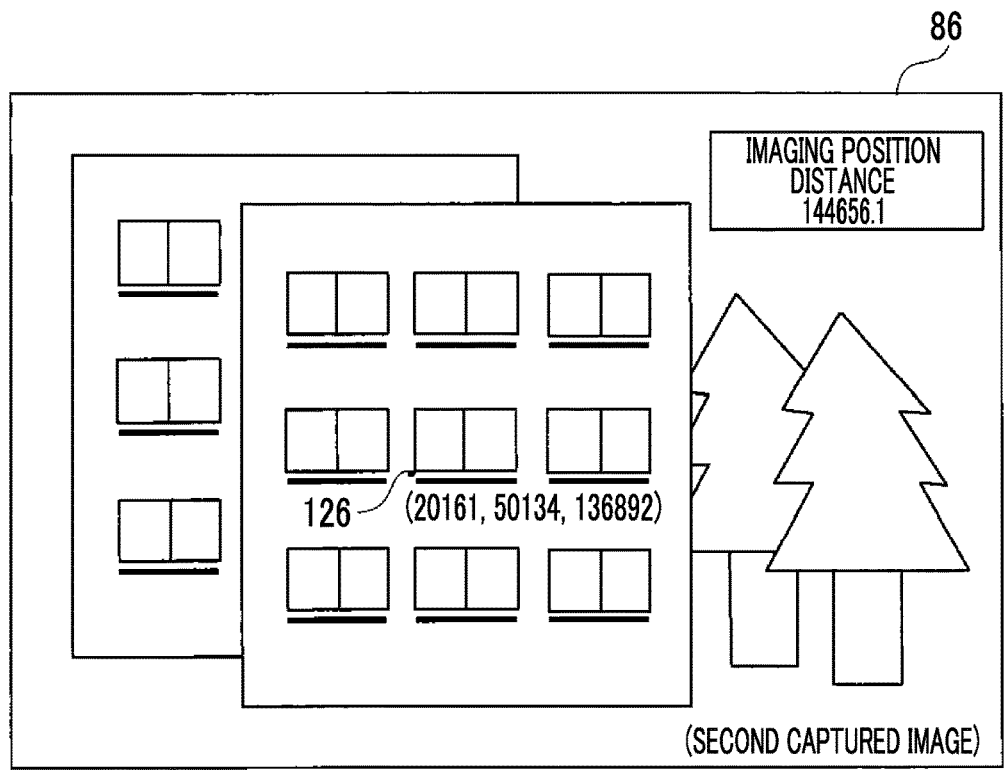
FIG. 26 is a schematic image illustrating an example of a second captured image, obtained by performing imaging using the imaging device according to the first embodiment, on which an imaging position distance and designated pixel three-dimensional coordinates are displayed in an overlapping manner.

In step 356, the execution unit 112A displays the designated pixel three-dimensional coordinates derived in the processing of step 354 on the display unit 86 so as to be superimposed on the second captured image, as illustrated in FIG. 26 as an example. In step 356, the execution unit 112A stores the designated pixel three-dimensional coordinates derived in the processing of step 354 in the secondary storage unit 104, and then the process proceeds to step 358.

Meanwhile, in the example illustrated in FIG. 26, (20161, 50134, 136892) corresponds to the designated pixel three-dimensional coordinates derived in the processing of step 354. In the example illustrated in FIG. 26, the designated pixel three-dimensional coordinates are displayed in proximity to the attention pixel 126. Meanwhile, the attention pixel 126 may be emphatically displayed so as to be distinguishable from other pixels.

In step 358, the execution unit 112A determines whether or not a condition for terminating the three-dimensional coordinate derivation process has been satisfied. An example of the condition for terminating the three-dimensional coordinate derivation process is a condition that an instruction for terminating the three-dimensional coordinate derivation process is received through the touch panel 88. Another example of the condition for terminating the three-dimensional coordinate derivation process is a condition that the determination result is not positive in step 350 after the determination result in step 350 is negative and a second predetermined time elapses, and the like. Meanwhile, the second predetermined time refers to, for example, 30 minutes.

In step 358, in a case where the condition for terminating the three-dimensional coordinate derivation process has not been satisfied, the determination result is negative, and the process proceeds to step 350. In step 358, in a case where the condition for terminating the three-dimensional coordinate derivation process has been satisfied, the determination result is positive, and thus the three-dimensional coordinate derivation process is terminated.

As described above, in the distance measurement device 10A, the second captured image is acquired by the acquisition unit 110A as a live view image. Whenever the second captured image is captured by the acquisition unit 110A, a distance to the subject which is measured by the distance measurement unit 12 and the distance measurement control unit 68 is acquired. In addition, second irradiation position pixel coordinates are derived by the derivation unit 111A on the basis of the distance to the subject which is acquired by the acquisition unit 110A, for each second captured image acquired by the acquisition unit 110A. In a case where the position of the pixel which is specified by the second irradiation position pixel coordinates is a specifiable pixel position, the processing of step 254, the processing of step 272, and the processing of step 278 to the processing of step 282 (see FIGS. 13 to 15) are executed by the execution unit 112A for each second captured image. In a case where the position of the pixel which is specified by the second irradiation position pixel coordinates is not a specifiable pixel position, the processing of step 256, the processing of step 310, and the processing of step 278 to the processing of step 282 (see FIGS. 13, 15, and 16) are executed for each second captured image acquired.

Therefore, according to the distance measurement device 10A, it is possible to immediately execute the processing of step 254, the processing of step 256, the processing of step 272, the processing of step 310, and the processing of step 278 to the processing of step 282 which are processing based on an irradiation position of a laser beam with respect to the subject.

Meanwhile, in a case where the position of the pixel which is specified by the second irradiation position pixel coordinates is a specifiable pixel position (step 252: Y), the technique of this disclosure is established in a case where at least one processing among the processing of step 254, the processing of step 272, and the processing of step 278 to the processing of step 282 is executed. In a case where the position of the pixel which is specified by the second irradiation position pixel coordinates is not a specifiable pixel position (step 252: N), the technique of this disclosure is established in a case where at least one processing among the processing of step 256, the processing of step 310, and the processing of step 278 to the processing of step 282 is executed.

With regard to each of at least two second captured images included in a moving image, when the processing such as the processing of step 254 is executed in a case where the position of the pixel which is specified by the second irradiation position pixel coordinates is a specifiable pixel position, the technique of this disclosure is established. When the processing such as the processing of step 256 is not executed in a case where the position of the pixel which is specified by the second irradiation position pixel coordinates is not a specifiable pixel position, the technique of this disclosure is established. Meanwhile, here, the processing of step 256 and the like refer to at least one processing, for example, among the processing of step 256, the processing of step 272, and the processing of step 278 to the processing of step 282.

In the distance measurement device 10A, the processing of step 254 (see FIG. 13) is executed by the execution unit 112A in a case where the position of the pixel which is specified by the second irradiation position pixel coordinates is a specifiable pixel position, for each second captured image acquired by the acquisition unit 110A. The processing of step 254 is executed, and thus the consistency message 137A is displayed (see FIG. 21).

Therefore, according to the distance measurement device 10A, it is possible to make the user immediately recognize that the position of the pixel which is specified by the second irradiation position pixel coordinates is a specifiable pixel position.

In the distance measurement device 10A, irradiation position real space coordinates are derived for each second captured image acquired by the acquisition unit 110A, on the basis of a distance corresponding to the second captured image among the distances to the subject which are acquired by the acquisition unit 110A (see step 242). In a case where the subsequent processing permission instruction is received in a state where the consistency message 137A is displayed (step 260: Y), the processing of step 272 (see FIG. 14) is executed by the execution unit 112A.

Therefore, according to the distance measurement device 10A, it is possible to derive the imaging position distance at a timing required by the user, in a case where the position of the pixel which is specified by the second irradiation position pixel coordinates is a specifiable pixel position.

In the distance measurement device 10A, the processing of step 256 (see FIG. 13) is executed for each second captured image acquired by the acquisition unit 110A, in a case where the position of the pixel which is specified by the second irradiation position pixel coordinates is not a specifiable pixel position. The processing of step 256 is executed, and thus the inconsistency message 137B is displayed (see FIG. 22).

Therefore, according to the distance measurement device 10A, it is possible to make the user immediately recognize that the position of the pixel which is specified by the second irradiation position pixel coordinates is not a specifiable pixel position.

In the distance measurement device 10A, the processing of step 310 (see FIG. 16) is executed by the execution unit 112A in a case where the subsequent processing permission instruction is received (step 292: Y) in a state where the inconsistency message 137B is displayed.

Therefore, according to the distance measurement device 10A, it is possible to derive an imaging position distance at a timing required by the user, in a case where the position of the pixel which is specified by the second irradiation position pixel coordinates is not a specifiable pixel position.

In the distance measurement device 10A, information based on the latest second captured image, among the plurality of second captured images acquired as a live view image, and the latest distance among the distances to the subject which are measured by the distance measurement unit 12 and the distance measurement control unit 68 is stored in the secondary storage unit 104.

Therefore, according to the distance measurement device 10A, it is possible to store the information based on the latest second captured image and the latest distance in the immediately secondary storage unit 104, in accordance with an irradiation position of a laser beam with respect to the subject.

In addition, the distance measurement device 10A includes the distance measurement unit 12 and the distance measurement control unit 68, and a distance to the subject which is measured by the distance measurement unit 12 and the distance measurement control unit 68 is acquired by the acquisition unit 110A.

Therefore, according to the distance measurement device 10A, it is possible to use the distance to the subject which is measured by the distance measurement unit 12 and the distance measurement control unit 68 for the derivation of the second irradiation position pixel coordinates.

Further, the distance measurement device 10A includes the imaging device 14, and the plurality of second captured images which are obtained by imaging the subject by the imaging device 14 are acquired by the acquisition unit 110A.

Therefore, according to the distance measurement device 10A, it is possible to immediately perform the processing of step 254, the processing of step 256, the processing of step 272, the processing of step 310, and the processing of step 278 to the processing of step 282 which are processing based on the irradiation position of the laser beam with respect to the subject, by using the plurality of second captured images obtained by the imaging of the imaging device 14.

Meanwhile, in the above-described first embodiment, a description has been given of a case where the first captured image is captured at the first position as a still image by the distance measurement device 10A, but the technique of this disclosure is not limited thereto. For example, the first captured image may be captured at the first position as a live view image. In addition, the first captured image may be captured at the first position as a moving image for recording in the memory card 92.

In the above-described first embodiment, a description has been given of a case where the second captured image is captured at the second position as a live view image, but the technique of this disclosure is not limited thereto. For example, the second captured image may be captured at the second position as a moving image for recording in the memory card 92.

In the first embodiment, the three characteristic pixel coordinates are described, but the technique of this disclosure is not limited thereto. For example, two-dimensional coordinates for specifying each of a predetermined number of pixels more than four characteristic pixels may be adopted instead of the three characteristic pixel coordinates.

In the first embodiment, a description has been given of a case where the attention pixel coordinates are acquired from coordinates on the first captured image and the corresponding attention pixel coordinates are acquired from coordinates on the second captured image, but the technique of this disclosure is not limited thereto. For example, the attention pixel coordinates may be acquired from the coordinates on the second captured image, and the corresponding attention pixel coordinates may be acquired from the coordinates on the first captured image.

In the first embodiment, a description has been given of a case where the three characteristic pixel coordinates are acquired from coordinates on the first captured image and the corresponding characteristic pixel coordinates are acquired from coordinates on the second captured image, but the technique of this disclosure is not limited thereto. For example, the three characteristic pixel coordinates may be acquired from the coordinates on the second captured image, and the corresponding characteristic pixel coordinates may be acquired from the coordinates on the first captured image.

Figure 27:
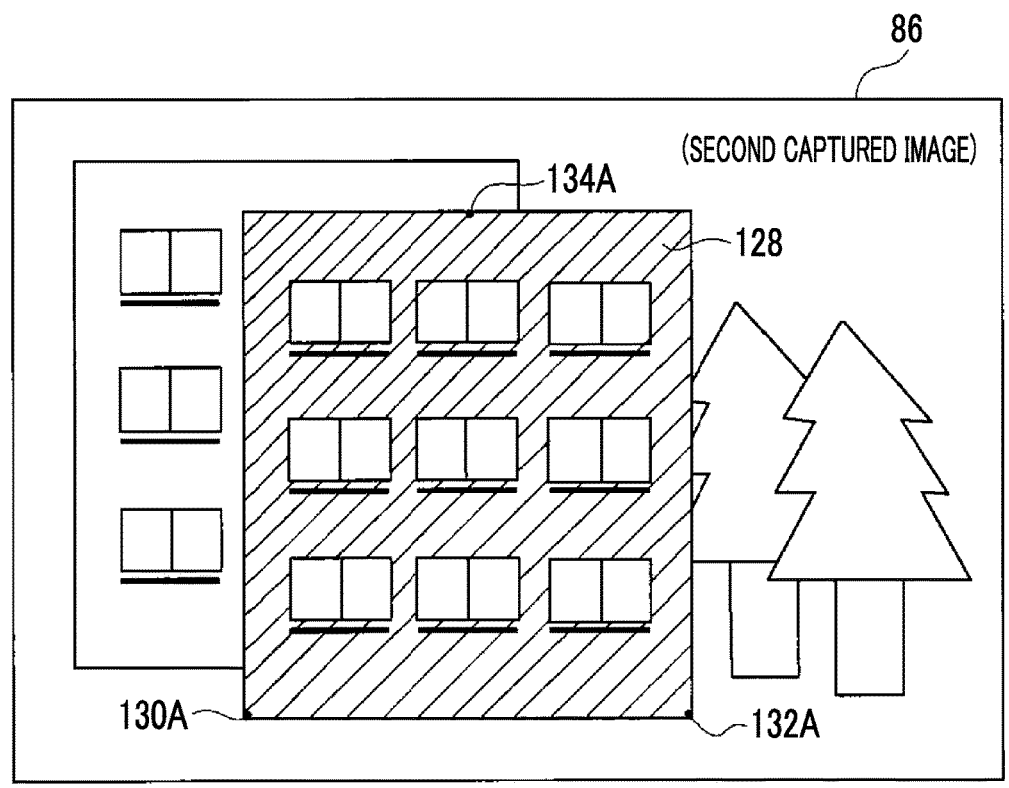
FIG. 27 is a schematic image illustrating an example of a second captured image, obtained by performing imaging using the imaging device according to the first embodiment, in which first to third pixels are specified.

In the first embodiment, a description has been given of a case where two-dimensional coordinates for specifying each of the first pixel 130, the second pixel 132, and the third pixel 134 are acquired by the acquisition unit 110A as three characteristic pixel coordinates, but the technique of this disclosure is not limited thereto. For example, as illustrated in FIG. 27, two-dimensional coordinates for specifying each of a first pixel 130A, a second pixel 132A, and a third pixel 134A may be acquired by the acquisition unit 110A. The first pixel 130A, the second pixel 132A, and the third pixel 134A are three pixels for maximizing an area surrounded in the outer wall surface image 128. Meanwhile, the invention is not limited to the three pixels, and the pixels may be a predetermined number of pixels more than three pixels for maximizing an area surrounded in the outer wall surface image 128.

In this manner, in the example illustrated in FIG. 27, three pixels for maximizing an area surrounded in the outer wall surface image 128 are specified as three characteristic pixels, and two-dimensional coordinates related to the specified the three pixels are acquired by the acquisition unit 110A as three characteristic pixel coordinates. In addition, corresponding characteristic pixel coordinates corresponding to the three characteristic pixel coordinates are also acquired by the acquisition unit 110A. Therefore, according to the distance measurement device 10A, it is possible to derive an imaging position distance with a high level of accuracy, as compared to a case where three characteristic pixel coordinates for specifying a plurality of pixels not for maximizing an area surrounded and corresponding characteristic pixel coordinates are acquired as three characteristic pixels.

In the first embodiment, a description has been given of a case where the imaging position distance derivation process is realized when the three-dimensional coordinate derivation button 90G is turned on, but the technique of this disclosure is not limited thereto. For example, the imaging position distance derivation process may be executed in a case where the imaging position distance derivation button 90F is turned on. The imaging position distance derivation process described in the first embodiment is an example in a case where the derivation of three-dimensional coordinates is set to be the final purpose.

For this reason, attention pixel coordinates and corresponding attention pixel coordinates which are required in the derivation of three-dimensional coordinates are acquired through the imaging position distance derivation process. However, in a case where only the derivation of an imaging position distance is a purpose, it is not necessary to acquire attention pixel coordinates and corresponding attention pixel coordinates in the imaging position distance derivation process. Accordingly, the execution unit 112A may derive the imaging position distance without acquiring the attention pixel coordinates and the corresponding attention pixel coordinates in a case where the imaging position distance derivation button 90F is turned on, and may then acquire the attention pixel coordinates and the corresponding attention pixel coordinates in a case where the three-dimensional coordinate derivation button 90G is turned on. In this case, the execution unit 112A may acquire the attention pixel coordinates and the corresponding attention pixel coordinates, for example, between the processing of step 352 and the processing of step 354 of the three-dimensional coordinate derivation process illustrated in FIG. 25, and may use the acquired attention pixel coordinates and corresponding attention pixel coordinates in the processing of step 354.

Second Embodiment

In the above-described first embodiment, a description has been given of a case where an imaging position distance is derived on the condition that a subsequent processing permission instruction is received, but a description will be given of a case where an imaging position distance is derived without a subsequent processing permission instruction in a second embodiment. Meanwhile, in the second embodiment, the same components as those described in the first embodiment will be denoted by the same reference numerals and signs, and a description thereof will be omitted.

A distance measurement device 10B according to the second embodiment is different from the distance measurement device 10A as illustrated in FIG. 6 as an example in that an imaging position distance derivation program 106B is stored in a secondary storage unit 104 instead of the imaging position distance derivation program 106A.

A CPU 100 executes the imaging position distance derivation program 106B, and is thus operated as an acquisition unit 110B, a derivation unit 111B, and an execution unit 112B (see FIG. 9).

The acquisition unit 110B corresponds to the acquisition unit 110A described in the above-described first embodiment, the derivation unit 111B corresponds to the derivation unit 111A described in the above-described first embodiment, and the execution unit 112B corresponds to the execution unit 112A described in the above-described first embodiment. Meanwhile, in the second embodiment, only differences between the acquisition unit 110B, the derivation unit 111B, and the execution unit 112B in the second embodiment and the corresponding units in the above-described first embodiment will be described.

The execution unit 112B executes the first derivation process described in the above-described first embodiment in a case where the predetermined first condition described in the above-described first embodiment is satisfied for each second captured image acquired by the acquisition unit 110B.

Figure 29:
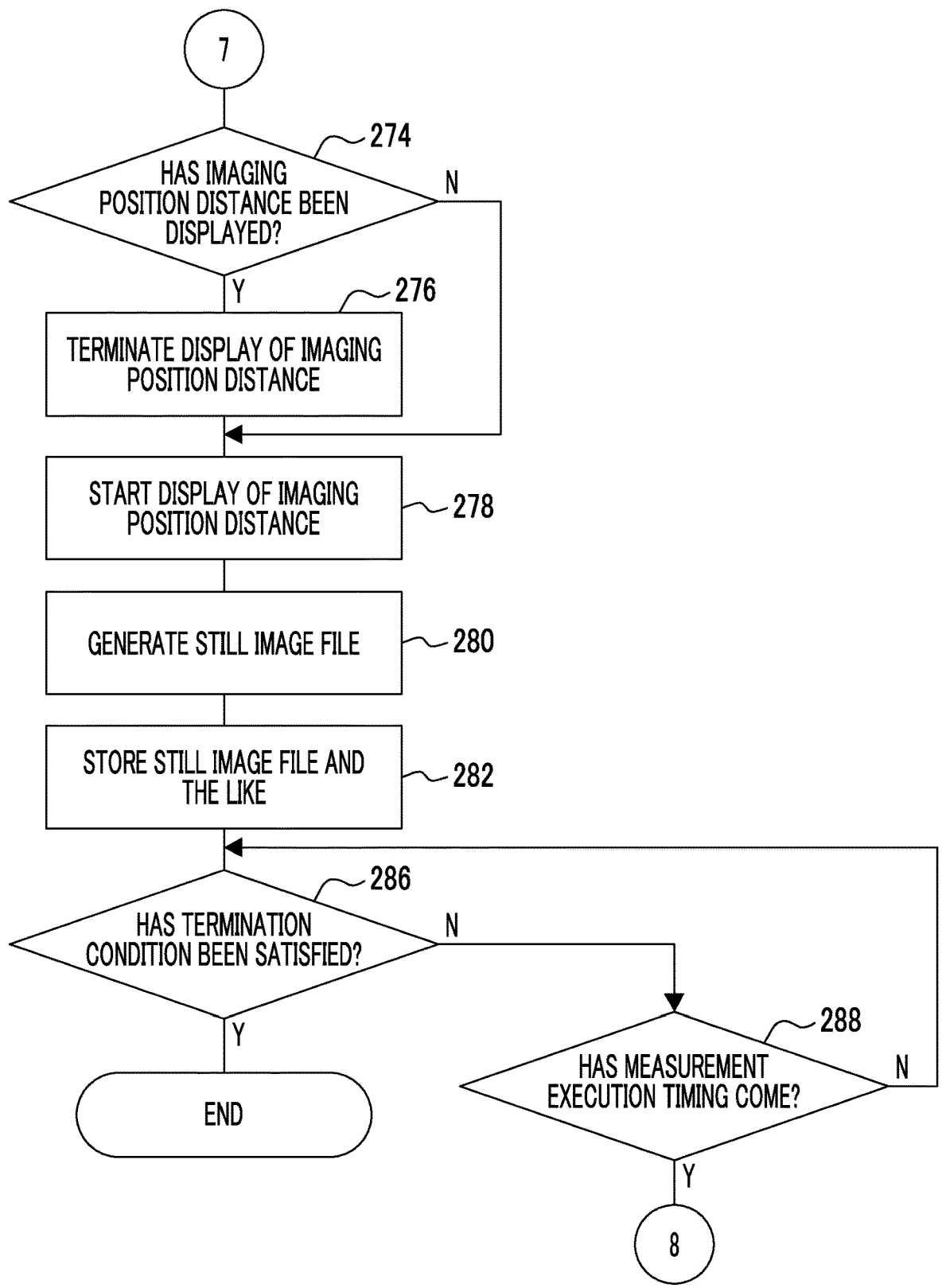
FIG. 29 is the continuation of the flowchart illustrated in FIG. 28.
Figure 30:
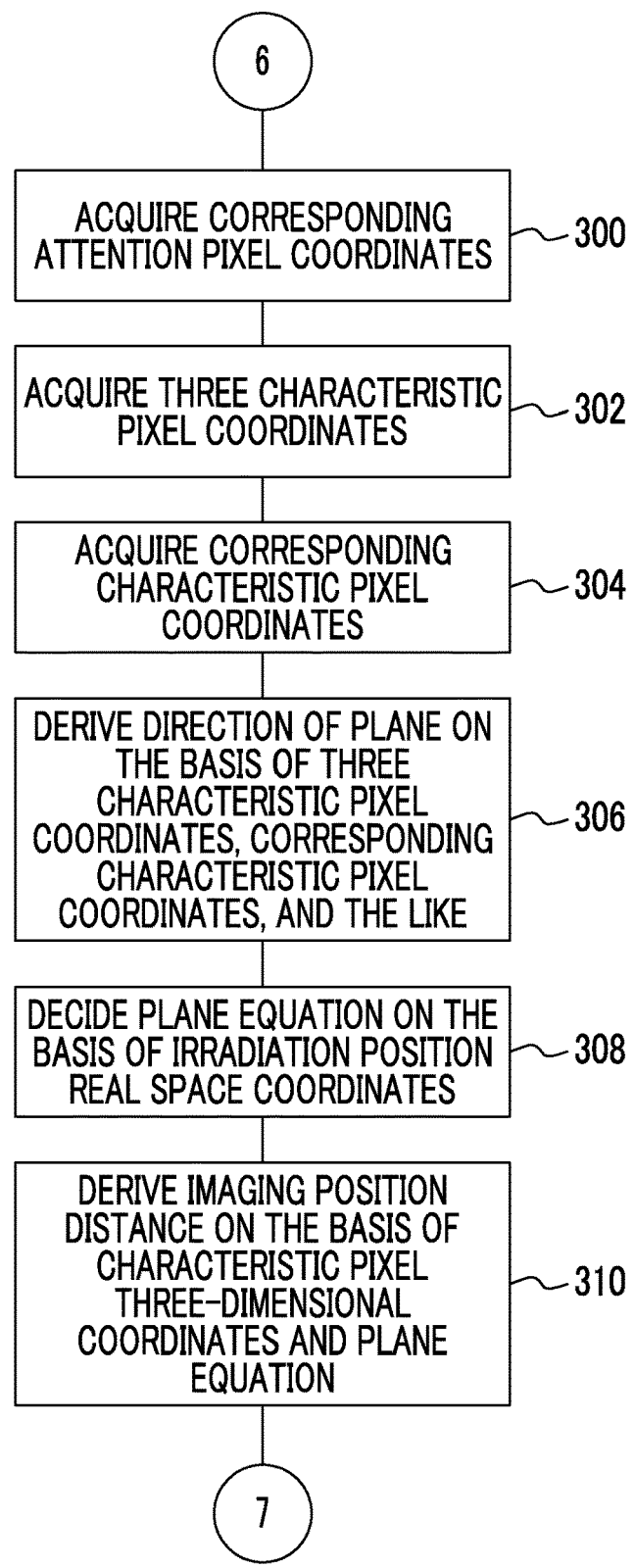
FIG. 30 is the continuation of the flowchart illustrated in FIG. 28.

Next, a second position measurement imaging process included in an imaging position distance derivation process realized by the CPU 100 executing the imaging position distance derivation program 106B will be described with reference to FIGS. 28 to 30, as the operation of portions of the distance measurement device 10B according to the technique of this disclosure. Meanwhile, the same steps as those in the flowchart illustrated in FIGS. 13 to 16 will be denoted by the same step numbers, and a description thereof will be omitted.

Figure 28:
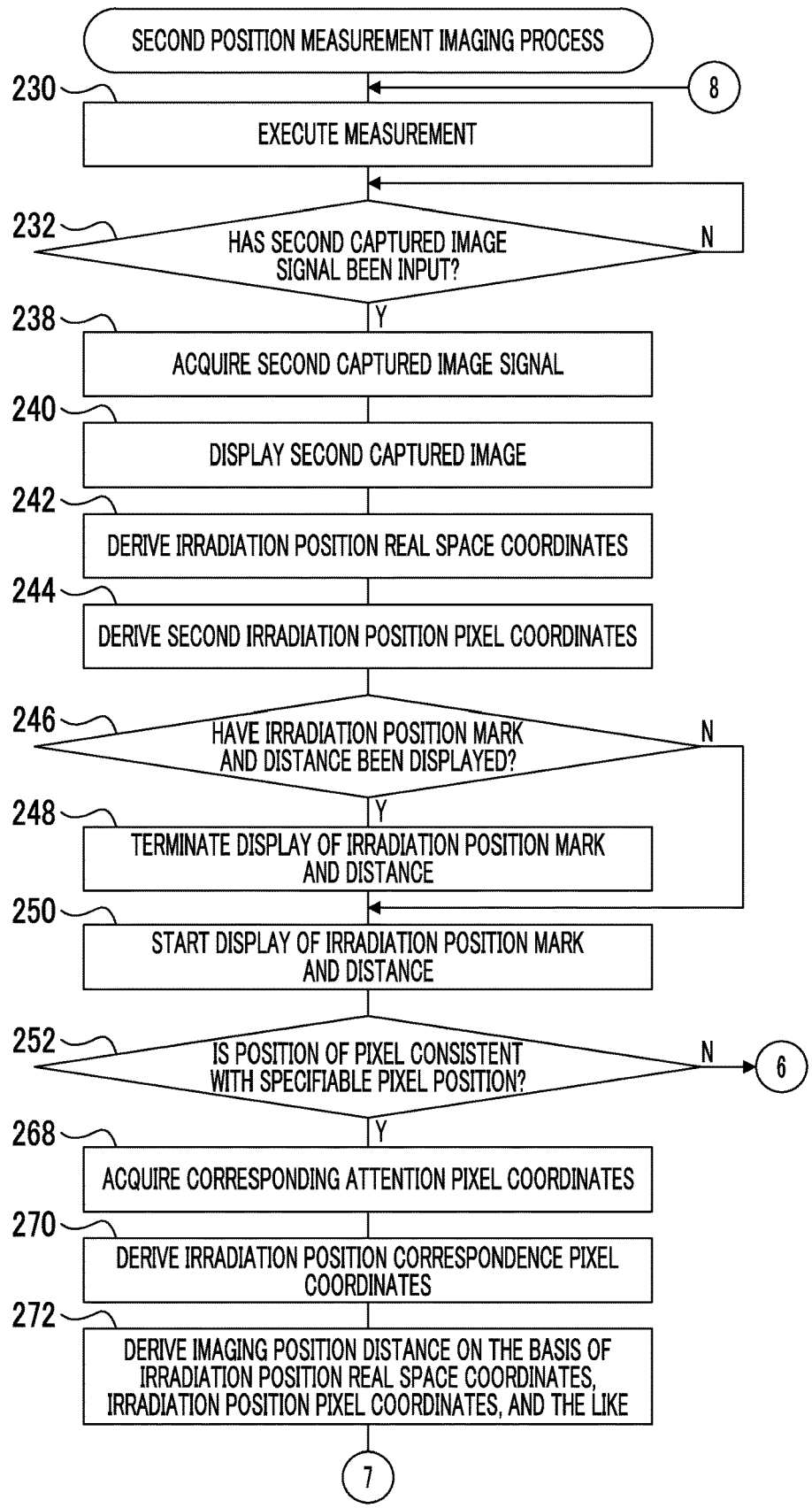
FIG. 28 is a flowchart illustrating an example of a flow of a second position measurement imaging process according to the second embodiment.

The second position measurement imaging process according to the second embodiment is different from the second position measurement imaging process according to the above-described first embodiment in that the processing of step 234 and the processing of step 236 are not provided (see FIGS. 13 and 28). In addition, the second position measurement imaging process according to the second embodiment is different from the second position measurement imaging process according to the above-described first embodiment in that the processing of step 254, the processing of step 256, and the processing of step 258 to the processing of step 266 are not provided (see FIGS. 13, 14, and 28). The second position measurement imaging process according to the second embodiment is different from the second position measurement imaging process according to the above-described first embodiment in that the processing of step 284 is not provided (see FIGS. 15 and 29). Further, the second position measurement imaging process according to the second embodiment is different from the second position measurement imaging process according to the above-described first embodiment in that the processing of step 290 to the processing of step 298 are not provided (see FIGS. 16 and 30).

For this reason, in the distance measurement device 10B, a second captured image is acquired by the acquisition unit 110B as a live view image (see step 238). In addition, a distance to a subject which is measured by a distance measurement unit 12 and a distance measurement control unit 68 is acquired whenever the second captured image is acquired by the acquisition unit 110B (see step 230). In addition, irradiation position real space coordinates are derived by the derivation unit 111B on the basis of the distance to the subject which is acquired by the acquisition unit 110B, for each second captured image acquired by the acquisition unit 110B (see step 242). The processing of step 272 and the processing of step 278 to the processing of step 282 (see FIGS. 28 and 29) are executed by the execution unit 112B for each second captured image in a case where the position of the pixel which is specified by the second irradiation position pixel coordinates is a specifiable pixel position. In addition, the processing of step 310 and the processing of step 278 to the processing of step 282 (see FIGS. 28 and 29) are executed for each second captured image acquired in a case where the position of the pixel which is specified by the second irradiation position pixel coordinates is not a specifiable pixel position.

Therefore, according to the distance measurement device 10A, it is possible to immediately execute the processing of step 272, the processing of step 310, and the processing of step 278 to the processing of step 282 which are processing based on an irradiation position of a laser beam with respect to the subject.

Third Embodiment

In the above-described first embodiment, a description has been given of a case where three characteristic pixel coordinates are acquired with respect to the entire outer wall surface image 128, but a description will be given of a case where three characteristic pixel coordinates are acquired with respect to a portion of the outer wall surface image 128 in a third embodiment. Meanwhile, in the third embodiment, the same components as those described in the first embodiment will be denoted by the same reference numerals and signs, and a description thereof will be omitted.

A distance measurement device 10C according to the third embodiment is different from the distance measurement device 10A in that a secondary storage unit 104 stores an imaging position distance derivation program 106C instead of the imaging position distance derivation program 106A, as illustrated in FIG. 6 as an example.

A CPU 100 executes the imaging position distance derivation program 106C, and is thus operated as an acquisition unit 110C, a derivation unit 111C, and an execution unit 112C (see FIG. 9).

The acquisition unit 110C corresponds to the acquisition unit 110A described in the above-described first embodiment, the derivation unit 111C corresponds to the derivation unit 111A described in the above-described first embodiment, and the execution unit 112C corresponds to the execution unit 112A described in the above-described first embodiment. Meanwhile, in the third embodiment, only differences between the acquisition unit 110C, the derivation unit 111C, and the execution unit 112C in the third embodiment and the corresponding units in the above-described first embodiment will be described.

Next, an imaging position distance derivation process realized by the CPU 100 executing the imaging position distance derivation program 106C will be described with reference to FIG. 13 and FIGS. 31 to 33, as the operation of portions of the distance measurement device 10C according to the technique of this disclosure. Meanwhile, the same steps as those in the flowchart illustrated in FIGS. 13 to 16 will be denoted by the same step numbers, and a description thereof will be omitted.

Figure 31:
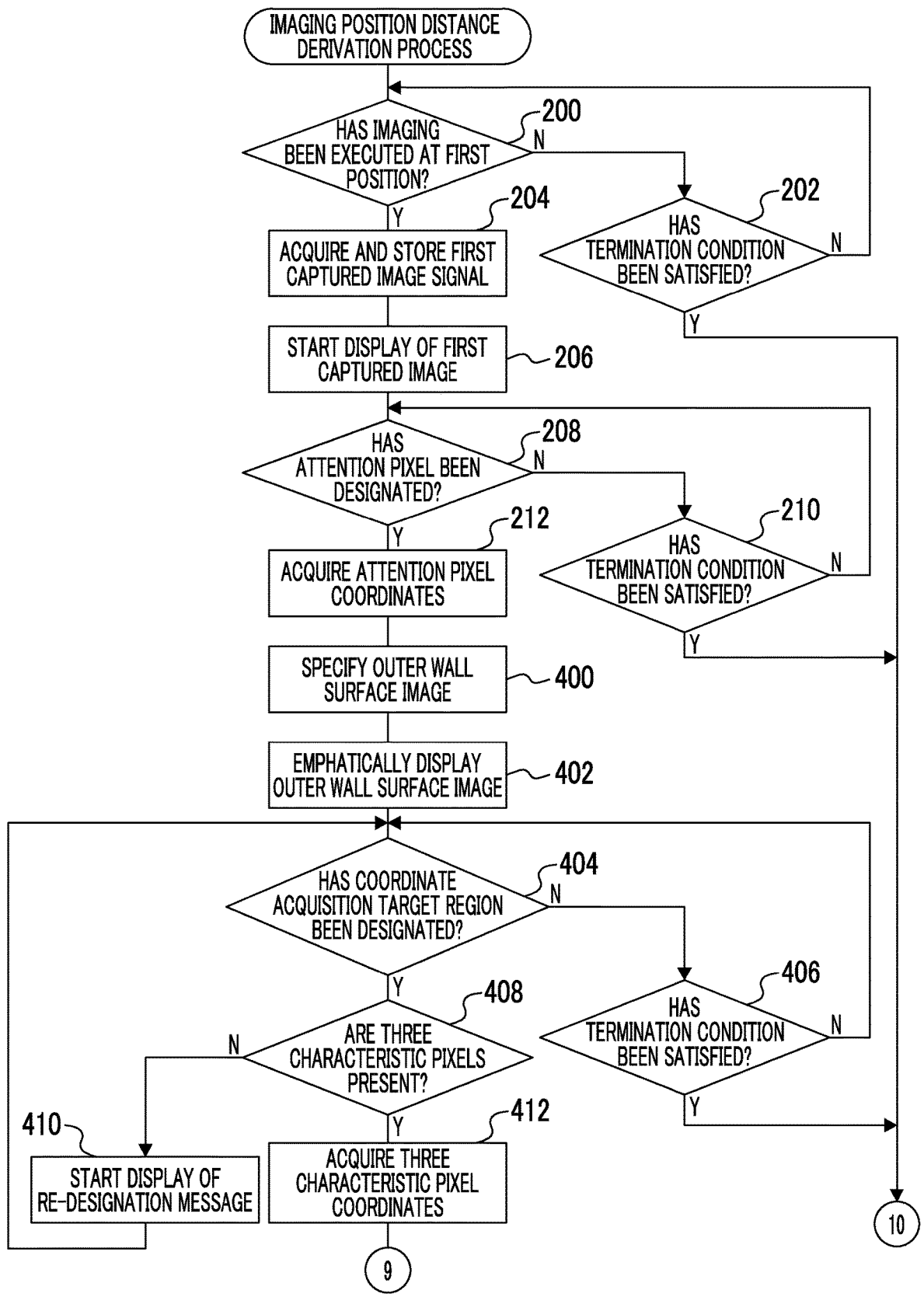
FIG. 31 is a flowchart illustrating an example of a flow of a second position measurement imaging process included in an imaging position distance derivation process according to the third embodiment.
Figure 32:
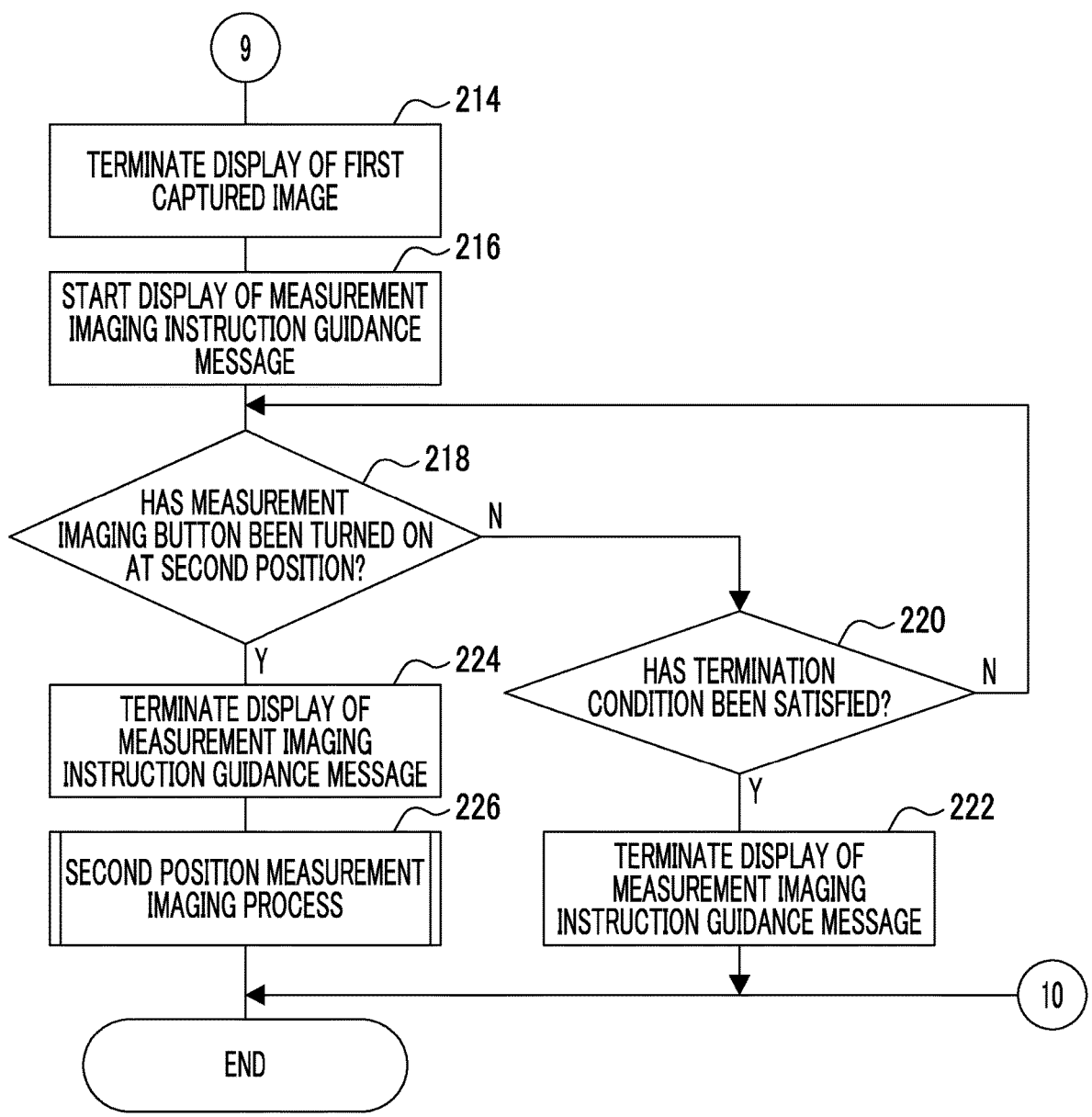
FIG. 32 is the continuation of the flowchart illustrated in FIG. 31.

The imaging position distance derivation process according to the third embodiment is different from the imaging position distance derivation process according to the above-described first embodiment in that the processing of step 400 to the processing of step 412 are provided between the processing of step 212 and the processing of step 214 (see FIGS. 12, 31, and 32). In addition, the second position measurement imaging process according to the third embodiment is different from the second position measurement imaging process according to the above-described first embodiment in that the processing of step 302 is not provided (see FIGS. 16 and 33). Further, the second position measurement imaging process according to the third embodiment is different from the second position measurement imaging process according to the above-described first embodiment in that the processing of step 414 is provided instead of the processing of step 304 (see FIGS. 16 and 33).

In step 400 illustrated in FIG. 31, the execution unit 112C specifies the outer wall surface image 128 (see FIG. 34) from the first captured image, and then the process proceeds to step 402.

In step 402, the execution unit 112C emphatically displays the outer wall surface image 128 specified in the processing of step 400 on the display unit 86 so as to be distinguishable from the other regions within the display region of the first captured image, and then the process proceeds to step 404.

In step 404, the execution unit 112C determines whether or not the region designation information has been received through the touch panel 88 and the coordinate acquisition target region has been designated in accordance with the received region designation information.

In step 404, in a case where the coordinate acquisition target region has not been designated in accordance with the region designation information, the determination result is negative, and the process proceeds to step 406. In step 404, in a case where the coordinate acquisition target region has been designated in accordance with the region designation information, the determination result is positive, and the process proceeds to step 408.

In step 406, the execution unit 112C determines whether or not a condition for terminating the imaging position distance derivation process has been satisfied. In step 406, in a case where the condition for terminating the imaging position distance derivation process has not been satisfied, the determination result is negative, and the process proceeds to step 404. In step 406, in a case where the condition for terminating the imaging position distance derivation process has been satisfied, the determination result is positive, and thus the imaging position distance derivation process is terminated.

In step 408, the execution unit 112C determines whether or not the coordinate acquisition target region 158 (see FIG. 34) designated in accordance with the region designation information received through the touch panel 88 includes the three characteristic pixels described in the first embodiment.

Figure 34:
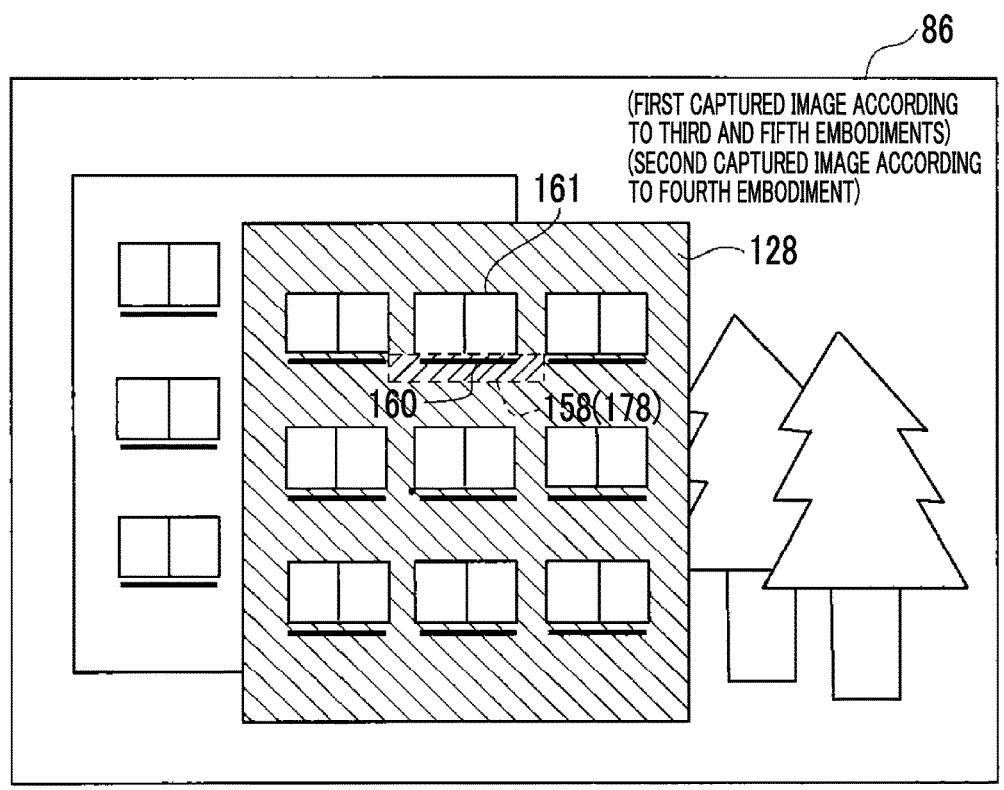
FIG. 34 is a schematic image illustrating an example of a first captured image (second captured image) which is obtained by performing imaging using the imaging device according to the third and fifth embodiments (the imaging device according to the fourth embodiment), the first captured image (second captured image) being in a state where a coordinate acquisition target region is designated.

As illustrated in FIG. 34 as an example, in a case where the coordinate acquisition target region 158 has been designated in accordance with the region designation information received through the touch panel 88, the coordinate acquisition target region 158 includes a pattern image 160 showing a pattern 124 (see FIG. 17).

Figure 35:
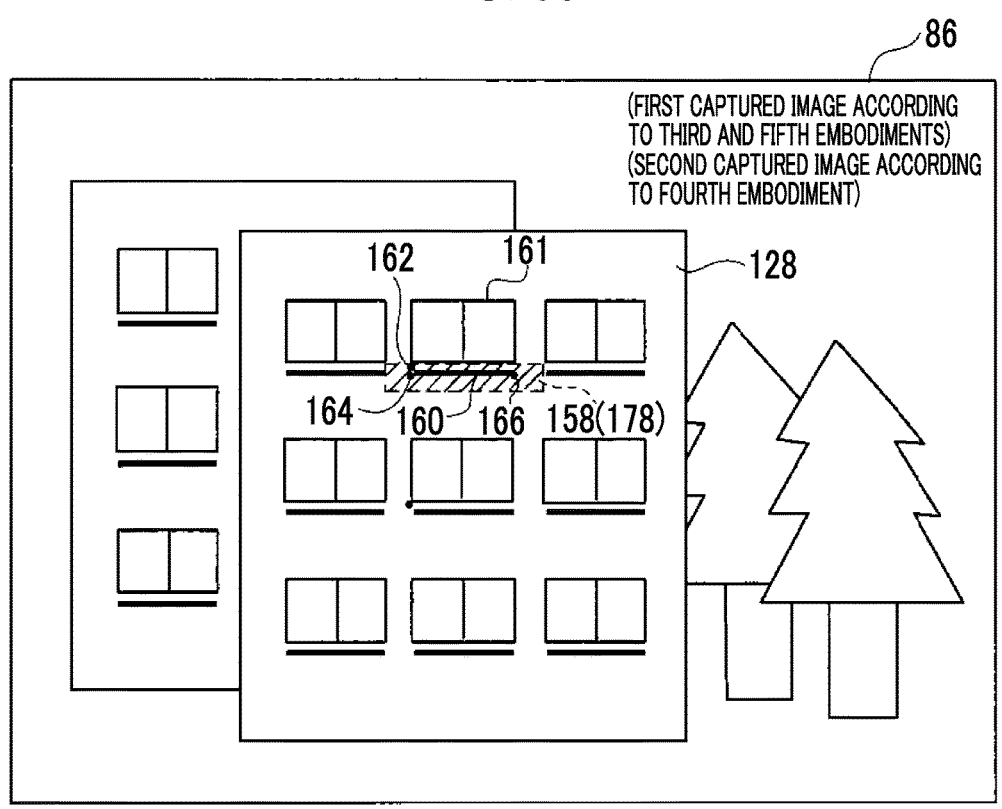
FIG. 35 is a schematic image illustrating an example of a first captured image (second captured image) which is obtained by performing imaging using the imaging device according to the third and fifth embodiments, the first captured image (second captured image) being in a state where in which a coordinate acquisition target region is designated and first to third pixels are specified.

In the example illustrated in FIG. 35, the coordinate acquisition target region 158 includes a first pixel 162, a second pixel 164, and a third pixel 166 as three characteristic pixels. In the example illustrated in FIG. 35, the first pixel 162 is a pixel at the upper left corner in a front view of the pattern image 160, the second pixel 164 is a pixel at the lower left corner in a front view of the pattern image 160, and the third pixel 166 is a pixel at the lower right corner in a front view of the pattern image 160.

In step 408, in a case where the coordinate acquisition target region 158 has been designated in accordance with the region designation information received through the touch panel 88 does not include three characteristic pixels, the determination result is negative, and the process proceeds to step 410. In step 408, in a case where the coordinate acquisition target region 158 has been designated in accordance with the region designation information received through the touch panel 88 includes three characteristic pixels, the determination result is positive, and the process proceeds to step 412. Meanwhile, the case where the determination result in step 408 is positive refers to a case where the coordinate acquisition target region 158 including the pattern image 160 has been designated in accordance with the region designation information received through the touch panel 88, for example, as illustrated in FIG. 34.

In step 410, the execution unit 112C starts the display of a re-designation message, which is superimposed on a predetermined region of the first captured image, on the display unit 86, and then the process proceeds to step 404. The re-designation message refers to, for example, a message of "please designate a closed region including a characteristic pattern, a building material, or the like". Meanwhile, the re-designation message displayed by the execution of the processing of step 410 is set to be in a non-display state when the determination result in step 404 is positive. In addition, here a case where the re-designation message is visibly displayed has been described. However, the technique of this disclosure is not limited thereto, and audible display such as the output of a sound using a sound reproducing device (not shown) or permanent visible display such as the output of printed matter using a printer may be performed instead of the visible display or may be performed in combination.

In step 412, the execution unit 112C acquires three characteristic pixel coordinates for specifying three characteristic pixels in the coordinate acquisition target region 158 designated in accordance with the region designation information received through the touch panel 88, and then the process proceeds to step 214 illustrated in FIG. 32. Meanwhile, in the example illustrated in FIG. 31, the processing of step 412 is executed, and thus two-dimensional coordinates for specifying each of the first pixel 162, the second pixel 164, and the third pixel 166 are acquired by the execution unit 112C as three characteristic pixel coordinates.

Figure 33:
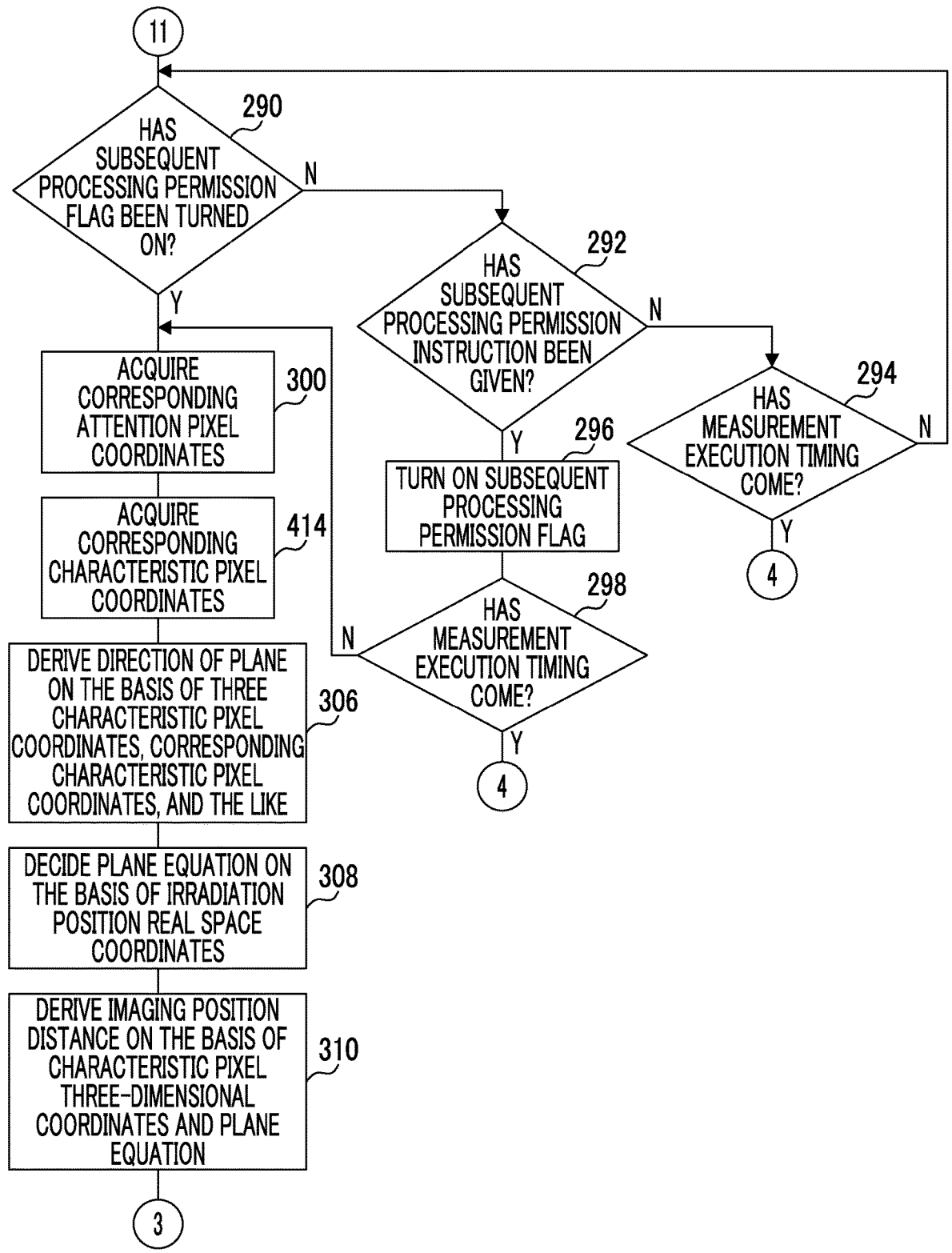
FIG. 33 is a flowchart illustrating an example of a flow of the second position measurement imaging process according to the third embodiment, and is the continuation of the flowchart illustrated in FIG. 13.

In step 414 illustrated in FIG. 33, the execution unit 112C specifies three characteristic pixels in an outer wall surface image corresponding to the outer wall surface image 128 (see FIG. 34) in the second captured image and acquires corresponding characteristic pixel coordinates for specifying the specified three characteristic pixels, and then the process proceeds to step 306. Meanwhile, the corresponding characteristic pixel coordinates refer to two-dimensional coordinates for specifying the three characteristic pixels specified in the second captured image. In addition, the corresponding characteristic pixel coordinates are also two-dimensional coordinates corresponding to the three characteristic pixel coordinates acquired in the processing of step 412 in the second captured image, and are equivalent to the above-described plurality of pixel coordinates. In addition, the three characteristic pixels in the second captured image are specified by executing the existing image analysis, such as pattern matching, by using the first and second captured images as objects to be analyzed, similar to the above-described method of specifying a corresponding attention pixel.

As described above, in the distance measurement device 10C, the outer wall surface image 128 is displayed on the display unit 86 so as to be distinguishable from the other regions in the first captured image. In addition, the region designation information is received through the touch panel 88, and a coordinate acquisition target region which is a portion of the outer wall surface image 128 is designated in accordance with the received region designation information. In a case where the coordinate acquisition target region includes three characteristic pixels, the three characteristic pixel coordinates for specifying the three characteristic pixels are acquired by the execution unit 112C (step 412), and corresponding characteristic pixel coordinates corresponding to the three characteristic pixel coordinates are also acquired (step 414).

Therefore, according to the distance measurement device 10C, it is possible to acquire the three characteristic pixel coordinates and the corresponding characteristic pixel coordinates with a small load, as compared to a case where the three characteristic pixel coordinates and the corresponding characteristic pixel coordinates are acquired with respect to the entire outer wall surface image 128.

Fourth Embodiment

In the third embodiment, a description has been given of a case where a coordinate acquisition target region is designated with respect to a first captured image, but a description will be given of a case where a coordinate acquisition target region is designated with respect to a second captured image in a fourth embodiment. Meanwhile, in the fourth embodiment, the same components as those described in the first embodiment will be denoted by the same reference numerals and signs, and a description thereof will be omitted.

A distance measurement device 10D according to the fourth embodiment is different from the distance measurement device 10A in that a secondary storage unit 104 stores an imaging position distance derivation program 106D instead of the imaging position distance derivation program 106A, as illustrated in FIG. 6 as an example.

A CPU 100 executes the imaging position distance derivation program 106D, and is thus operated as an acquisition unit 110D, a derivation unit 111D, and an execution unit 112D (see FIG. 9).

The acquisition unit 110D corresponds to the acquisition unit 110A described in the above-described first embodiment, the derivation unit 111D corresponds to the derivation unit 111A described in the above-described first embodiment, and thus execution unit 112D corresponds to the execution unit 112A described in the above-described first embodiment. Meanwhile, in the fourth embodiment, only differences between the acquisition unit 110D, the derivation unit 111D, and the execution unit 112D in the fourth embodiment and the corresponding units in the above-described first embodiment will be described.

Next, a second position measurement imaging process included in an imaging position distance derivation process realized by the CPU 100 executing the imaging position distance derivation program 106D will be described with reference to FIGS. 13 and 36, as the operation of portions of the distance measurement device 10D according to the technique of this disclosure. Meanwhile, the same steps as those in the flowchart illustrated in FIGS. 13 to 16 will be denoted by the same step numbers, and a description thereof will be omitted.

Figure 36:
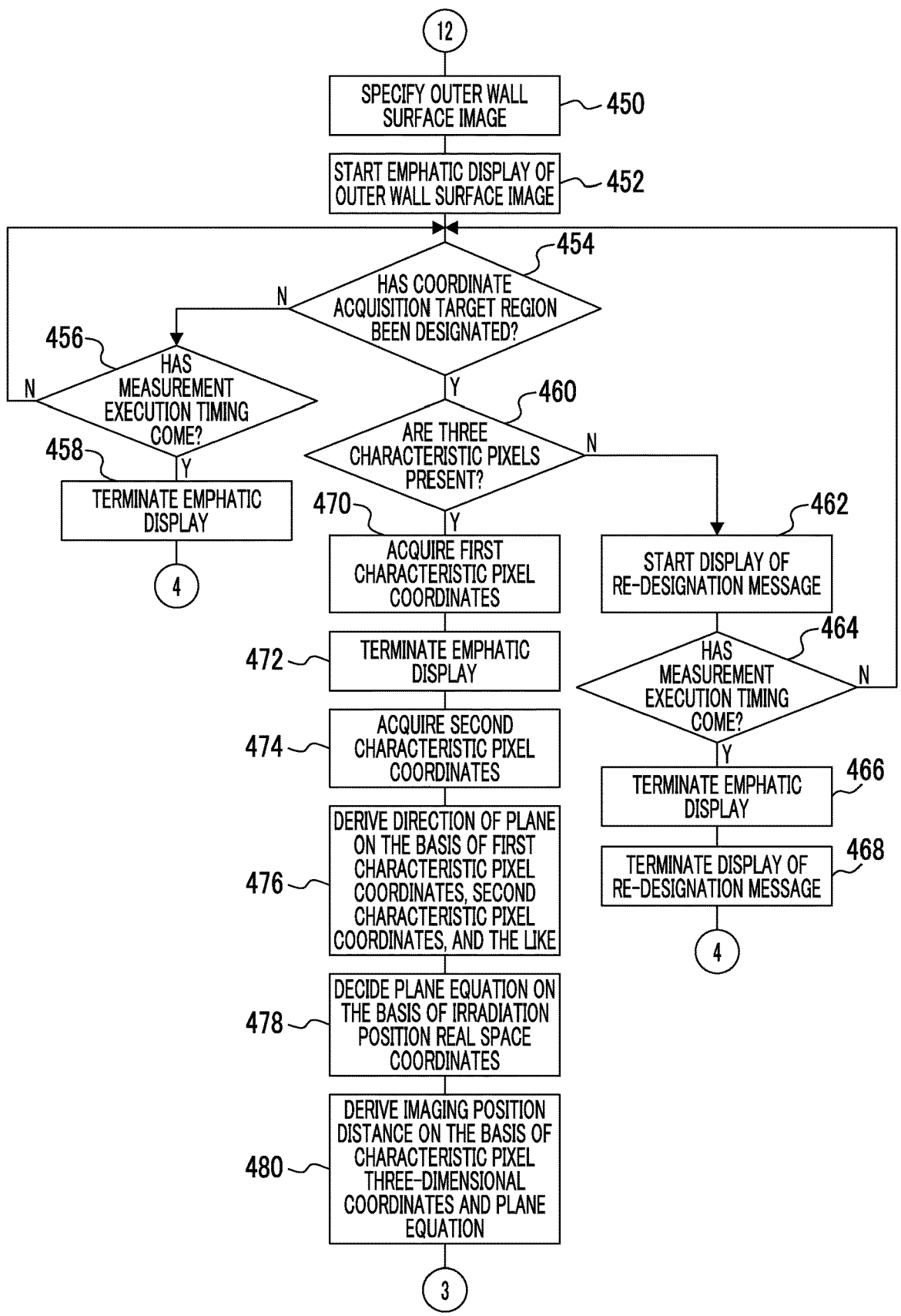
FIG. 36 is a flowchart illustrating an example of a flow of a second position measurement imaging process according to the fourth embodiment, and is the continuation of the flowchart illustrated in FIG. 13.

In step 450 illustrated in FIG. 36, the execution unit 112D specifies the outer wall surface image 128 (see FIG. 34) from the second captured image, and then the process proceeds to step 452.

In step 452, the execution unit 112D starts the emphatic display of the outer wall surface image 128 specified in the processing of step 450 on a display unit 86 so as to be distinguishable from the other regions within the display region of the second captured image, and then the process proceeds to step 454.

In step 454, the execution unit 112D determines whether or not a region designation information has been received by a touch panel 88 and a coordinate acquisition target region has been designated in accordance with the received region designation information.

In step 454, in a case where the coordinate acquisition target region has not been designated in accordance with the region designation information, the determination result is negative, and the process proceeds to step 456. In step 454, in a case where the coordinate acquisition target region has been designated in accordance with the region designation information, the determination result is positive, and the process proceeds to step 460.

In step 456, the execution unit 112D determines whether or not the measurement execution timing described in the above-described first embodiment has come. In step 456, in a case where the measurement execution timing has not come, the determination result is negative, and the process proceeds to step 454. In step 456, in a case where the measurement execution timing has come, the determination result is positive, and the process proceeds to step 458.

In step 458, the execution unit 112D terminates the emphatic display of the outer wall surface image 128 on the display unit 86 so as to be distinguishable from the other regions within the display region of the second captured image, and then the process proceeds to step 230 illustrated in FIG. 13. Meanwhile, in a case where the display of a re-designation message is started by the execution of the processing of step 462 to be described later, the re-designation message is set to be in a non-display state by the execution of the processing of step 458.

In step 460, the execution unit 112D determines whether or not the coordinate acquisition target region 158 (see FIG. 34) designated in accordance with the region designation information received through the touch panel 88 includes the three characteristic pixels described in the first embodiment. Meanwhile, in the example illustrated in FIG. 35, the coordinate acquisition target region 158 designated with respect to the second captured image includes a first pixel 162, a second pixel 164, and a third pixel 166 as the three characteristic pixels.

In step 460, in a case where the coordinate acquisition target region 158 designated by the region designation information received through the touch panel 88 does not include three characteristic pixels, the determination result is negative, and the process proceeds to step 462. In step 460, the coordinate acquisition target region 158 designated by the region designation information received through the touch panel 88 includes three characteristic pixels, the determination result is positive, and the process proceeds to step 470. Meanwhile, the case where the determination result in step 460 is positive refers to a case where the coordinate acquisition target region 158 including a pattern image 160 is designated by the region designation information received through the touch panel 88, for example, as illustrated in FIG. 34.

In step 462, the execution unit 112D starts the display of the re-designation message, described in the third embodiment, which is superimposed on a predetermined region of the second captured image on the display unit 86, and then the process proceeds to step 464. Meanwhile, the re-designation message displayed by the execution of the processing of step 462 is set to be in a non-display state in a case where the determination result in step 454 is positive. In addition, here, a case where the re-designation message is visibly displayed has been described. However, the technique of this disclosure is not limited thereto, and audible display such as the output of a sound using a sound reproducing device (not shown) or permanent visible display such as the output of printed matter using a printer may be performed instead of the visible display or may be performed in combination.

In step 464, the execution unit 112D determines whether or not the measurement execution timing described in the above-described first embodiment has come. In step 464, in a case where the measurement execution timing has not come, the determination result is negative, and the process proceeds to step 454. In step 464, in a case where the measurement execution timing has come, the determination result is positive, and the process proceeds to step 466.

In step 466, the execution unit 112D terminates the emphatic display of the outer wall surface image 128 on the display unit 86 so as to be distinguishable from the other regions within the display region of the second captured image, and then the process proceeds to step 468.

In step 468, the execution unit 112D terminates the display of the re-designation message on the display unit 86, and then the process proceeds to step 230 illustrated in FIG. 13.

In step 470, the execution unit 112D acquires first characteristic pixel coordinates for specifying three characteristic pixels in the coordinate acquisition target region 158 designated by the region designation information received through the touch panel 88, and then the process proceeds to step 472. Meanwhile, the processing of step 470 is executed, and thus two-dimensional coordinates for specifying each of the first pixel 162, the second pixel 164, and the third pixel 166 of the second captured image are acquired by the execution unit 112D as the first characteristic pixel coordinates.

In step 472, the execution unit 112D terminates the emphatic display of the outer wall surface image 128 on the display unit 86 so as to be distinguishable from the other regions within the display region of the second captured image, and then the process proceeds to step 474.

In step 474, the execution unit 112D specifies three characteristic pixels in an outer wall surface image corresponding to the outer wall surface image 128 in the first captured image and acquires second characteristic pixel coordinates for specifying the specified three characteristic pixels, and then the process proceeds to step 476. Meanwhile, the second characteristic pixel coordinates refer to two-dimensional coordinates for specifying the three characteristic pixels specified in the first captured image. In addition, the second characteristic pixel coordinates are also two-dimensional coordinates corresponding to the first characteristic pixel coordinates acquired in the processing of step 470 in the first captured image, and are equivalent to the above-described plurality of pixel coordinates. In addition, the three characteristic pixels in the first captured image are specified by executing the existing image analysis, such as pattern matching, by using the first and second captured images as objects to be analyzed, similar to the above-described method of specifying a corresponding attention pixel.

In step 476, the execution unit 112D derives a, b, and c of the plane equation shown in Expression (6) from the first characteristic pixel coordinates, the second characteristic pixel coordinates, the focal length of the imaging lens 50, and the dimensions of the imaging pixel 60A1 to derive the direction of a plane specified by the plane equation. Meanwhile, in step 476, the direction of the plane is derived by the same derivation method as the derivation method used in the processing of step 306 which is described in the above-described first embodiment.

In step 478, the execution unit 112D decides the plane equation shown in Expression (6) on the basis of the irradiation position real space coordinates derived in the processing of step 242, and then the process proceeds to step 480. That is, in step 478, the execution unit 112D substitutes a, b, and c derived in the processing of step 476 and the irradiation position real space coordinates derived in the processing of step 242 for Expression (6) to decide d in Expression (6). Since a, b, and c in Expression (6) are derived in the processing of step 476, the plane equation shown in Expression (6) is decided in a case where d in Expression (6) is decided in the processing of step 478.

In step 480, the execution unit 112D derives an imaging position distance on the basis of the characteristic pixel three-dimensional coordinates and the plane equation, and then the process proceeds to step 274 illustrated in FIG. 15. Meanwhile, the processing of step 480 is an example of processing included in "the predetermined process" according to the technique of this disclosure.

Meanwhile, in the second position measurement imaging process according to the fourth embodiment, the processing of step 284 illustrated in FIG. 15 is executed in a case where the subsequent processing permission flag is turned on, but the processing of step 284 is not executed in a case where the subsequent processing permission flag is turned off, and the process proceeds to step 286.

As described above, in the distance measurement device 10D, the outer wall surface image 128 is displayed on the display unit 86 so as to be distinguishable from the other regions in the second captured image. In addition, the coordinate acquisition target region which is a portion of the outer wall surface image 128 is designated with respect to the second captured image. In a case where the coordinate acquisition target region includes three characteristic pixels, the first characteristic pixel coordinates for specifying the three characteristic pixels are acquired by the execution unit 112D (step 470), and the second characteristic pixel coordinates corresponding to the three characteristic pixel coordinates are also acquired (step 474).

Therefore, according to the distance measurement device 10D, it is possible to acquire the three characteristic pixel coordinates and the corresponding characteristic pixel coordinates with a small load, as compared to a case where the three characteristic pixel coordinates and the corresponding characteristic pixel coordinates are acquired with respect to the entire outer wall surface image 128.

Fifth Embodiment

In the above-described embodiments, a description has been given of a case where three characteristic pixels are searched for and specified within a specific image through image analysis. However, in a fifth embodiment, a description will be given of a case where three characteristic pixels are designated in accordance with an operation to the touch panel 88. Meanwhile, in the fifth embodiment, the same components as those described in the above-described embodiments will be denoted by the same reference numerals and signs, and a description thereof will be omitted.

A distance measurement device 10E according to the fifth embodiment is different from the distance measurement device 10A in that an imaging position distance derivation program 106E is stored in a secondary storage unit 104 instead of the imaging position distance derivation program 106A, as illustrated in FIG. 6 as an example.

A CPU 100 executes the imaging position distance derivation program 106E, and is thus operated as an acquisition unit 110E, a derivation unit 111E, and an execution unit 112E (see FIG. 9).

The acquisition unit 110E corresponds to the acquisition unit 110A described in the above-described first embodiment, the derivation unit 111E corresponds to the derivation unit 111A described in the above-described first embodiment, and the execution unit 112E corresponds to the execution unit 112A described in the above-described first embodiment. Meanwhile, in the fifth embodiment, only differences between the acquisition unit 110E, the derivation unit 111E, and the execution unit 112E in the fifth embodiment and the corresponding units in the above-described first embodiment will be described.

Next, an imaging position distance derivation process realized by the CPU 100 executing an imaging position distance derivation program 106E will be described with reference to FIGS. 37 and 38, as the operation of portions of the distance measurement device 10E according to the technique of this disclosure. Meanwhile, the same steps as those in the flowchart illustrated in FIG. 13 and FIGS. 31 to 33 will be denoted by the same step numbers, and a description thereof will be omitted.

Figure 37:
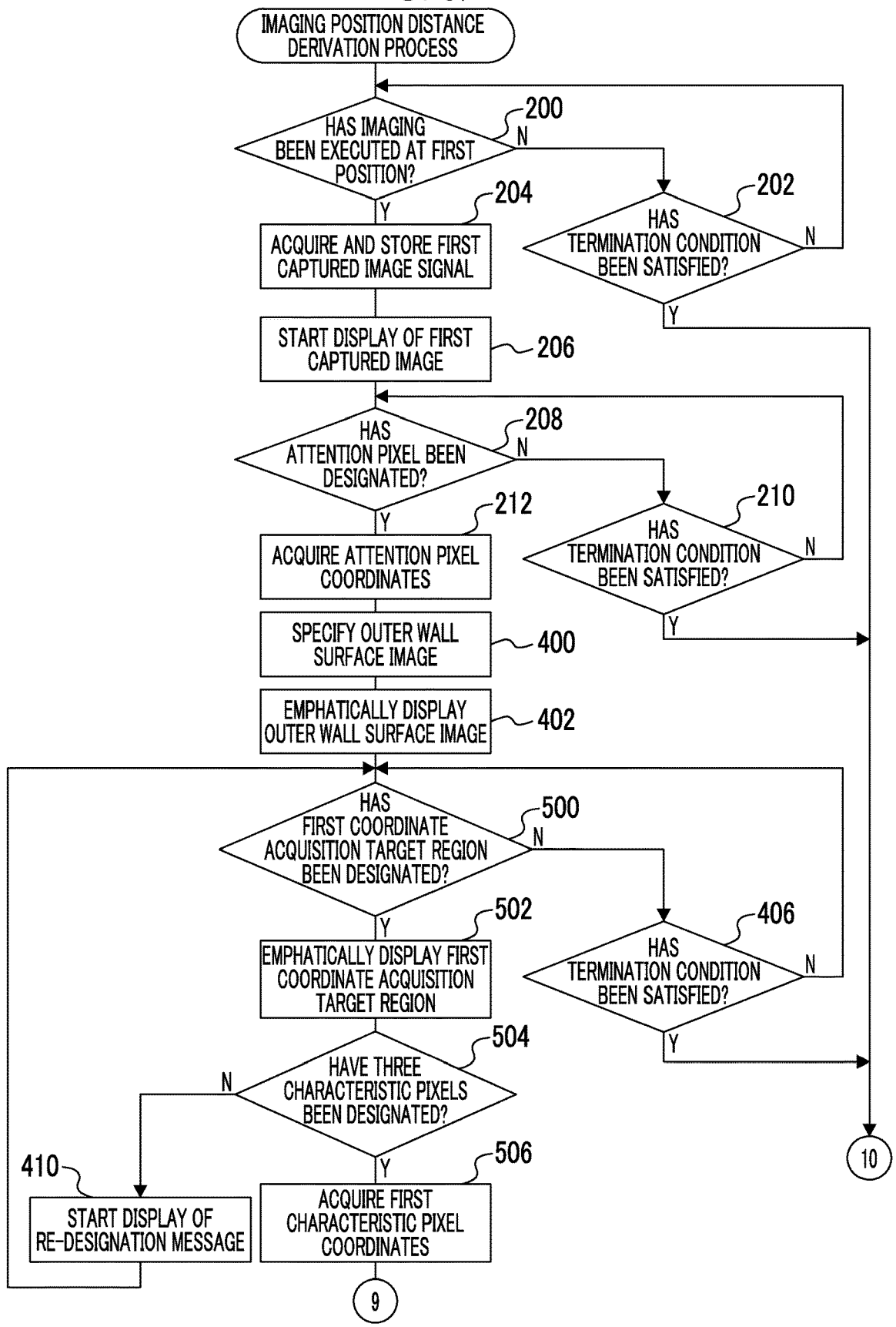
FIG. 37 is a flowchart illustrating an example of a flow of a second position measurement imaging process included in an imaging position distance derivation process according to the fifth embodiment.

The imaging position distance derivation process according to the fifth embodiment is different from the imaging position distance derivation process according to the third embodiment in that the processing of step 500 is provided instead of the processing of step 404 (see FIGS. 31 and 37). In addition, the imaging position distance derivation process according to the fifth embodiment is different from the imaging position distance derivation process according to the third embodiment in that the processing of step 502 is provided (see FIGS. 31 and 37). In addition, the imaging position distance derivation process according to the fifth embodiment is different from the imaging position distance derivation process according to the third embodiment in that the processing of step 504 is provided instead of the processing of step 408 (see FIGS. 31 and 37). In addition, the imaging position distance derivation process according to the fifth embodiment is different from the imaging position distance derivation process according to the third embodiment in that the processing of step 506 is provided instead of the processing of step 412 (see FIGS. 31 and 37). Further, the imaging position distance derivation process according to the fifth embodiment is different from the imaging position distance derivation process according to the third embodiment in that the processing of step 518 to the processing of step 558 are provided instead of the processing of step 414 and the processing of step 306 to the processing of step 310 (see FIGS. 33 and 38).

In step 500 illustrated in FIG. 37, the execution unit 112E determines whether or not the region designation information has been received through the touch panel 88 and a first coordinate acquisition target region 178 (see FIG. 34) has been designated in accordance with the received region designation information. Meanwhile, the first coordinate acquisition target region is a region corresponding to the coordinate acquisition target region 158 described in the third embodiment.

In step 500, in a case where the first coordinate acquisition target region 178 has not been designated in accordance with the region designation information, the determination result is negative, and the process proceeds to step 406. In step 500, in a case where the first coordinate acquisition target region 178 has been designated in accordance with the region designation information, the determination result is positive, and the process proceeds to step 502.

In step 502, the execution unit 112E starts the emphatic display of the first coordinate acquisition target region 178, which is designated in accordance with the region designation information received through the touch panel, 88 on the display unit 86 so as to be distinguishable from the other regions within the display region of the first captured image. Meanwhile, the emphatic display of the first coordinate acquisition target region 178 is terminated in a case where the determination result in step 504 to be described later is positive.

In the next step 504, the execution unit 112E determines whether or not three characteristic pixels have been designated in accordance with the pixel designation information received through the touch panel 88.

As illustrated in FIG. 34 as an example, in a case where the first coordinate acquisition target region 178 has been designated in accordance with the region designation information received through the touch panel 88, the first coordinate acquisition target region 178 includes a pattern image 160. In this case, the three characteristic pixels refer to a first pixel 162, a second pixel 164, and a third pixel 166 which are pixels positioned at three corners of the pattern image 160, as illustrated in FIG. 35 as an example.

In step 504, in a case where the three characteristic pixels have not been designated in accordance with the pixel designation information received through the touch panel 88, the determination result is negative, and the process proceeds to step 410. In step 504, in a case where the three characteristic pixels have been designated in accordance with the pixel designation information received through the touch panel 88, the determination result is positive, and the process proceeds to step 506.

In step 506, the execution unit 112E acquires first characteristic pixel coordinates for specifying the three characteristic pixels designated in accordance with the pixel designation information received through the touch panel 88, and then the process proceeds to step 214 illustrated in FIG. 32. Meanwhile, the processing of step 506 is executed, and thus two-dimensional coordinates for specifying each of the first pixel 162, the second pixel 164, and the third pixel 166 of the first captured image are acquired by the execution unit 112E as the first characteristic pixel coordinates.

Figure 38:
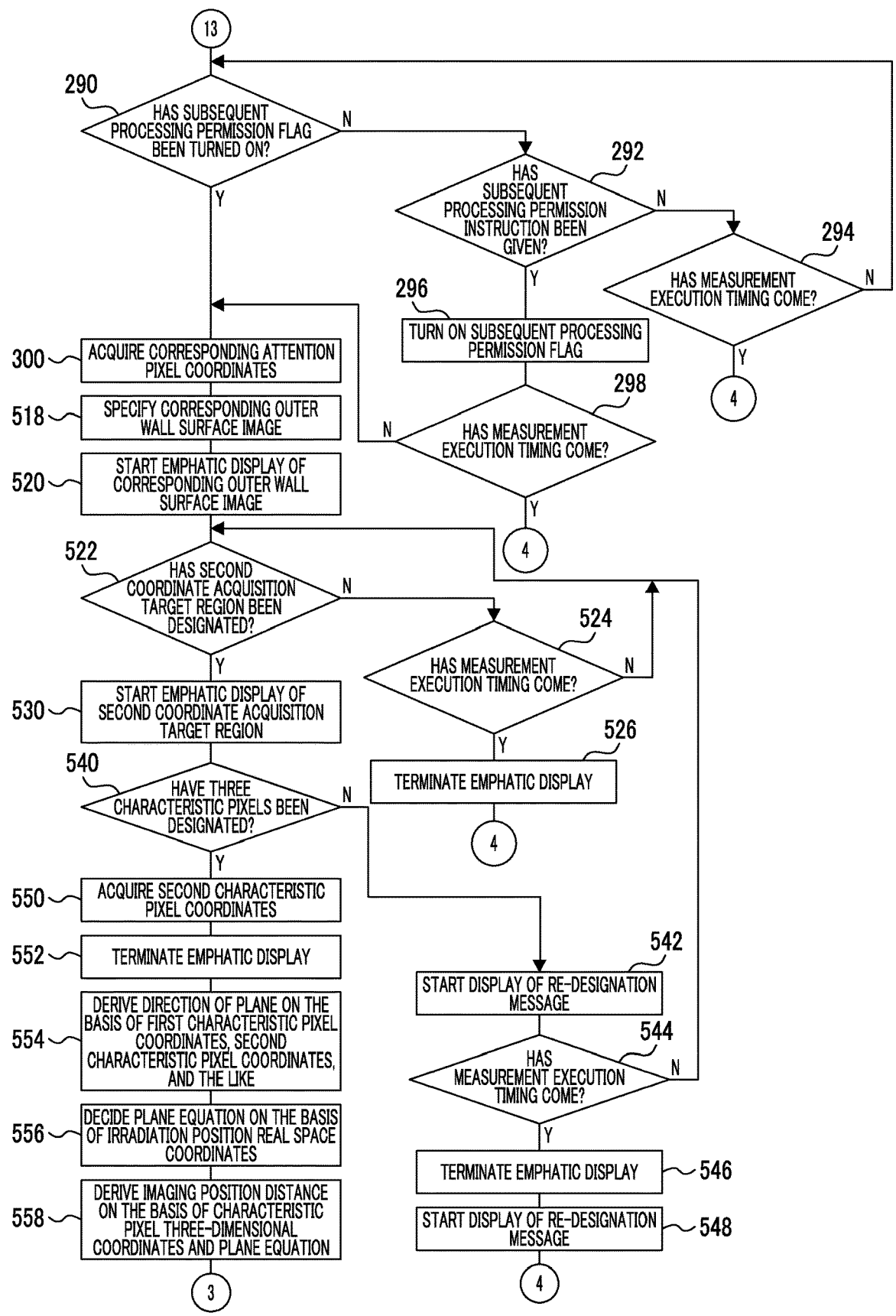
FIG. 38 is a flowchart illustrating an example of a flow of the second position measurement imaging process according to the fifth embodiment, and is the continuation of the flowchart illustrated in FIG. 13.

In step 518 illustrated in FIG. 38, the execution unit 112E specifies a corresponding outer wall surface image which is an outer wall surface image corresponding to the outer wall surface image 128 from the second captured image, and then the process proceeds to step 520.

In step 520, the execution unit 112E starts the emphatic display of the corresponding outer wall surface image specified in the processing of step 518 on the display unit 86 so as to be distinguishable from the other regions within a display region of the second captured image, and then the process proceeds to step 522. Meanwhile, the emphatic display of the corresponding outer wall surface image so as to be distinguishable from the other regions within the display region of the second captured image is terminated in a case where the determination result in step 540 is positive.

In step 522, the execution unit 112E determines whether or not the region designation information has been received through the touch panel 88 and a second coordinate acquisition target region has been designated in accordance with the received region designation information. Meanwhile, the second coordinate acquisition target region is a region designated by the user through the touch panel 88 as a region corresponding to the first coordinate acquisition target region 178 (see FIG. 34) in the second captured image.

In step 522, in a case where the second coordinate acquisition target region has not been designated in accordance with the region designation information, the determination result is negative, and the process proceeds to step 524. In step 522, in a case where the second coordinate acquisition target region has been designated in accordance with the region designation information, the determination result is positive, and the process proceeds to step 530. Meanwhile, the processing of step 522 is executed in a state where a re-designation message to be described later is displayed, and the re-designation message is set to be in a non-display state in a case where the determination result in step 522 is positive.

In step 524, the execution unit 112E determines whether or not the measurement execution timing described in the above-described first embodiment has come. In step 524, in a case where the measurement execution timing has not come, the determination result is negative, and the process proceeds to step 522. In step 524, in a case where the measurement execution timing has come, the determination result is positive, and the process proceeds to step 526.

In step 526, the execution unit 112E terminates the emphatic display of the corresponding outer wall surface image on the display unit 86 so as to be distinguishable from the other regions within the display region of the second captured image, and then the process proceeds to step 230 illustrated in FIG. 13. Meanwhile, in a case where the processing of step 526 is executed in a state where a re-designation message to be described later is displayed, the re-designation message is set to be in a non-display state.

In step 530, the execution unit 112E starts the emphatic display of the second coordinate acquisition target region, which is designated in accordance with the region designation information received through the touch panel 88, on the display unit 86 so as to be distinguishable from the other regions within the display region of the second captured image. Meanwhile, the emphatic display of the second coordinate acquisition target region is terminated in a case where the determination result in step 540 to be described later is positive.

In the next step 540, the execution unit 112E determines whether or not three characteristic pixels have been designated in accordance with the pixel designation information received through the touch panel 88. In this case, the three characteristic pixels refer to, for example, pixels corresponding to each of the first pixel 162, the second pixel 164, and the third pixel 166.

In step 540, in a case where the three characteristic pixels have not been designated in accordance with the pixel designation information received through the touch panel 88, the determination result is negative, and the process proceeds to step 542. In step 540, in a case where the three characteristic pixels have been designated in accordance with the pixel designation information received through the touch panel 88, the determination result is positive, and the process proceeds to step 550.

In step 542, the execution unit 112E starts the display of the re-designation message, superimposed on a predetermined region of the second captured image, which is described in the third embodiment on the display unit 86, and then the process proceeds to step 544.

In step 544, the execution unit 112E determines whether or not the measurement execution timing described in the above-described first embodiment has come. In step 544, in a case where the measurement execution timing has not come, the determination result is negative, and the process proceeds to step 522. In step 544, in a case where the measurement execution timing has come, the determination result is positive, and the process proceeds to step 546.

In step 546, the execution unit 112E terminates the emphatic display of the second coordinate acquisition target region on the display unit 86 so as to be distinguishable from the other regions within the display region of the second captured image, and then the process proceeds to step 548.

In step 548, the execution unit 112E terminates the display of the re-designation message on the display unit 86, and then the process proceeds to step 230 illustrated in FIG. 13.

In step 550, the execution unit 112E acquires second characteristic pixel coordinates for specifying designated three characteristic pixels in the coordinate acquisition target region 158 designated by the region designation information received through the touch panel 88, and then the process proceeds to step 552.

In step 552, the execution unit 112E terminates the emphatic display of the second coordinate acquisition target region on the display unit 86 so as to be distinguishable from the other regions within the display region of the second captured image, and then the process proceeds to step 554.

In step 554, the execution unit 112E derives a, b, and c of the plane equation shown in Expression (6) from the first characteristic pixel coordinates, the second characteristic pixel coordinates, the focal length of the imaging lens 50, and the dimension of the imaging pixel 60A1 to derive the direction of a plane specified by the plane equation. Meanwhile, in step 554, the direction of the plane is derived by the same derivation method as the derivation method used in the processing of step 306 which is described in the above-described first embodiment.

In step 556, the execution unit 112E decides the plane equation shown in Expression (6) on the basis of the irradiation position real space coordinates derived in the processing of step 242, and then the process proceeds to step 558. That is, in step 556, the execution unit 112E substitutes a, b, and c derived in the processing of step 554 and the irradiation position real space coordinates derived in the processing of step 242 for Expression (6) to decide d in Expression (6). Since a, b, and c in Expression (6) are derived in the processing of step 554, the plane equation shown in Expression (6) is decided in a case where d in Expression (6) is decided in the processing of step 556.

In step 558, the execution unit 112E derives an imaging position distance on the basis of the characteristic pixel three-dimensional coordinates and the plane equation, and then the process proceeds to step 274 illustrated in FIG. 15. Meanwhile, the processing of step 558 is an example of processing included in "the predetermined process" according to the technique of this disclosure.

As described above, in the distance measurement device 10E, the three characteristic pixels are designated through the touch panel 88 in the first captured image, and the first characteristic pixel coordinates for specifying the designated three characteristic pixels are acquired by the execution unit 112E (step 506). In addition, the three characteristic pixels corresponding to the three characteristic pixels of the first captured image are designated through the touch panel 88 in the second captured image (step 540: Y). In addition, the second characteristic pixel coordinates for specifying the three characteristic pixels designated through the touch panel 88 in the second captured image are acquired by the execution unit 112E (step 550). An imaging position distance is derived by the execution unit 112E on the basis of the attention pixel coordinates, the corresponding attention pixel coordinates, the first characteristic pixel coordinates, the second characteristic pixel coordinates, the focus position coordinates, the focal length of the imaging lens 50, and the dimension of the imaging pixel 60A1.

Therefore, according to the distance measurement device 10E, it is possible to derive the imaging position distance on the basis of the first characteristic pixel coordinates and the second characteristic pixel coordinates which are acquired in accordance with the user's intention.

Sixth Embodiment

In the above-described embodiments, a description has been given of a case where distance measurement is performed at only a second position out of a first position and the second position, but a description will be given of a case where distance measurement is also performed at the first position in a sixth embodiment. Meanwhile, in the sixth embodiment, the same components as those described in the above-described embodiments will be denoted by the same reference numerals and signs, and a description thereof will be omitted.

A distance measurement device 10F according to the fourth embodiment is different from the distance measurement device 10A in that an imaging position distance derivation program 106F is stored in a secondary storage unit 104 instead of an imaging position distance derivation program 106A. In addition, the distance measurement device 10F is different from the distance measurement device 10A in that a three-dimensional coordinate derivation program 108B is stored in the secondary storage unit 104 instead of a three-dimensional coordinate derivation program 108A.

A CPU 100 executes the imaging position distance derivation program 106F, and is thus operated as an acquisition unit 110F, a derivation unit 111F, and an execution unit 112F (see FIG. 9).

The acquisition unit 110F corresponds to the acquisition unit 110A described in the above-described first embodiment, the derivation unit 111F corresponds to the derivation unit 111A described in the above-described first embodiment, and the execution unit 112F corresponds to the execution unit 112A described in the above-described first embodiment. Meanwhile, in the sixth embodiment, only differences between the acquisition unit 110F, the derivation unit 111F, and the execution unit 112F in the sixth embodiment and the corresponding units in the above-described first embodiment will be described.

Next, an imaging position distance derivation process realized by the CPU 100 executing the imaging position distance derivation program 106F will be described with reference to FIG. 13 and FIGS. 39 to 41, as the operation of portions of the distance measurement device 10F according to the technique of this disclosure. Meanwhile, the same steps as those in the flowchart illustrated in FIG. 13 and FIGS. 12 to 16 will be denoted by the same step numbers, and a description thereof will be omitted. In addition, in the following description of the sixth embodiment, for convenience of description, a description will be given on the assumption that the determination result in step 252 illustrated in FIG. 13 is negative.

Figure 39:
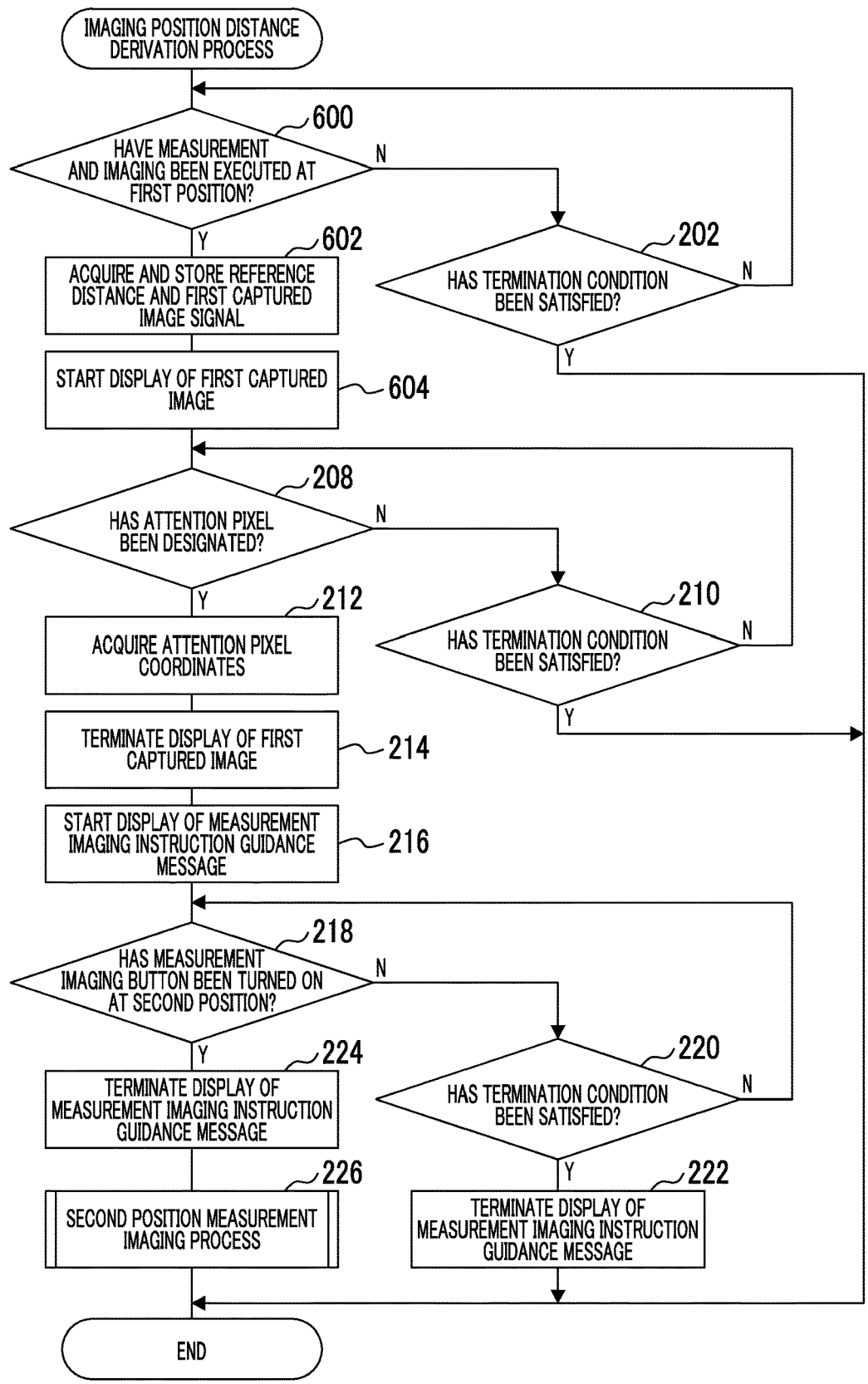
FIG. 39 is a flowchart illustrating an example of a flow of a second position measurement imaging process included in an imaging position distance derivation process according to the sixth embodiment.

The imaging position distance derivation process according to the sixth embodiment is different from the imaging position distance derivation process according to the above-described first embodiment in that the processing of step 600, the processing of step 602, and the processing of step 604 are provided instead of the processing of step 200, the processing of step 204, and the processing of step 206 (see FIGS. 12 and 39). In addition, the imaging position distance derivation process according to the sixth embodiment is different from the imaging position distance derivation process according to the above-described first embodiment in that the processing of step 608 to the processing of step 616 are provided instead of the processing of step 308 and the processing of step 310 (see FIGS. 16 and 40). Further, the imaging position distance derivation process according to the sixth embodiment is different from the imaging position distance derivation process according to the above-described first embodiment in that the processing of step 618 to the processing of step 626 are provided instead of the processing of step 274 to the processing of step 282 (see FIGS. 15 and 41).

In step 600 illustrated in FIG. 39, the acquisition unit 110F determines whether or not measurement and imaging of a distance at the first position have been executed by the distance measurement device 10F. The first position may be a position where the outer wall surface 121 can be irradiated with a laser beam and a region including the outer wall surface 121 can be imaged as a subject.

In step 600, in a case where measurement and imaging of a distance at the first position have not been executed by the distance measurement device 10F, the determination result is negative, and the process proceeds to step 202. In step 600, in a case where measurement and imaging of a distance at the first position have been executed by the distance measurement device 10F, the determination result is positive, and the process proceeds to step 602.

In step 602, the acquisition unit 110F acquires a reference distance which is a distance measured at the first position and a first captured image signal indicating a first captured image which is obtained by performing imaging at the first position. The acquisition unit 110F stores the acquired reference distance and first captured image signal in a predetermined storage region of the secondary storage unit 104, and then the process proceeds to step 604.

In step 604, the acquisition unit 110F starts the display of the acquired first captured image indicated by the first captured image signal on the display unit 86 as illustrated in FIG. 18 as an example, and then the process proceeds to step 208.

Figure 40:
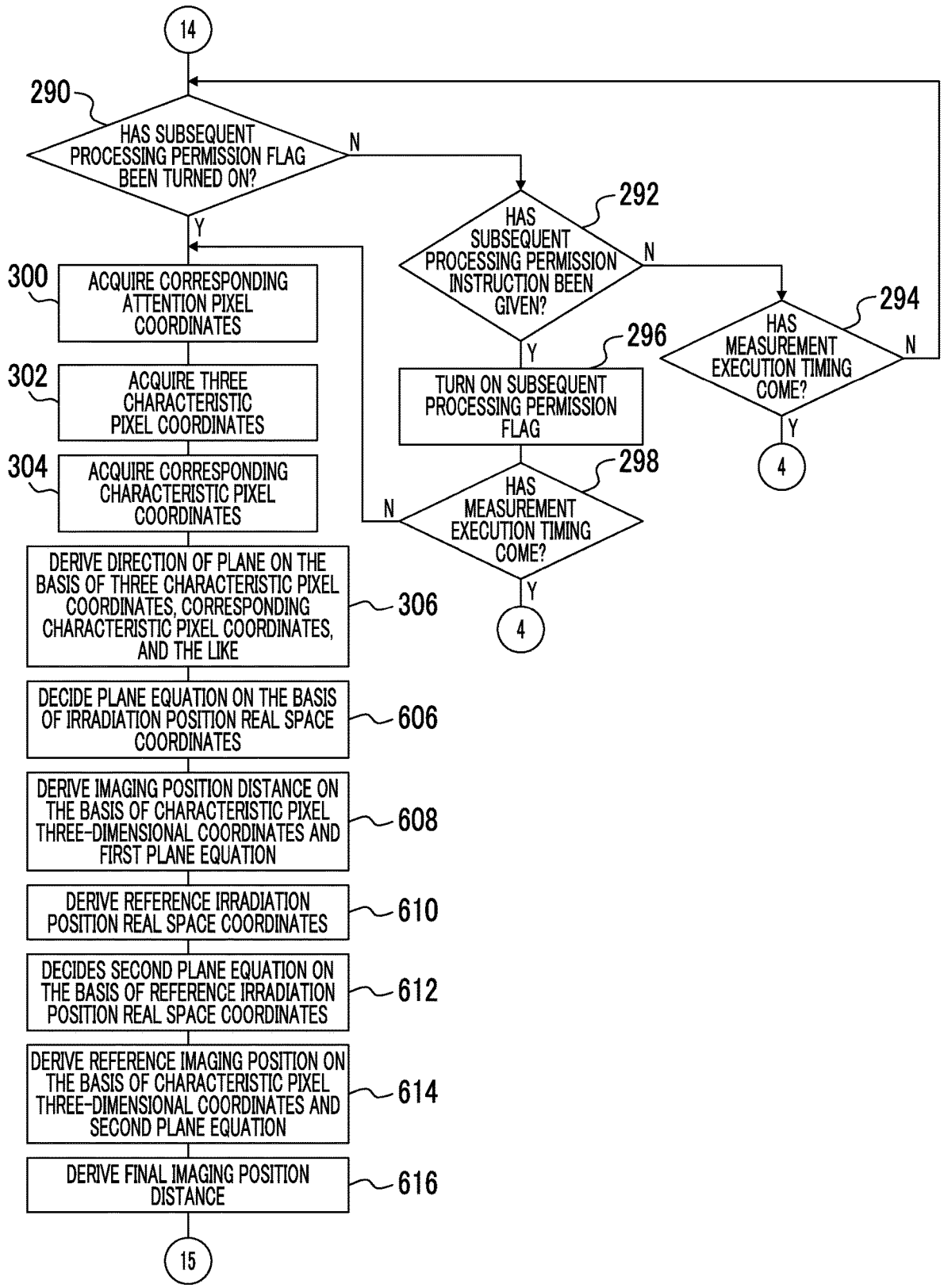
FIG. 40 is a flowchart illustrating an example of a flow of a second position measurement imaging process according to the sixth embodiment, and is the continuation of the flowchart illustrated in FIG. 13.

In step 606 illustrated in FIG. 40, the execution unit 112F decides a first plane equation which is the plane equation shown in Expression (6) on the basis of the irradiation position real space coordinates derived in the processing of step 242, and then the process proceeds to step 608.

In step 608, the execution unit 112F derives an imaging position distance on the basis of the characteristic pixel three-dimensional coordinates and the first plane equation, and then the process proceeds to step 610.

In step 610, the execution unit 112F derives reference irradiation position real space coordinates on the basis of Expression (2) from the reference distance acquired by the acquisition unit 110F in the processing of step 602, a half angle of view α, an emission angle β, and a distance between reference points M, and then the process proceeds to step 612. Meanwhile, the reference distance used in the processing of step 610 is a distance corresponding to the distance L described in the first embodiment.

In step 612, the execution unit 112F decides a second plane equation which is the plane equation shown in Expression (6) on the basis of the reference irradiation position real space coordinates derived in the processing of step 610, and then the process proceeds to step 614. That is, in step 612, the execution unit 112F substitutes a, b, and c derived in the processing of step 306 and the reference irradiation position real space coordinates derived in the processing of step 610 for Expression (6) to decide d in Expression (6). Since a, b, and c in Expression (6) are derived in the processing of step 306, the second plane equation is decided when d in Expression (6) is decided in the processing of step 612.

In step 614, a reference imaging position distance is derived on the basis of the characteristic pixel three-dimensional coordinates and the second plane equation, and then the process proceeds to step 616. Meanwhile, the reference imaging position distance is equivalent to, for example, "B" shown in Expression (7), and is derived by substituting first characteristic pixel three-dimensional coordinates for the second plane equation.

Figure 41:
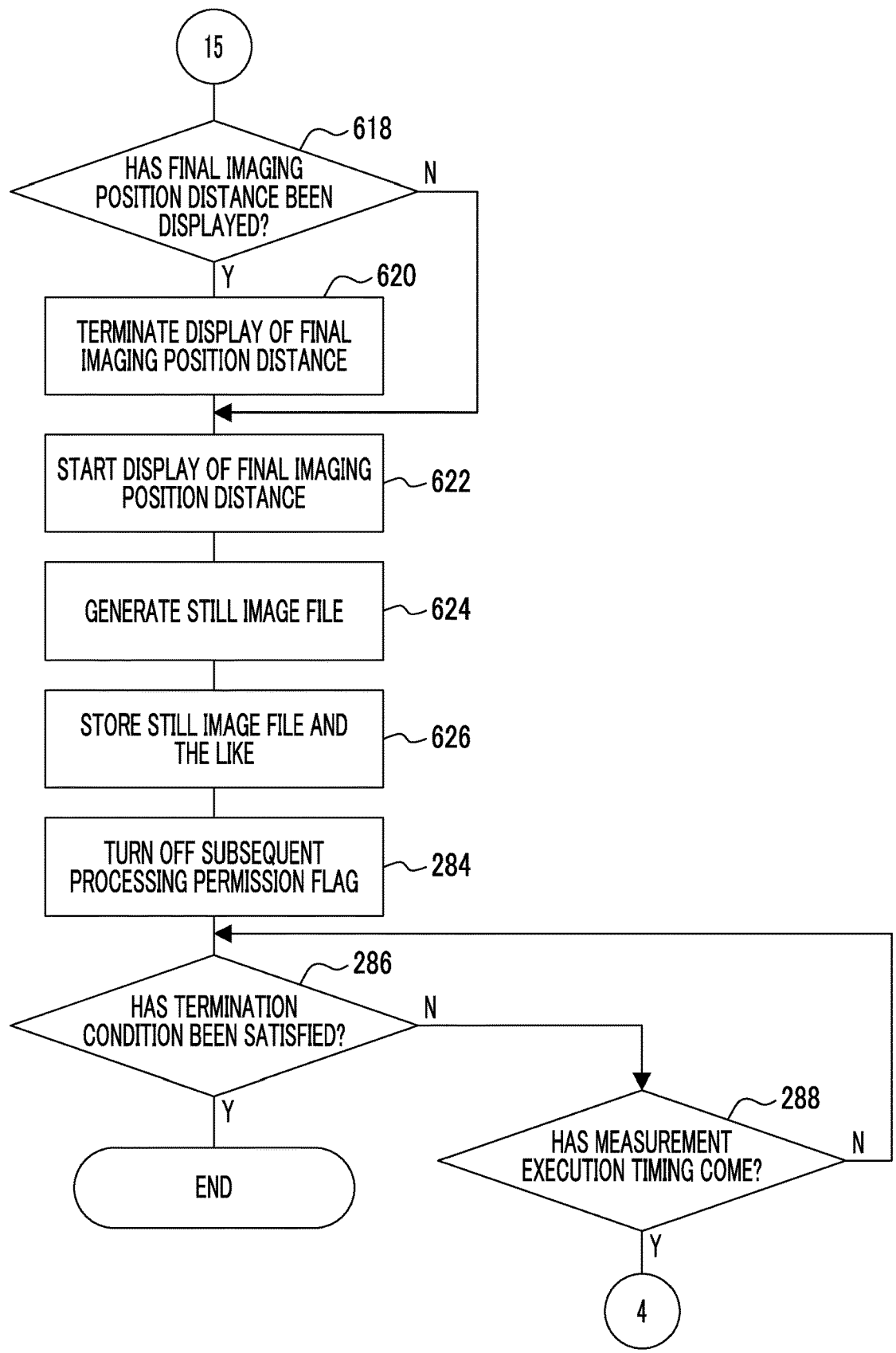
FIG. 41 is the continuation of the flowchart illustrated in FIG. 40.

In step 616, the execution unit 112F adjusts the imaging position distance derived in the processing of step 608 with reference to the reference imaging position distance derived in the processing of step 614 to derive the final imaging position distance, and then the process proceeds to step 618 illustrated in FIG. 41. Here, the adjustment of the imaging position distance refers to, for example, the obtainment of an average value between the imaging position distance and the reference imaging position distance, the multiplication of the average value between the imaging position distance and the reference imaging position distance and a first adjustment coefficient, or the multiplication of the imaging position distance and a second adjustment coefficient.

Meanwhile, both the first adjustment coefficient and the second adjustment coefficient are, for example, coefficients which are uniquely determined in accordance with the reference imaging position distance. For example, the first adjustment coefficient is derived from a correspondence table in which the reference imaging position distance and the first adjustment coefficient are associated with each other in advance, or a computational expression in which the reference imaging position distance is set to be an independent variable and the first adjustment coefficient is set to be a dependent variable. The second adjustment coefficient is similarly derived. The correspondence table or the computational expression are derived from a derivation table or a computational expression which is derived from results of experiment performed by the real machine of the distance measurement device 10F or computer simulation based on design specifications of the distance measurement device 10F at the stage before the shipment of the distance measurement device 10F.

Accordingly, examples of the final imaging position distance include an average value between the imaging position distance and the reference imaging position distance, a value obtained by multiplying the average value between the imaging position distance and the reference imaging position distance by the first adjustment coefficient, and a value obtained by multiplying the imaging position distance by the second adjustment coefficient.

In step 618 illustrated in FIG. 41, the execution unit 112F determines whether or not the final imaging position distance has already been displayed on the display unit 86. In step 618, in a case where the final imaging position distance has already been displayed on the display unit 86, the determination result is positive, and the process proceeds to step 620. In step 618, in a case where the final imaging position distance has not been displayed on the display unit 86, the determination result is negative, and the process proceeds to step 622.

In step 620, the execution unit 112F terminates the display of the final imaging position distance on the display unit 86, and then the process proceeds to step 622.

Figure 42:
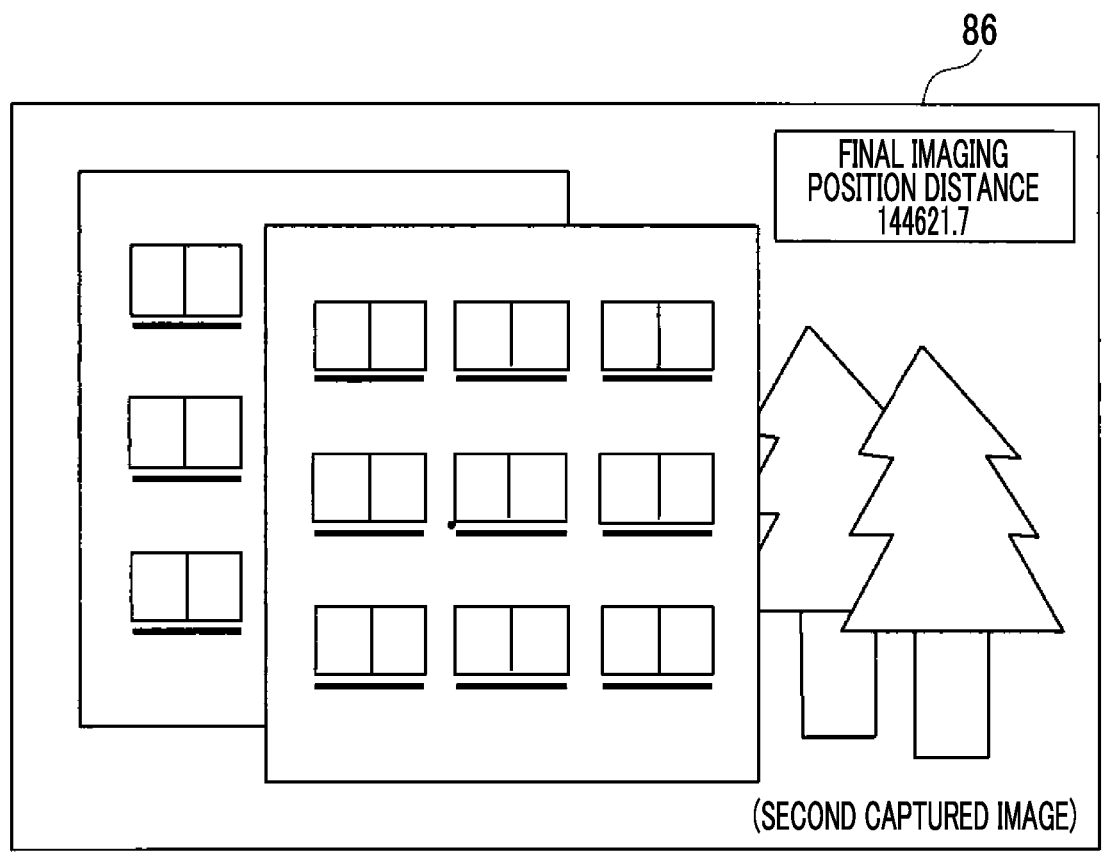
FIG. 42 is a schematic image illustrating an example of a second captured image, obtained by performing imaging using the imaging device according to the sixth embodiment, on which a final imaging position distance is displayed in an overlapping manner.

In step 622, the execution unit 112F starts the display of the final imaging position distance, which is derived in the processing of step 616 and is superimposed on the second captured image, on the display unit 86 as illustrated in FIG. 42 as an example, and then the process proceeds to step 624. Meanwhile, in the example illustrated in FIG. 42, a numerical value of "144621.7" corresponds to the final imaging position distance derived in the processing of step 616, and the unit is millimeter.

In step 624, the execution unit 112F generates a still image file from the second captured image signal acquired in the processing of step 238, and then the process proceeds to step 282. Meanwhile, the second captured image which is used in the processing of step 624 is the latest second captured image, and is an example of "the latest captured image" according to the technique of this disclosure.

In step 626, the execution unit 112F stores the still image file, the latest distance, and the latest final imaging position distance in the secondary storage unit 104, and then the process proceeds to step 284. Meanwhile, the latest distance and the latest final imaging position distance which are stored in the secondary storage unit 104 by the execution of the processing of step 626 are examples of "the information based on the latest distance" according to the technique of this disclosure. In addition, the latest final imaging position distance stored in the secondary storage unit 104 by the execution of the processing of step 282 is a latest final imaging position distance among the final imaging position distances derived in the processing of step 616.

Next, reference will be made to FIG. 43 to describe a three-dimensional coordinate derivation process realized by the CPU 100 executing the three-dimensional coordinate derivation program 108B in a case where a three-dimensional coordinate derivation button 90G is turned on. Meanwhile, here, for convenience of description, a description will be given on the assumption that the imaging position distance derivation process according to the sixth embodiment is executed by the CPU 100.

Figure 43:
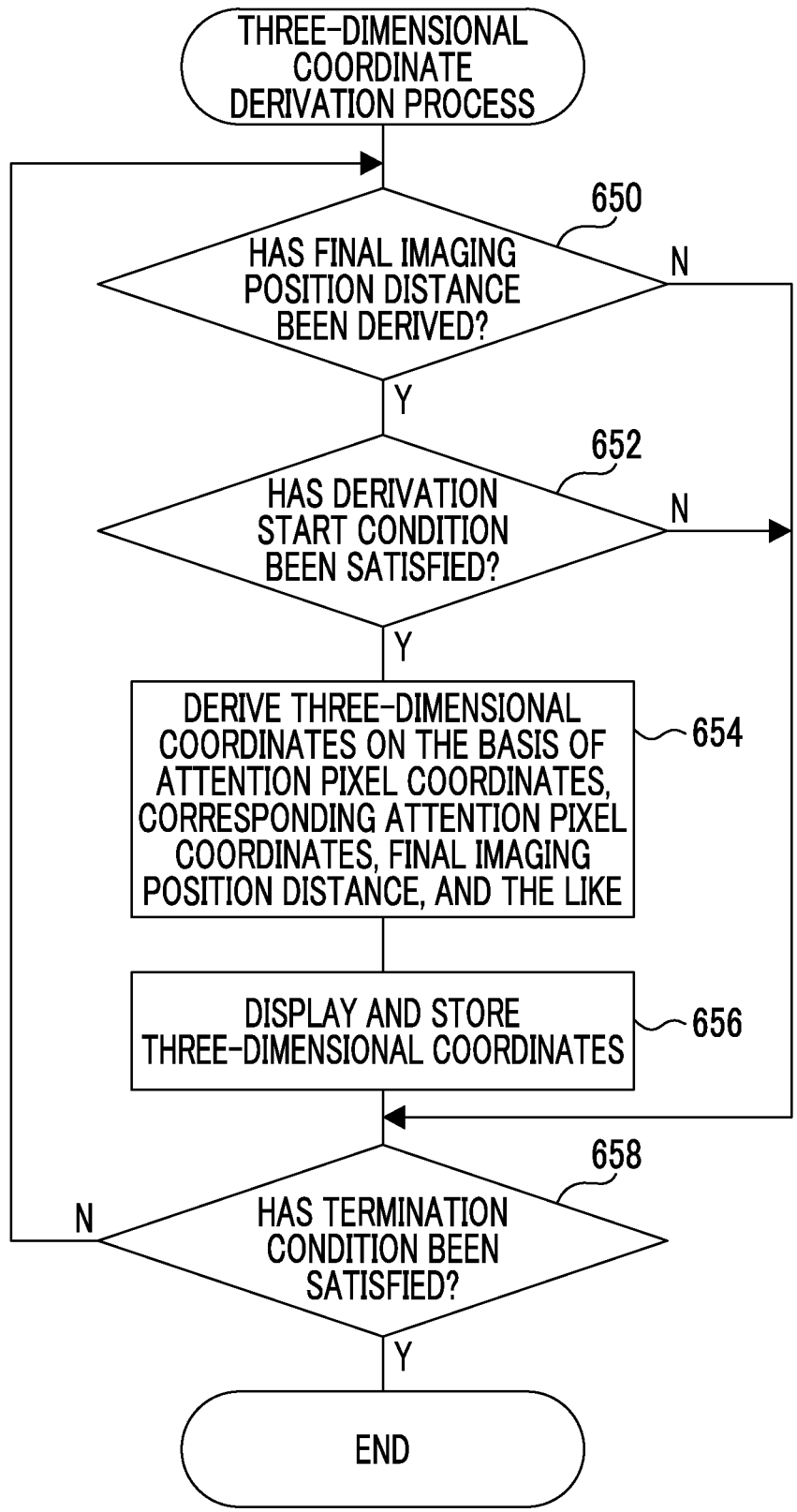
FIG. 43 is a flowchart illustrating an example of a flow of a three-dimensional coordinate derivation process according to the sixth embodiment.

In the three-dimensional coordinate derivation process illustrated in FIG. 43, first, in step 650, the execution unit 112F determines whether or not a final imaging position distance has already been derived in the processing of step 616 included in the imaging position distance derivation process. In step 650, in a case where a final imaging position distance has not been derived in the processing of step 616 included in the imaging position distance derivation process, the determination result is negative, and the process proceeds to step 658. In step 650, in a case where a final imaging position distance has already been derived in the processing of step 616 included in the imaging position distance derivation process, the determination result is positive, and the process proceeds to step 652.

In step 652, the execution unit 112F determines whether or not the derivation start condition described in the first embodiment has been satisfied. In step 652, in a case where the derivation start condition has not been satisfied, the determination result is negative, and the process proceeds to step 658. In step 652, in a case where the derivation start condition has been satisfied, the determination result is positive, and the process proceeds to step 654.

In step 654, the execution unit 112F derives the designated pixel three-dimensional coordinates on the basis of the attention pixel coordinates, the corresponding attention pixel coordinates, the final imaging position distance, the focal length of the imaging lens 50, the dimension of the imaging pixel 60A1, and Expression (1), and then the process proceeds to step 656.

Meanwhile, in step 654, the designated pixel three-dimensional coordinates are derived by substituting the attention pixel coordinates, the corresponding attention pixel coordinates, the final imaging position distance, the focal length of the imaging lens 50, and the dimension of the imaging pixel 60A1 for Expression (1).

Figure 44:
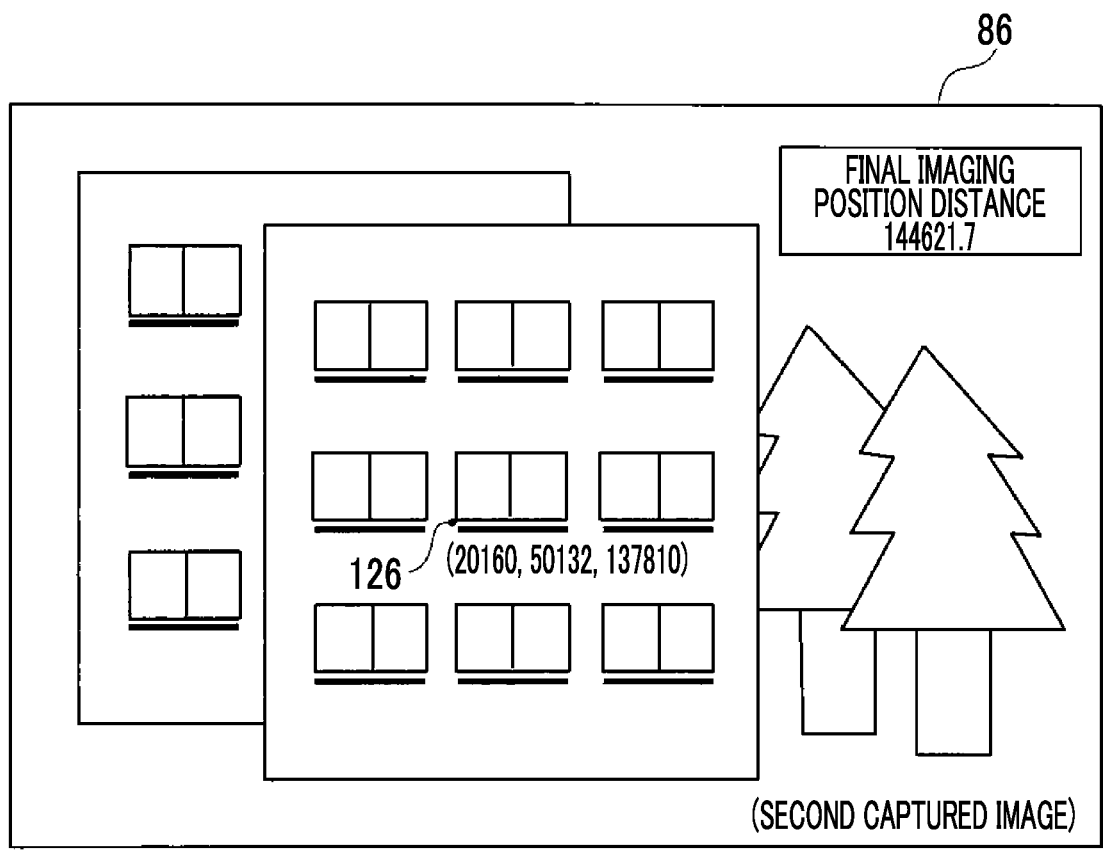
FIG. 44 is a schematic image illustrating an example of a second captured image, obtained by performing imaging using the imaging device according to the sixth embodiment, on which a final imaging position distance and designated pixel three-dimensional coordinates are displayed in an overlapping manner.

In step 656, the execution unit 112F displays the designated pixel three-dimensional coordinates derived in the processing of step 654 on the display unit 86 so as to be superimposed on the second captured image, as illustrated in FIG. 44 as an example. In step 656, the execution unit 112F stores the designated pixel three-dimensional coordinates derived in the processing of step 654 in a predetermined storage region, and then the process proceeds to step 658.

Meanwhile, in the example illustrated in FIG. 44, (20160, 50132, 137810) corresponds to the designated pixel three-dimensional coordinates derived in the processing of step 454. In the example illustrated in FIG. 44, the designated pixel three-dimensional coordinates are displayed in proximity to the attention pixel 126.

In step 658, the execution unit 184 determines whether or not a condition for terminating the three-dimensional coordinate derivation process has been satisfied. In step 658, in a case where the condition for terminating the three-dimensional coordinate derivation process has not been satisfied, the determination result is negative, and the process proceeds to step 650. In step 658, in a case where the condition for terminating the three-dimensional coordinate derivation process has been satisfied, the determination result is positive, and thus the three-dimensional coordinate derivation process is terminated.

As described above, in the distance measurement device 10F, a distance from the first position to the subject is measured, and a reference distance which is the measured distance is acquired by the acquisition unit 110F (step 602). In addition, the reference irradiation position real space coordinates are derived by the execution unit 112F on the basis of the reference distance (step 610). In addition, the reference imaging position distance is derived by the execution unit 112F on the basis of the attention pixel coordinates, the corresponding attention pixel coordinates, the three characteristic pixel coordinates, the corresponding characteristic pixel coordinates, the reference irradiation position real space coordinates, the focal length of the imaging lens 50, and the dimension of the imaging pixel 60A1 (step 614). The imaging position distance is adjusted by the execution unit 112F with reference to the reference imaging position distance, and thus the final imaging position distance is derived (step 616). Therefore, according to the distance measurement device 10F, it is possible to derive a distance between the first imaging position and the second imaging position with a high level of accuracy, as compared to a case where the reference imaging position distance is not used.

In the distance measurement device 10F, the designated pixel three-dimensional coordinates are derived on the basis of the final imaging position distance derived in the imaging position distance derivation process (see FIG. 43). Therefore, according to the distance measurement device 10F, it is possible to derive the designated pixel three-dimensional coordinates with a high level of accuracy, as compared to a case where the final imaging position distance is not used.

Further, in the distance measurement device 10F, the designated pixel three-dimensional coordinates are specified on the basis of the attention pixel coordinates, the corresponding attention pixel coordinates, the final imaging position distance, the focal length of the imaging lens 50, and the dimension of the imaging pixel 60A1 (see Expression (1)). Therefore, according to the distance measurement device 10F, it is possible to derive the designated pixel three-dimensional coordinates with a high level of accuracy, as compared to a case where the designated pixel three-dimensional coordinates are not specified on the basis of the final imaging position distance, the attention pixel coordinates, the corresponding attention pixel coordinates, the focal length of the imaging lens 50, and the dimension of the imaging pixel 60A1.

Meanwhile, in the sixth embodiment, a distance measured on the basis of a laser beam emitted from the first position is set to be the reference distance, but the technique of this disclosure is not limited thereto. For example, a distance measured on the basis of a laser beam emitted from the second position may be set to be the reference distance.

Seventh Embodiment

In the above-described embodiments, a description has been given of a case where an imaging position distance and the like are derived by one distance measurement device, but a description will be given of a case where an imaging position distance and the like are derived by two of a distance measurement devices and a personal computer (hereinafter, referred to as a PC) in a seventh embodiment.

In addition, PC stands for a Personal Computer. Meanwhile, in the seventh embodiment, the same components as those described in the above-described embodiments will be denoted by the same reference numerals and signs, and a description thereof will be omitted.

In addition, hereinafter, the imaging position distance derivation programs 106A, 106B, 106C, 106D, 106E, and 106F will be referred to as an "imaging position distance derivation program" without a reference numeral and a sign in a case where it is not necessary to give a description by distinguishing between the imaging position distance derivation programs. In addition, hereinafter, for convenience of description, the three-dimensional coordinate derivation programs 108A and 108B will be referred to as a "three-dimensional coordinate derivation program" without a reference numeral and a sign in a case where it is not necessary to give a description by distinguishing between the three-dimensional coordinate derivation programs. In addition, hereinafter, for convenience of description, the imaging position distance derivation program and the three-dimensional coordinate derivation program will be referred to as a "derivation program" in a case where the programs are collectively referred to. In addition, hereinafter, for convenience of description, the acquisition units 110A, 110B, 110C, 110D, 110E, and 110F will be referred to as an "acquisition unit 110" in a case where it is not necessary to give a description by distinguishing between the acquisition units. In addition, hereinafter, for convenience of description, the derivation units 111A, 111B, 111C, 111D, 111E, and 111F will be referred to as a "derivation unit 111" in a case where it is not necessary to give a description by distinguishing between the derivation units. In addition, hereinafter, for convenience of description, the execution units 112A, 112B, 112C, 112D, 112E, and 112F will be referred to as an "execution unit 112" in a case where it is not necessary to give a description by distinguishing between the execution units.

Figure 45:
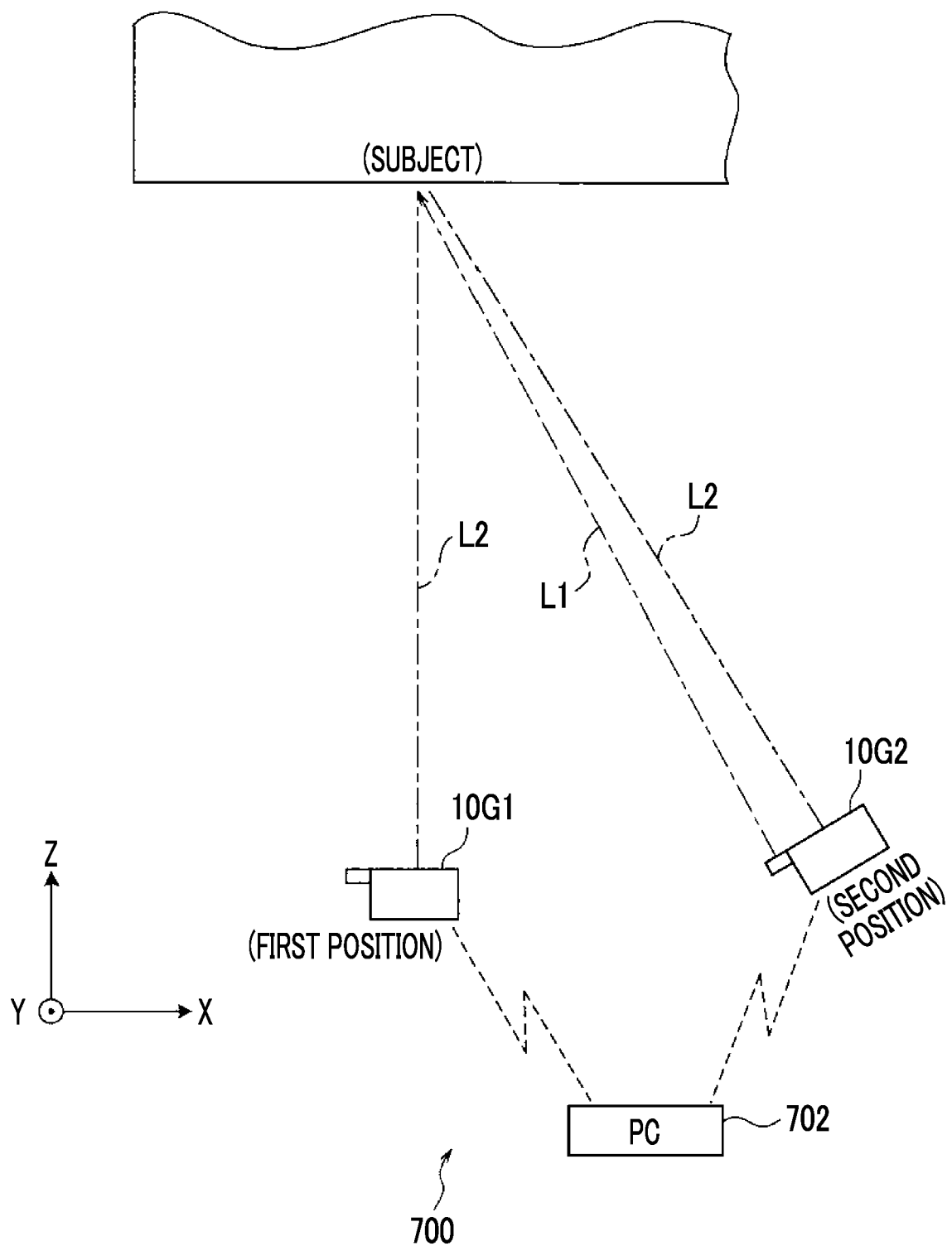
FIG. 45 is a schematic plan view illustrating an example of a positional relationship between two distance measurement devices included in an information processing system according to the seventh embodiment, a PC, and a subject.

As illustrated in FIG. 45 as an example, an information processing system 700 according to the seventh embodiment includes distance measurement devices 10G1 and 10G2 and a PC 702. Meanwhile, in the seventh embodiment, the PC 702 can communicate with the distance measurement devices 10G1 and 10G2. In the seventh embodiment, the PC 702 is an example of an information processing device according to the technique of this disclosure.

As illustrated in FIG. 45 as an example, the distance measurement device 10G1 is disposed at a first position, and the distance measurement device 10G2 is disposed at a second position different from the first position.

As illustrated in FIG. 45 as an example, the distance measurement devices 10G1 and 10G2 have the same configuration. Meanwhile, hereinafter, the distance measurement devices 10G1 and 10G2 will be referred to as a "distance measurement device 10G" in a case where it is not necessary to give a description by distinguishing between the distance measurement devices.

Figure 46:
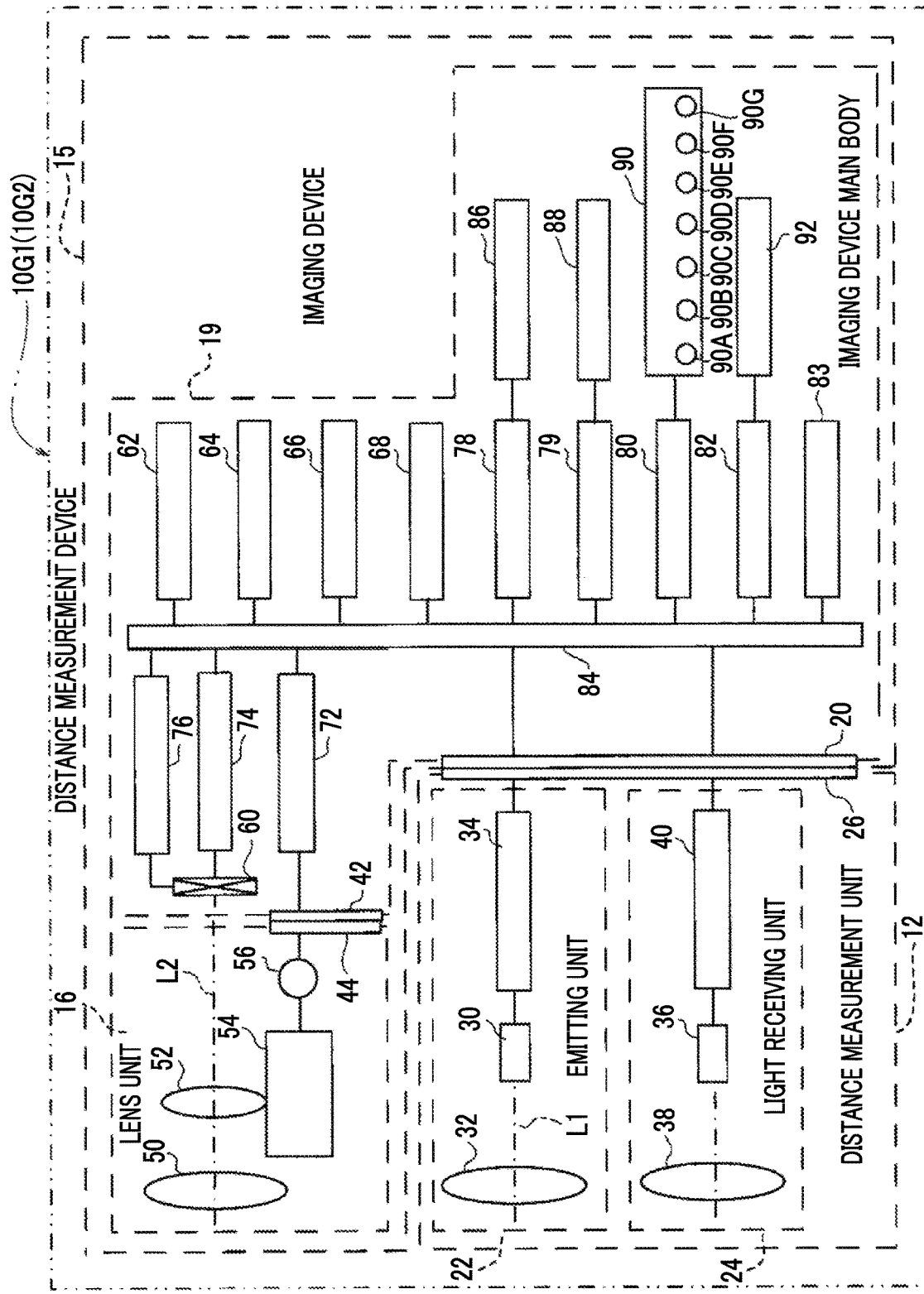
FIG. 46 is a block diagram illustrating an example of a hardware configuration of a distance measurement device according to the seventh embodiment.

As illustrated in FIG. 46 as an example, the distance measurement device 10G is different from the distance measurement device 10A in that an imaging device 15 is provided instead of the imaging device 14. The imaging device 15 is different from the imaging device 14 in that an imaging device main body 19 is provided instead of the imaging device main body 18.

The imaging device main body 19 is different from the imaging device main body 18 in that a communication I/F 83 is provided. The communication I/F 83 is connected to a bus line 84, and is operated under the control of a main control unit 62.

The communication I/F 83 is connected to a communication network (not shown) such as the Internet, and transmits and receives various information to and from the PC 702 connected to the communication network.

Figure 47:
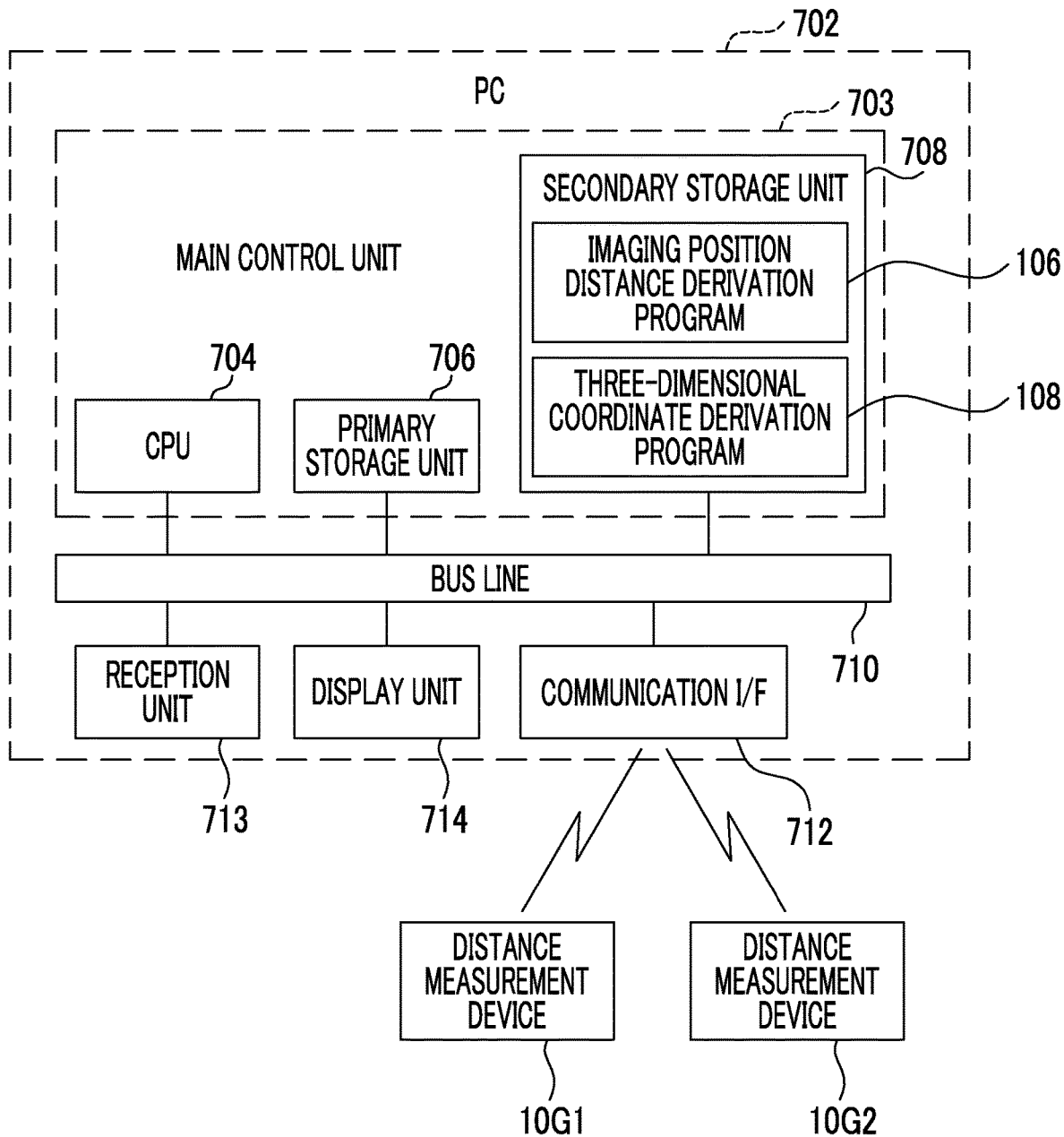
FIG. 47 is a block diagram illustrating an example of a hardware configuration of the PC according to the seventh embodiment.

As illustrated in FIG. 47 as an example, the PC 702 includes a main control unit 703. The main control unit 703 includes a CPU 704, a primary storage unit 706, and a secondary storage unit 708. The CPU 704, the primary storage unit 706, and the secondary storage unit 708 are connected to each other through a bus line 710.

In addition, the PC 702 includes a communication I/F 712. The communication I/F 712 is connected to the bus line 710, and is operated under the control of the main control unit 703. The communication I/F 712 is connected to the communication network, and transmits and receives various information to and from the distance measurement device 10G connected to the communication network.

In addition, the PC 702 includes a reception unit 713 and a display unit 714. The reception unit 713 is connected to the bus line 710 through a reception I/F (not shown), and the reception I/F outputs an instruction content signal indicating contents of an instruction received by the reception unit 713 to the main control unit 703. Meanwhile, the reception unit 713 is realized by, for example, a keyboard, a mouse, and a touch panel.

The display unit 714 is connected to the bus line 710 through a display control unit (not shown), and displays various information under the control of the display control unit. Meanwhile, the display unit 714 is realized by, for example, an LCD.

The secondary storage unit 708 stores the imaging position distance derivation program and the three-dimensional coordinate derivation program which are described in the above-described embodiments.

The CPU 704 acquires a first captured image signal, attention pixel coordinates, a distance, and the like from the distance measurement device 10G1 through the communication I/F 712. In addition, the CPU 704 acquires a second captured image signal, corresponding attention pixel coordinates, a distance, and the like from the distance measurement device 10G2 through the communication I/F 712.

The CPU 704 reads out the imaging position distance derivation program and the three-dimensional coordinate derivation program from the secondary storage unit 708 and develops the read-out imaging position distance derivation program and three-dimensional coordinate derivation program to the primary storage unit 706 to execute the imaging position distance derivation program and the three-dimensional coordinate derivation program. Meanwhile, hereinafter, for convenience of description, the imaging position distance derivation program and the three-dimensional coordinate derivation program are collectively referred to as a "derivation program".

The CPU 704 executes the derivation imaging position distance derivation program, and is thus operated as the acquisition unit 110, the derivation unit 111, and the execution unit 112. For example, the CPU 704 executes the imaging position distance derivation program 106A, and thus the imaging position distance derivation process described in the above-described first embodiment is realized. In addition, for example, the CPU 704 executes the three-dimensional coordinate derivation program 108A, and thus the three-dimensional coordinate derivation process described in the above-described first embodiment is realized.

Accordingly, in the information processing system 700, the PC 702 acquires the first captured image signal, second captured image signals, the attention pixel coordinates, the distance, and the like from the distance measurement device 10E through the communication I/F 712 and then executes the derivation programs, and thus the same operations and effects as those in the above-described embodiments are obtained.

Eighth Embodiment

In the first embodiment, a description has been given of a case where the distance measurement device 10A is realized by the distance measurement unit 12 and the imaging device 14, but a description will be given of a distance measurement device 10H which is realized by further including a smart device 802 in an eighth embodiment. Meanwhile, in the eighth embodiment, the same components as those in the above-described embodiments will be denoted by the same reference numerals and signs, and a description thereof will be omitted, and only different portions from the above-described embodiments will be described.

Figure 48:
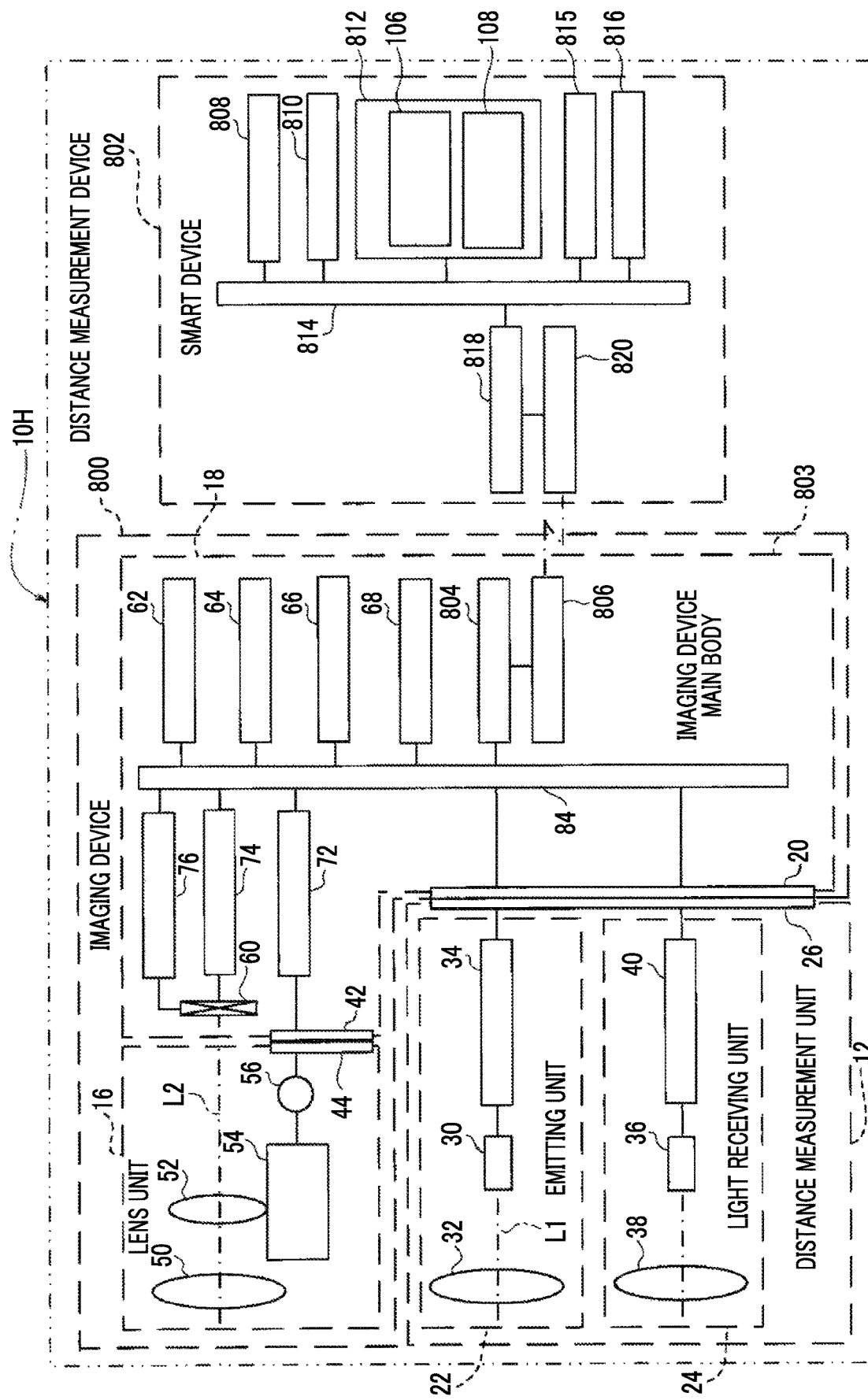
FIG. 48 is a block diagram illustrating an example of a hardware configuration of a distance measurement device according to the eighth embodiment.

As illustrated in FIG. 48 as an example, the distance measurement device 10H according to the eighth embodiment is different from the distance measurement device 10A according to the first embodiment in that an imaging device 800 is provided instead of the imaging device 14. In addition, the distance measurement device 10H is different from the distance measurement device 10A in that a smart device 802 is provided.

The imaging device 800 is different from the imaging device 14 in that an imaging device main body 803 is provided instead of the imaging device main body 18.

The imaging device main body 803 is different from the imaging device main body 18 in that a wireless communication unit 804 and a wireless communication antenna 806 are provided.

The wireless communication unit 804 is connected to a bus line 84 and the wireless communication antenna 806. The main control unit 62 outputs transmission target information, which is information to be transmitted to the smart device 802, to the wireless communication unit 804.

The wireless communication unit 804 transmits the transmission target information, which is input from the main control unit 62, to the smart device 802 by radio waves through the wireless communication antenna 806. In addition, when the radio waves from the smart device 802 are received by the wireless communication antenna 806, the wireless communication unit 804 acquires a signal based on the received radio waves, and outputs the acquired signal to the main control unit 62.

The smart device 802 includes a CPU 808, a primary storage unit 810, and a secondary storage unit 812. The CPU 808, the primary storage unit 810, and the secondary storage unit 812 are connected to a bus line 814.

The CPU 808 controls the entire distance measurement device 10H, inclusive of the smart device 802. The primary storage unit 810 is a volatile memory which is used as a work area and the like during the execution of various programs. An example of the primary storage unit 810 is a RAM. The secondary storage unit 812 is a non-volatile memory that stores a control program for controlling the overall operation of the distance measurement device 10H, various parameters, and the like, inclusive of the smart device 802. An example of the secondary storage unit 812 is a flash memory or an EEPROM.

The smart device 802 includes a display unit 815, a touch panel 816, a wireless communication unit 818, and a wireless communication antenna 820.

The display unit 815 is connected to the bus line 814 through a display control unit (not shown), and displays various information under the control of the display control unit. Meanwhile, the display unit 815 is realized by, for example, an LCD.

The touch panel 816 is superimposed on a display screen of the display unit 815, and receives a touch by an indicator. The touch panel 816 is connected to the bus line 814 through a touch panel I/F (not shown), and outputs positional information indicating a position touched by the indicator to the touch panel I/F. The touch panel I/F is operated in accordance with an instruction of the CPU 808, and outputs the positional information, which is input from the touch panel 816, to the CPU 808.

Figure 49:
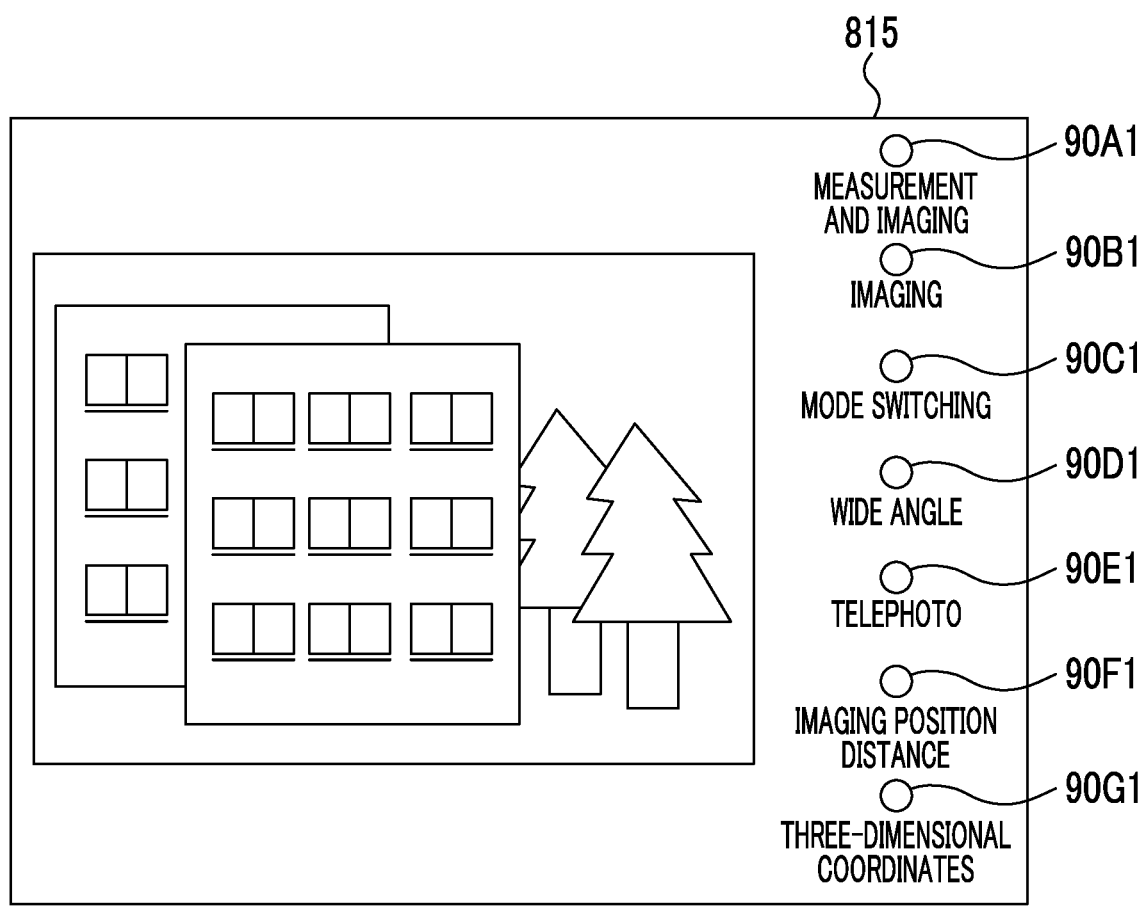
FIG. 49 is a screen view illustrating an example of a screen including various buttons displayed as soft keys on a display unit of a smart device included in the distance measurement device according to the eighth embodiment.

Soft keys equivalent to a measurement and imaging button 90A, an imaging button 90B, an imaging system operation mode switching button 90C, a wide angle instruction button 90D, a telephoto instruction button 90E, an imaging position distance derivation button 90F, a three-dimensional coordinate derivation button 90G and the like are displayed on the display unit 815 (see FIG. 49).

For example, as illustrated in FIG. 49, a measurement and imaging button 90A1 functioning as the measurement and imaging button 90A is displayed on the display unit 815 as a soft key, and is pressed down by the user through the touch panel 816. In addition, for example, an imaging button 90B1 functioning as the imaging button 90B is displayed on the display unit 815 as a soft key, and is pressed down by the user through the touch panel 816. In addition, for example, an imaging system operation mode switching button 90C1 functioning as the imaging system operation mode switching button 90C is displayed on the display unit 815 as a soft key, and is pressed down by the user through the touch panel 816.

In addition, for example, a wide angle instruction button 90D1 functioning as the wide angle instruction button 90D is displayed on the display unit 815 as a soft key, and is pressed down by the user through the touch panel 816. Further, for example, a telephoto instruction button 90E1 functioning as the telephoto instruction button 90E is displayed on the display unit 815 as a soft key, and is pressed down by the user through the touch panel 816.

In addition, for example, an imaging position distance derivation button 90F1 functioning as the imaging position distance derivation button 90F is displayed on the display unit 815 as a soft key, and is pressed down by the user through the touch panel 816. In addition, for example, a three-dimensional coordinate derivation button 90G1 functioning as the three-dimensional coordinate derivation button 90G is displayed on the display unit 815 as a soft key, and is pressed down by the user through the touch panel 816.

The wireless communication unit 818 is connected to the bus line 814 and the wireless communication antenna 820. The wireless communication unit 818 transmits a signal, which is input from the CPU 808, to the imaging device main body 803 by radio waves through the wireless communication antenna 820. In addition, when the radio waves are received by the wireless communication antenna 820 from the imaging device main body 803, the wireless communication unit 818 acquires a signal based on the received radio waves and outputs the acquired signal to the CPU 808. Therefore, the imaging device main body 803 is controlled by the smart device 802 through wireless communication performed between the smart device 802 and the imaging device main body 803.

The secondary storage unit 812 stores a derivation program. The CPU 808 reads out the derivation program from the secondary storage unit 812 and develops the read-out derivation program to the primary storage unit 810 to execute the derivation program.

The CPU 808 executes the imaging position distance derivation program, and is thus operated as the acquisition unit 110, the derivation unit 111, and the execution unit 112. For example, the CPU 808 executes the imaging position distance derivation program 106A, and thus the imaging position distance derivation process described in the first embodiment is realized. In addition, for example, the CPU 808 executes the three-dimensional coordinate derivation program 108A, and thus the three-dimensional coordinate derivation process described in the first embodiment is realized.

Therefore, in the distance measurement device 10H, the smart device 802 executes the derivation program, and thus the same operations and effects as those in the above-described embodiments are obtained. In addition, according to the distance measurement device 10H, it is possible to reduce a load applied to the imaging device 800 in obtaining the effects described in the above-described embodiments, as compared to a case where the imaging position distance derivation process and the three-dimensional derivation process are executed by the imaging device 800.

Meanwhile, in the above-described embodiments, a corresponding attention pixel is specified by executing image analysis with a second captured image as an object to be analyzed, and corresponding attention pixel coordinates for specifying the specified corresponding attention pixel are acquired (see steps 268 and 300), but the technique of this disclosure is not limited thereto. For example, the user may designate a pixel corresponding to an attention pixel as the corresponding attention pixel from the second captured image through the touch panel 88.

In the above-described embodiments, a description has been given of a case where the execution unit 112 derives irradiation position real space coordinates, the direction of a plane, an imaging position distance, designated pixel three-dimensional coordinates, and the like by using a computational expression, but the technique of this disclosure is not limited thereto. For example, the execution unit 112 may derive irradiation position real space coordinates, the direction of a plane, an imaging position distance, designated pixel three-dimensional coordinates, and the like by using a table in which an independent variable of the computational expression is set to be an input and a dependent variable of the computational expression is set to be an output.

Figure 50:
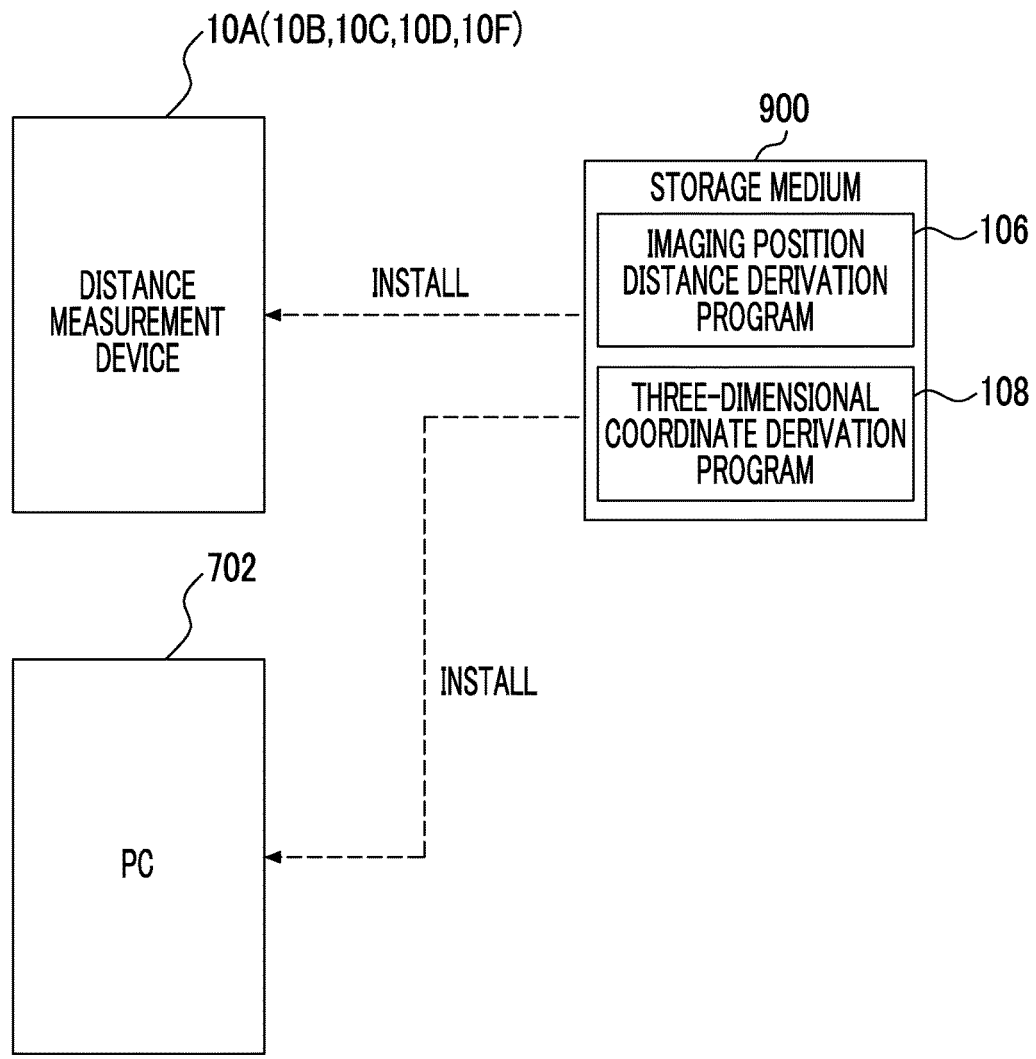
FIG. 50 is a conceptual diagram illustrating an example of a mode in which an imaging position distance derivation program and a three-dimensional coordinate derivation program according to the first to sixth embodiments are installed in a distance measurement device or a PC from a storage medium in which the imaging position distance derivation program and the three-dimensional coordinate derivation program are stored.

In the above-described embodiments, a description has been given of a case where the derivation program is read out from the secondary storage unit 104 but the calculation program is not necessarily stored in the secondary storage unit 104 from the beginning. For example, as illustrated in FIG. 50, the derivation program may be first stored in any portable storage medium 900 such as a Solid State Drive (SSD) or a Universal Serial Bus (USB) memory. In this case, the derivation program of the storage medium 900 is installed in the distance measurement device 10A (10B, 10C, 10D, 10E, 10F) (hereinafter, referred to as "distance measurement device 10A and the like") or the PC 702. The installed derivation program is executed by the CPU 100 (704).

In addition, the derivation program may be stored in a storage unit of another computer or a server device connected to the distance measurement device 10A and the like or the PC 702 through a communication network (not shown), and the derivation program may be downloaded in accordance with requests of the distance measurement device 10A and the like. In this case, the downloaded derivation program is executed by the CPU 100 (704).

In the above-described embodiments, a description has been given of a case where various information such as an irradiation position mark 136, an imaging position distance, and designated pixel three-dimensional coordinates is displayed on the display unit 86, but the technique of this disclosure is not limited thereto. For example, various information may be displayed on a display unit of an external device which is used by being connected to the distance measurement device 10A and the like or the PC 702. An example of the external device is a PC or a spectacles-type or wristwatch type wearable terminal device.

In the above-described embodiments, a description has been given of a case where the irradiation position mark 136, the imaging position distance, the designated pixel three-dimensional coordinates, and the like are visibly displayed by the display unit 86, but the technique of this disclosure is not limited thereto. For example, audible display such as the output of a sound using a sound reproducing device or permanent visible display such as the output of printed matter using a printer may be performed instead of the visible display or may be performed in combination.

In the above-described embodiments, a description has been given of a case where the irradiation position mark 136, the imaging position distance, the designated pixel three-dimensional coordinates, and the like are displayed on the display unit 86, but the technique of this disclosure is not limited thereto. For example, at least one of the irradiation position mark 136, the imaging position distance, the designated pixel three-dimensional coordinates, and the like may be displayed on a display unit (not shown) different from the display unit 86, and the remainders may be displayed on the display unit 86. The irradiation position mark 136, the imaging position distance, the designated pixel three-dimensional coordinates, and the like may be individually displayed on a plurality of display units including the display unit 86.

In the above-described embodiments, a laser beam has been described as light for distance measurement. However, the technique of this disclosure is not limited thereto, and the light for distance measurement may be directional light having directivity. For example, the light for distance measurement may be directional light obtained by a Light Emitting Diode (LED), a Super Luminescent Diode (SLD), or the like. It is preferable that directivity of the directional light is the same degree of directivity as that of the directivity of the laser beam and is usable in distance measurement, for example, within a range between several meters and several kilometers.

In addition, the imaging position distance derivation process and the three-dimensional coordinate derivation process described in the above-described embodiments are just examples. Therefore, it is needless to say that the deletion of unnecessary steps, the addition of new steps, and the change of processing order may be performed without departing from the scope of the invention. In addition, each processing included in the imaging position distance derivation process and the three-dimensional coordinate derivation process may be realized only by a hardware configuration such as ASIC, or may be realized by a combination of a software configuration and a hardware configuration using a computer.

Figure 51:
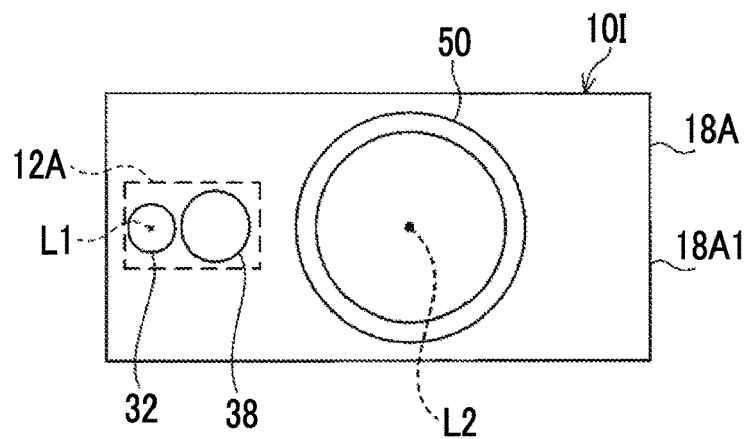
FIG. 51 is a front view illustrating a modification example of the appearance of the distance measurement device according to the first to seventh embodiments.

In the above-described embodiments, for convenience of description, a description has been given of a case where the distance measurement unit 12 is mounted on the side surface of the imaging device main body 18 included in the distance measurement device 10A and the like, but the technique of this disclosure is not limited thereto. For example, the distance measurement unit 12 may be mounted on the upper surface or the lower surface of the imaging device main body 18. In addition, for example, as illustrated in FIG. 51, a distance measurement device 10I may be applied instead of the distance measurement device 10A and the like. As illustrated in FIG. 51 as an example, the distance measurement device 10I is different from the distance measurement device 10A and the like in that a distance measurement unit 12A is provided instead of the distance measurement unit 12 and an imaging device main body 18A is provided instead of the imaging device main body 18.

In the example illustrated in FIG. 51, the distance measurement unit 12A is accommodated in a housing 18A1 of the imaging device main body 18A, and objective lenses 32 and 38 are exposed from the housing 18A1 on the front side (a side where the imaging lens 50 is exposed) of the distance measurement device 10I. In addition, it is preferable that the distance measurement unit 12A is disposed such that optical axes L1 and L2 are set to be at the same height in the vertical direction. Meanwhile, an opening (not shown) through which the distance measurement unit 12A can be inserted into and removed from the housing 18A1 may be formed in the housing 18A1.

Figure 52:
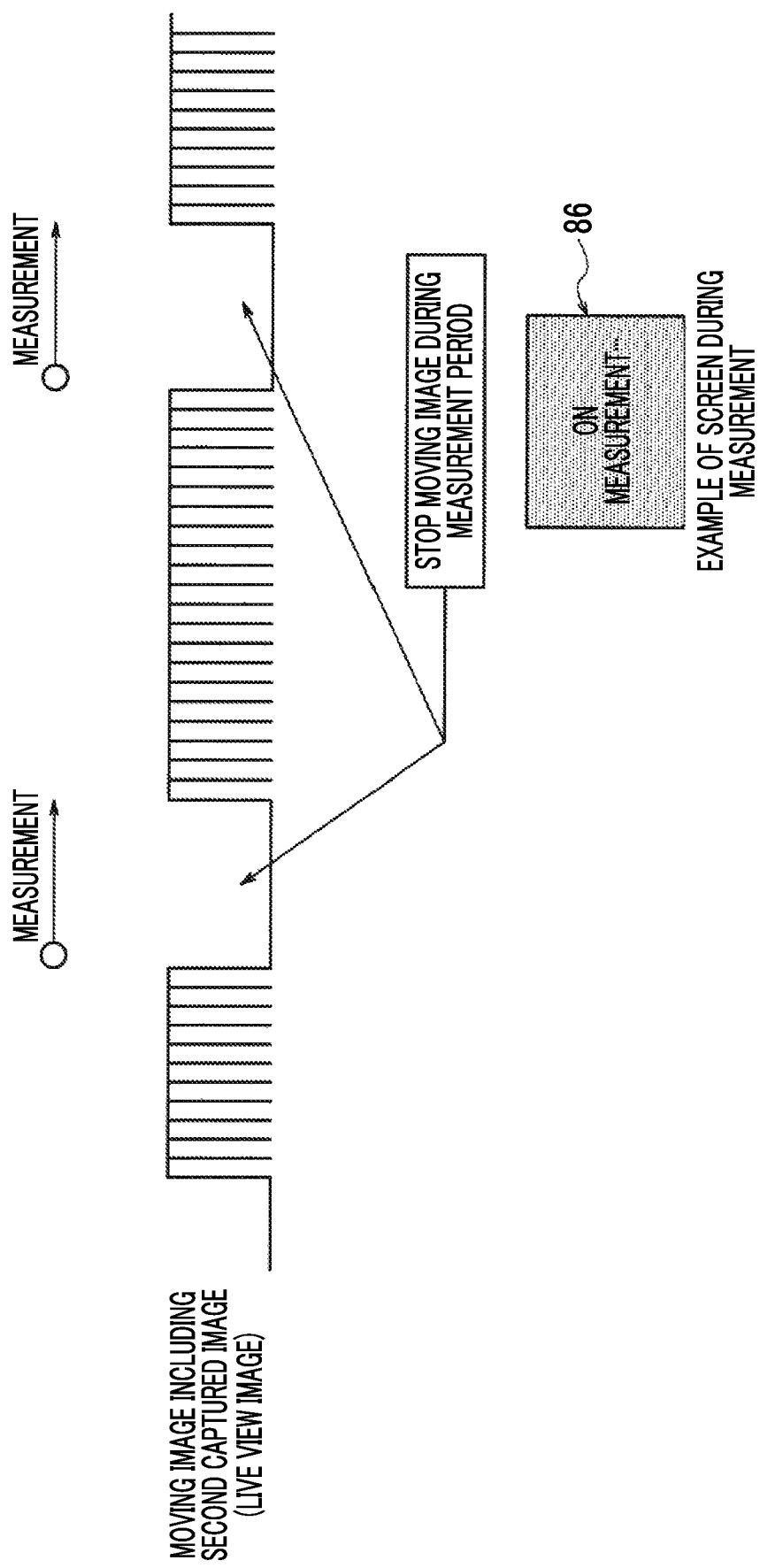
FIG. 52 is a time chart illustrating an example of a flow of a process in a case where a timing when a distance to a subject is measured and a timing when a moving image is captured alternately come, and a screen view illustrating an example of a screen during the measurement of the distance to the subject.

In the above-described embodiments, a description has been given of a case where a distance to a subject is measured while a live view image is captured, but the technique of this disclosure is not limited thereto. For example, as illustrated in FIG. 52, the distance measurement device 10A and the like may stop capturing a live view image which is an example of a moving image during a measurement period of a distance to the subject.

In this case, for example, the CPU 100 controls the imaging device 14 and the distance measurement unit 12 so that a timing when a live view image including a plurality of second captured images is captured and a timing when a distance to the subject is measured alternately come. That is, the CPU 100 causes the imaging device 14 to stop capturing a live view image while a distance to the subject is measured, and causes the display unit 86 not to display a second captured image and to display a message of "on measurement". In addition, the CPU 100 causes the imaging device 14 to capture a live view image and causes the display unit 86 to display a second captured image, while a distance to the subject is not measured. Thereby, the distance measurement device 10A and the like can control power consumption, as compared to a case where a distance to the subject is measured during the capture of a live view image.

Meanwhile, the half angle of view α used in the processing of steps 242 and 244 included in the imaging position distance calculation process according to the first embodiment and the half angle of view α used in the processing of step 610 included in the imaging position distance calculation process according to the sixth embodiment are derived on the basis of the following Expression (10). In Expression (10), "$f_0$" denotes a focal length.

$$\alpha = \operatorname{atan}\left\{\frac{(\text{dimension of imaging pixel})}{2 \times f_0}\right\} \qquad (10)$$

All the documents, patent applications, and technical specifications described in the present specification are incorporated into the present specification by reference, to the same extent as in a case where the individual documents, patent applications, and technical specifications were specifically and individually described as being incorporated by reference.

With regard to the above-described embodiments, the following appendixes will be further disclosed.

(Appendix 1)

An information processing device comprising:

a processor; and a memory storing instructions, which when executed by the processor perform a procedure, the procedure including:

acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light;

deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the first captured image and each of the second captured images.

(Appendix 2)

An information processing device comprising:

a processor; and a memory storing instructions, which when executed by the processor perform a procedure, the procedure including:

acquiring a first captured image obtained by imaging a subject from a first imaging position, a moving image including a plurality of second captured images obtained by imaging the subject from a second imaging position different from the first imaging position, and a distance to the subject which is measured by emitting directional light, which is light having directivity, to the subject and receiving reflected light of the directional light;

deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the first captured image and each of the second captured images.

(Appendix 3)

The information processing device according to Appendix 1 or 2, wherein the processor is a circuitry.

What is claimed is:

1. An information processing device comprising:

an imaging device comprising a lens and a body;

a distance measurement device comprising a light emitter and a light receiver;

an acquisition unit, which is a processor, that acquires: (a) a first captured image obtained by imaging a subject from a first imaging position, (b) a moving image including a plurality of second captured images obtained by imaging the subject from a second imaging position different from the first imaging position, the first captured image and moving image being obtained by the imaging device, and (c) a distance to the subject which is measured by the distance measurement device by emitting directional light, which is light having directivity, to the subject and receiving reflected light of the directional light;

a derivation unit, which is a processor, that derives irradiation position pixel coordinates for specifying a position of a pixel corresponding to an irradiation position of the directional light on a real space with respect to the subject, on the basis of the corresponding distance acquired by the acquisition unit, with respect to each of the plurality of second captured images included in the moving image acquired by the acquisition unit; and an execution unit, which is a processor, that executes a predetermined process as a process to be executed in a position specifiable state with respect to each of the plurality of second captured images, in a case of the position specifiable state where the position of the pixel which is specified by the irradiation position pixel coordinates derived by the derivation unit is a position of a pixel which is specifiable at positions corresponding to each other in the respective first and the second captured images.

2. The information processing device according to claim 1, wherein the predetermined process is a process including a position specifiable state notification process of giving notice of being the position specifiable state.

3. The information processing device according to claim 2, wherein the derivation unit further derives irradiation position real space coordinates for specifying the irradiation position of the directional light on the real space with respect to the subject, on the basis of the corresponding distance acquired by the acquisition unit, with respect to each of the plurality of second captured images, and wherein the predetermined process is a process including a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, a focal length of an imaging lens used for the imaging of the subject, and dimensions of imaging pixels included in an imaging pixel group for imaging the subject, in a case where a predetermined instruction is received by a first reception unit in a state where the notice of being the position specifiable state is given.

4. The information processing device according to claim 1,
wherein the execution unit further executes a position unspecifiable state notification process of giving notice of being a position unspecifiable state with respect to each of the plurality of second captured images, in a case of the position unspecifiable state where the position of the pixel which is specified by the irradiation position pixel coordinates is a position of a pixel different from the pixel which is specifiable at the positions corresponding to each other in the first captured image and each of the second captured images.

5. The information processing device according to claim 4,
wherein the derivation unit further derives irradiation position real space coordinates for specifying the irradiation position of the directional light on the real space with respect to the subject, on the basis of the corresponding distance acquired by the acquisition unit, with respect to each of the plurality of second captured images, and
wherein the execution unit executes a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, the focal length of the imaging lens used in the imaging of the subject, and the dimensions of the imaging pixels included in the imaging pixel group for imaging the subject, in a case where a predetermined instruction is received by a second reception unit in a state where the notice of being the position unspecifiable state is given.

6. The information processing device according to claim 1,
wherein the derivation unit further derives irradiation position real space coordinates for specifying the irradiation position of the directional light on the real space with respect to the subject, on the basis of the corresponding distance acquired by the acquisition unit, with respect to each of the plurality of second captured images, and
wherein the predetermined process is a process including a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, a focal length of an imaging lens used for the imaging of the subject, and dimensions of imaging pixels included in an imaging pixel group for imaging the subject.

7. The information processing device according to claim 1,
wherein the predetermined process is a process including a storage process of storing, in a storage unit, at least one of a second captured image obtained by performing imaging at a predetermined timing among the plurality of second captured images, or information based on a distance acquired at a timing corresponding to the predetermined timing among the distances acquired by the acquisition unit.

8. The information processing device according to claim 1, further comprising:
a measurement unit that measures the distance by emitting the directional light and receiving the reflected light,
wherein the acquisition unit acquires the distance measured by the measurement unit.

9. The information processing device according to claim 1, further comprising:
an imaging unit that images the subject,
wherein the acquisition unit acquires the moving image obtained by performing imaging by the imaging unit.

10. The information processing device according to claim 1,
wherein the acquisition unit acquires a distance to the subject which is measured by emitting the directional light to the subject and receiving reflected light of the directional light while the moving image is captured.

11. An information processing device comprising:
an imaging device comprising a lens and a body;
a distance measurement device comprising a light emitter and a light receiver;
an acquisition unit, which is a processor, that acquires: (a) a first captured image obtained by imaging a subject from a first imaging position, (b) a moving image including a plurality of second captured images obtained by imaging the subject from a second imaging position different from the first imaging position, the first captured image and moving image being obtained by the imaging device, and (c) a distance to the subject which is measured by the distance measurement device by emitting directional light, which is light having directivity, to the subject and receiving reflected light of the directional light;
a derivation unit, which is a processor, that derives irradiation position pixel coordinates for specifying a position of a pixel corresponding to an irradiation position of the directional light on a real space with respect to the subject, on the basis of the corresponding distance acquired by the acquisition unit, with respect to each of the plurality of second captured images included in the moving image acquired by the acquisition unit; and
an execution unit, which is a processor, that executes a predetermined process as a process to be executed in a position unspecifiable state with respect to each of the plurality of second captured images, in a case of the position unspecifiable state where the position of the pixel which is specified by the irradiation position pixel coordinates derived by the derivation unit is a position of a pixel different from a pixel which is specifiable at positions corresponding to each other in the first captured image and each of the second captured images.

12. The information processing device according to claim 11,
wherein the predetermined process is a process including a position unspecifiable state notification process of giving notice of being the position unspecifiable state.

13. The information processing device according to claim 12,
wherein the derivation unit further derives irradiation position real space coordinates for specifying the irradiation position of the directional light on the real space with respect to the subject, on the basis of the corresponding distance acquired by the acquisition unit, with respect to each of the plurality of captured images, and
wherein the predetermined process is a process including a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, a focal length of an imaging lens used in the imaging of the subject, and dimensions of imaging pixels included in an imaging pixel group for imaging the subject, in a case where a predetermined instruction is received by a first reception unit in a state where the notice of being the position unspecifiable state is given.

14. The information processing device according to claim 11,
wherein the execution unit further executes a position specifiable state notification process of giving notice of being a position specifiable state with respect to each of the plurality of second captured images, in a case of the position specifiable state where the position of the pixel which is specified by the irradiation position pixel coordinates is the position of the pixel which is specifiable at the positions corresponding to each other in the first captured image and each of the second captured images.

15. The information processing device according to claim 14,
wherein the derivation unit further derives irradiation position real space coordinates for specifying the irradiation position of the directional light on the real space with respect to the subject, on the basis of the corresponding distance acquired by the acquisition unit, with respect to each of the plurality of second captured images, and
wherein the execution unit executes a process of deriving an imaging position distance which is a distance between the first imaging position and the second imaging position, on the basis of the irradiation position real space coordinates, the irradiation position pixel coordinates, irradiation position correspondence pixel coordinates for specifying a position of a pixel in the first captured image which is a position of a pixel corresponding to the position of the pixel which is specified by the irradiation position pixel coordinates, the focal length of the imaging lens used for the imaging of the subject, and the dimensions of the imaging pixels included in the imaging pixel group for imaging the subject, in a case where a predetermined instruction is received by a second reception unit in a state where the notice of being the position specifiable state is given.

16. The information processing device according to claim 11,
wherein the derivation unit further derives irradiation position real space coordinates for specifying the irradiation position of the directional light on the real space with respect to the subject, on the basis of the corresponding distance acquired by the acquisition unit, with respect to each of the plurality of second captured images, and
wherein the predetermined process is a process including a process of deriving an imaging position distance which is a distance between the first imaging position and the second imaging position, on the basis of a plurality of pixel coordinates being a plurality of coordinates for specifying a plurality of pixels which are present in the same planar region as the irradiation position where the directional light is emitted on the real space and which are equal to or more than three pixels specifiable at positions corresponding to each other in the first captured image and each of the second captured images, the irradiation position real space coordinates, the focal length of the imaging lens used in the imaging of the subject, and the dimensions of the imaging pixels included in the imaging pixel group for imaging the subject.

17. An information processing method comprising:
providing an imaging device comprising a lens and a body;
providing a distance measurement device comprising a light emitter and a light receiver;
acquiring: (a) a first captured image obtained by imaging a subject from a first imaging position, (b) a moving image including a plurality of second captured images obtained by imaging the subject from a second imaging position different from the first imaging position, the first captured image and moving image being obtained by the imaging device, and (c) a distance to the subject which is measured by the distance measurement device by emitting directional light, which is light having directivity, to the subject and receiving reflected light of the directional light;
deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and
executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the first captured image and each of the second captured images.

18. An information processing method comprising:
providing an imaging device comprising a lens and a body;
providing a distance measurement device comprising a light emitter and a light receiver;
acquiring: (a) a first captured image obtained by imaging a subject from a first imaging position, (b) a moving image including a plurality of second captured images obtained by imaging the subject from a second imaging position different from the first imaging position, the first captured image and moving image being obtained by the imaging device, and (c) a distance to the subject which is measured by the distance measurement device by emitting directional light, which is light having directivity, to the subject and receiving reflected light of the directional light;

deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and executing a predetermined process as a process to be executed in a position unspecifiable state with respect to each of the plurality of second captured images, in a case of the position unspecifiable state where the position of the pixel which is specified by the derived irradiation position pixel coordinates is a position of a pixel different from a pixel which is specifiable at positions corresponding to each other in the first captured image and each of the second captured images.

19. A non-transitory computer-readable storage medium storing a program for causing a computer to execute a process comprising:

acquiring: (a) a first captured image obtained by imaging a subject from a first imaging position, (b) a moving image including a plurality of second captured images obtained by imaging the subject from a second imaging position different from the first imaging position, the first captured image and moving image being obtained by an imaging device, and (c) a distance to the subject which is measured by a distance measurement device by emitting directional light, which is light having directivity, to the subject and receiving reflected light of the directional light;

deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and executing a predetermined process as a process to be executed in a position specifiable state with respect to each of the plurality of second captured images, in a case of the position specifiable state where the position of the pixel which is specified by the derived irradiation position pixel coordinates is a position of a pixel which is specifiable at positions corresponding to each other in the first captured image and each of the second captured images.

20. A non-transitory computer-readable storage medium storing a program for causing a computer to execute a process comprising:

acquiring: (a) a first captured image obtained by imaging a subject from a first imaging position, (b) a moving image including a plurality of second captured images obtained by imaging the subject from a second imaging position different from the first imaging position, the first captured image and moving image being obtained by an imaging device, and (c) a distance to the subject which is measured by a distance measurement device by emitting directional light, which is light having directivity, to the subject and receiving reflected light of the directional light;

deriving irradiation position pixel coordinates for specifying a position of a pixel corresponding to an irradiation position of the directional light on a real space with respect to the subject, on the basis of the acquired corresponding distance, with respect to each of the plurality of second captured images included in the acquired moving image; and executing a predetermined process as a process to be executed in a position unspecifiable state with respect to each of the plurality of second captured images, in a case of the position unspecifiable state where the position of the pixel which is specified by the derived irradiation position pixel coordinates is a position of a pixel different from a pixel which is specifiable at positions corresponding to each other in the first captured image and each of the second captured images.

* * * * *